United States Patent [19]
Morrison et al.

[11] Patent Number: 5,517,628
[45] Date of Patent: May 14, 1996

[54] COMPUTER WITH INSTRUCTIONS THAT USE AN ADDRESS FIELD TO SELECT AMONG MULTIPLE CONDITION CODE REGISTERS

[75] Inventors: Gordon E. Morrison, Denver; Christopher B. Brooks; Frederick G. Gluck, both of Boulder, all of Colo.

[73] Assignee: Biax Corporation, Palm Beach Gardens, Fla.

[21] Appl. No.: 254,687

[22] Filed: Jun. 6, 1994

Related U.S. Application Data

[63] Continuation of Ser. No. 93,794, Jul. 19, 1993, abandoned, which is a continuation of Ser. No. 913,736, Jul. 14, 1992, abandoned, which is a continuation of Ser. No. 560,093, Jul. 30, 1990, abandoned, which is a division of Ser. No. 372,247, Jun. 26, 1989, Pat. No. 5,021,945, which is a division of Ser. No. 794,221, Oct. 31, 1985, Pat. No. 4,847,755.

[51] Int. Cl.⁶ ............................................. G06F 9/06
[52] U.S. Cl. ............................................. 395/375
[58] Field of Search ............................................. 395/375

[56] References Cited

U.S. PATENT DOCUMENTS

| | | |
|---|---|---|
| 3,611,306 | 10/1971 | Reigel . |
| 3,771,141 | 11/1973 | Culler . |
| 4,104,720 | 8/1978 | Gruner . |
| 4,109,311 | 8/1978 | Blum et al. . |
| 4,153,932 | 5/1979 | Dennis et al. . |
| 4,181,936 | 1/1980 | Kober . |
| 4,200,912 | 4/1980 | Harrington et al. ........... 364/200 |
| 4,228,495 | 10/1980 | Bernhard . |
| 4,229,790 | 10/1980 | Gilliland et al. ........... 364/DIG. 1 |
| 4,241,398 | 12/1980 | Caril . |

(List continued on next page.)

OTHER PUBLICATIONS

Bernhard, "Computing at the Speed Limit", IEEE Spectrum, Jul. 1982, pp. 26–31.
Davis, "Computer Architecture", IEEE Spectrum, Nov. 1983, pp. 94–99.
Dennis, "Data Flow Supercomputers", Computer, Nov. 1980, pp. 48–56.
Fisher et al., "Measuring the Parallelism Available for Very Long Instruction, Word Architectures", IEEE Transactions on Computers, vol. C–33, No. 11, Nov. 1984, pp. 968–978.
Fisher et al., "Microcode Compaction: Looking Backward and Looking Forward", National Computer Conference, 1981, pp. 95–102.
Fisher, A. T., "The VLIW Machine: A Multiprocessor for Compiling Scientific Code ", Computer, 1984, pp. 45–52.

(List continued on next page.)

*Primary Examiner*—Thomas M. Heckler
*Attorney, Agent, or Firm*—Fish & Richardson

[57] ABSTRACT

The invention features a computer with a condition code register file (the condition code register file is distinct from the computer's general purpose register file). The condition code register file has a plurality of addressable condition code registers. The computer executes condition-setting instructions that each produce a condition code value for storage in one of the condition code registers, and conditional branch instructions that branch to a target based on analysis of a condition code value from one of the condition code registers. The condition code registers are directly addressable by condition code address fields of the instructions. The invention finds primary expression in one of two embodiments (or in both simultaneously): either (a) at least some of the condition-setting instructions contain a direct address field that selects one, from among the plurality of the condition code registers into which the condition code value is to be stored, or (b) at least some of the conditional branch instructions contain a direct address field that selects one, from among the plurality of the condition code registers from which a condition code value is to be selected for analysis.

30 Claims, 17 Drawing Sheets

U.S. PATENT DOCUMENTS

| | | | |
|---|---|---|---|
| 4,247,894 | 1/1981 | Beismann et al. | 364/200 |
| 4,250,546 | 2/1981 | Boney et al. | 364/DIG. 1 |
| 4,270,167 | 5/1981 | Koehler et al. | |
| 4,334,268 | 6/1982 | Boney et al. | 364/DIG. 1 |
| 4,338,661 | 7/1982 | Tredennick et al. | 364/DIG. 1 |
| 4,342,078 | 7/1982 | Tredennick et al. | 364/200 |
| 4,430,707 | 2/1984 | Kim. | |
| 4,435,758 | 3/1984 | Lorie et al. | |
| 4,466,061 | 8/1984 | DeSantis. | |
| 4,468,736 | 8/1984 | DeSantis. | |
| 4,514,807 | 4/1985 | Nogi. | |
| 4,532,589 | 7/1985 | Shintani et al. | 364/200 |
| 4,574,348 | 3/1986 | Scallon. | |
| 4,598,400 | 7/1986 | Hillis | 370/60 |
| 4,833,599 | 5/1989 | Colwell et al. | 364/200 |

OTHER PUBLICATIONS

Fisher et al., "Using an Oracle to Measure Potential Parallelism in Single Instruction Stream Programs", IEEE No. 0194–1895/81/0000/0171, 14th Annual Microprogramming Workshop, Sigmicro, Oct., 1981, pp. 171–182.

Requa et al.; "The Piecewise Data Flow Architecture: Architectural Concepts"; IEEE Transactions on Computers; vol. C–32 No. 5, May 1983, pp. 425–438.

J. R. Vanaken et al., "The Expression Processor," IEEE Transactions on Computers, C–30, No. 8, Aug., 1981, pp. 525–536.

Chang et al.; "801 Storage Architecture and Programming"; ACM Transactions on Computer Systems; 6:28–50; 1988.

Colwell et al.; "A VLIW Architecture for a Trace Scheduling Compiler"; ACM; 1987.

Ellis, John R.; "Bulldog: A Compiler for VLIW Architectures"; MIT Press; 1986; Originally Published as a Yale University Doctoral Dissertation; 1985.

Gross et al.; "Optimizing Delayed Branches"; IEEE; 114–120; 1982.

Hagiwara, et al.; "A Dynamically Microprogrammable Computer With Low–Level Parallelism"; IEEE Transactions on Computers; C–29:577–594; 1980.

Heinrich et al.; "Including the R4400 MIPS R4000 Microprocessor R4000 User's Manual"; MIPS Technologies Inc.; 1993.

Hennessy et al., "The MIPS Machine"; Proceedings of IEEE Compcon; 2–7; 1982.

Hennessy et al.; "Postpass Code Optimization of Pipeline Constraints"; ACM Transactions on Programming Languages and Systems; 5:422–448; 1983.

Hennessy; "VLSI Processor Architecture"; IEEE; c–33:1221–1246; 1984.

Hennessy; "VLSI RISC Processors"; VLSI Systems Design; 22–32; 1985.

IBM; "PowerPC™ 601, RISC Microprocessor User's Manual"; IBM and Motorola; 1991 and 1993.

Intel Corporation; "MCS–80 User's Manual (With Introduction to MCS–85™)"; Oct. 1977.

McDowell Charles E.; "A Simple Architecture for Low––Level Parallelism"; Proceedings of 1983 International Conference on Parallel Processing; 472–477; 1983.

McDowell Charles E.; "SIMAC:A Multiple ALU Computer"; Dissertation Thesis; Univ. of California; San Diego; (111 pages); 1983.

McDowell et al.; "Processor Scheduling for Linearly Connected Parallel Processors"; IEEE Transactions on Computers; c–35:632–639; Jul. 1986.

Motorola; "MC68030 Enhanced 32–Bit Microprocessor User's Manual Second Edition"; 1989.

Patterson et al.; "The Case for the Reduced Instruction Set Computer"; Computer Architecture News; 8:132–191; 1980.

Patterson David A.; "Microprogramming"; Scientific American; 248:244; 1983.

Patterson David A.; "Reduced Instruction Set Computers"; Communications of the ACM; 28:8–21; 1985.

Radin George; "The 801 Minicomputer"; Proceedings of ACM Symposium on Architectural Support for Programming Languages and Operating Systems; 10:39–47, Mar. 1982.

Sites et al.; "Alpha Architecture Reference Manual"; Digital Press; 1992.

Tomita et al.; "A User–Microprogrammable Local Host Computer With Low–Level Parallelism"; ACM 0149–7111/83/0600/0151; 151–159; 1983.

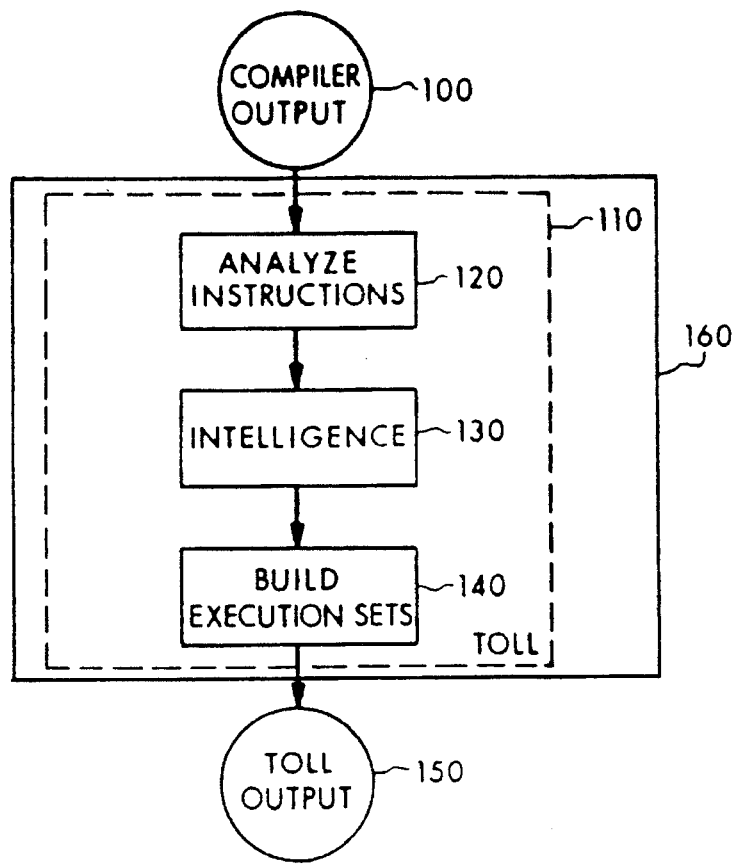

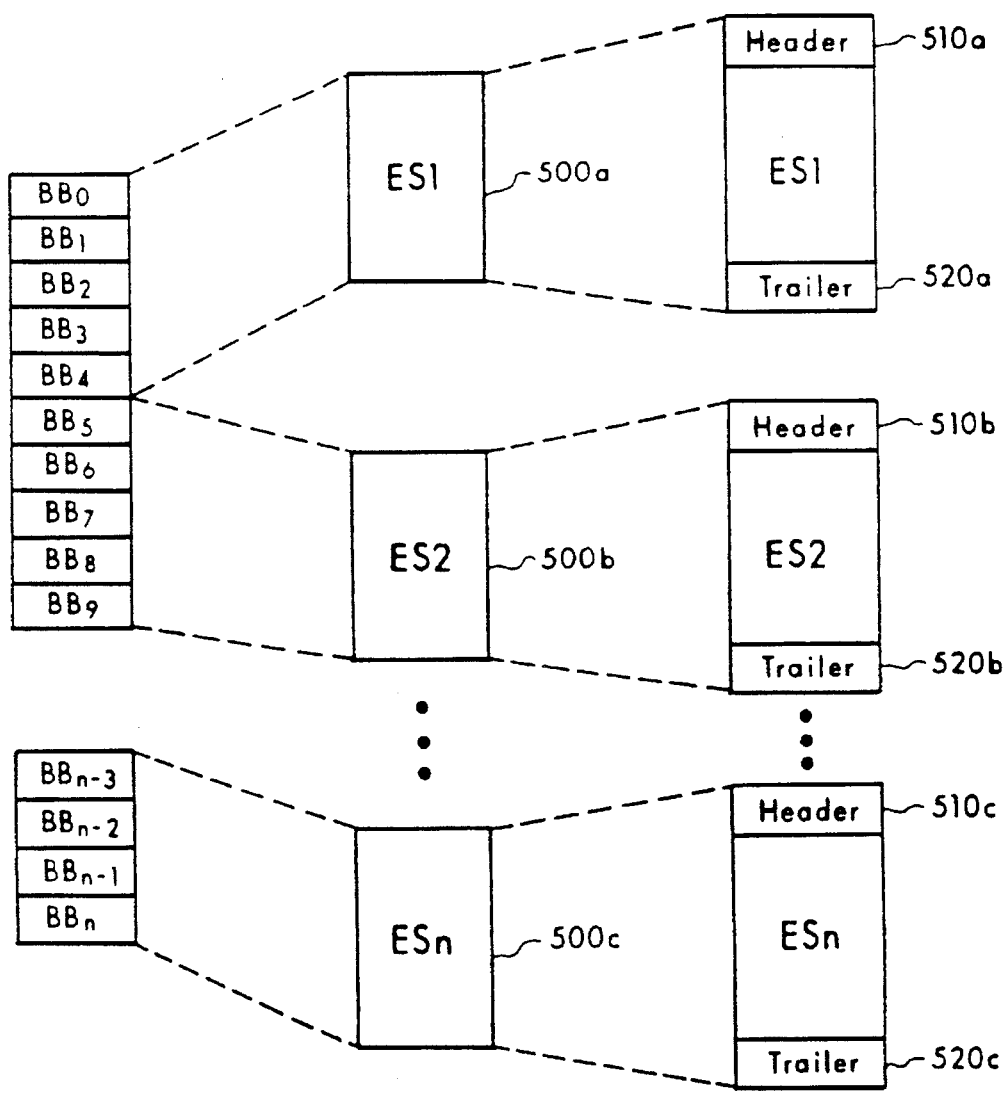

1

COMPUTER WITH INSTRUCTIONS THAT USE AN ADDRESS FIELD TO SELECT AMONG MULTIPLE CONDITION CODE REGISTERS

This is a continuation of copending application Ser. No. 08/093,794 filed on Jul. 19, 1993, now abandoned, which is a continuation of prior application Ser. No. 07/913,736 filed on Jul. 14, 1992, now abandoned, which is a continuation of prior application Ser. No. 07/560,093 filed on Jul. 30, 1990, now abandoned, which is a division of application Ser. No. 07/372,247 filed on Jun. 26, 1989, now U.S. Pat. No. 5,021,945, which is a division of application Ser. No. 06/794,221, filed on Oct. 31, 1985, now U.S. Pat. No. 4,847,755, issued Jul. 11, 1989.

BACKGROUND OF THE INVENTION

1. Field of the Invention

This invention generally relates to parallel processor computer systems and, more particularly, to parallel processor computer systems having software for detecting natural concurrencies in instruction streams and having a plurality of identical processor elements for processing the detected natural concurrencies.

2. Description of the Prior Art

Almost all prior art computer systems are of "Von Neumann" construction. In fact, the first four generations of computers are Von Neumann machines which use a single large processor to sequentially process data. In recent years, considerable effort has been directed towards the creation of a fifth generation computer which is not of the Von Neumann type. One characteristic of the so-called fifth generation computer relates to its ability to perform parallel computation through use of a number of processor elements. With the advent of very large scale integration (VLSI) technology, the economic cost of using a number of individual processor elements becomes cost effective.

An excellent survey of multi-processing technology involving the use of parallel architectures is set forth in the June, 1985 Issue of COMPUTER, published by the IEEE Computer Society, 345 East 47th Street, New York, N.Y. 10017, which is not believed to be prior art to the present invention but serves to define the activity in this field. In particular, this issue contains the following articles:

(a) "Essential Issues in Multi-processor Systems" by Gajski et al.;

(b) "Microprocessors: Architecture and Applications" by Patton; and (c) "Research on Parallel Machine Architecture for Fifth-Generation Computer Systems" by Murakami et al.

In addition, an article in the IEEE Spectrum, November, 1983, entitled "Computer Architecture" by A. L. Davis discusses the features of such fifth-generation machines. Whether or not an actual fifth generation machine has yet been constructed is subject to debate, but various features have been defined and classified.

As Davis recognizes, fifth-generation machines should be capable of using multiple-instruction, multiple-data (MIMD) streams rather than simply being a single instruction, multiple-data (SIMD) system. The present invention is believed to be of the fifth-generation non-Von Neumann type which is capable of using MIMD streams in single context (SC-MIMD) or in multiple context (MC-MIMD). The present invention, however, also finds application in the entire computer classification of single and multiple context SIMD (SC-SIMD and MC-SIMD) machines as well as single and multiple context single-instruction, single data (SC-SISD and MC-SISD) machines.

While the design of fifth-generation computer systems is fully in a state of flux, certain categories of systems have been defined. Davis and Gajski, for example, base the type of computer upon the manner in which "control" or "synchronization" of the system is performed. The control classification includes control-driven, data-driven, and reduction (or demand) driven. The control-driven system utilizes a centralized control such as a program counter or a master processor to control processing by the slave processors. An example of a control-driven machine is the Non-Von-1 machine at Columbia University. In data-driven systems, control of the system results from the actual arrival of data required for processing. An example of a data-driven machine is the University of Manchester dataflow machine developed in England by Ian Watson. Reduction driven systems control processing when the processed activity demands results to occur. An example of a reduction processor is the MAGO reduction machine being developed at the University of North Carolina, Chapel Hill. The characteristics of the non-Von-1 machine, the Manchester machine, and the MAGO reduction machine are carefully discussed in the Davis article. In comparison, data-driven and demand-driven systems are decentralized approaches whereas control-driven systems are centralized. The present invention is more properly categorized in a fourth classification which could be termed "time-driven." Like data-driven and demand-driven systems, the control system of the present invention is decentralized. However, like the control-driven system, the present invention conducts processing when an activity is ready for execution.

It has been recognized by the Patton, Id. at 39, that most computer systems involving parallel processing concepts have proliferated from a large number of different types of computer architectures. In such cases, the unique nature of the computer architecture mandates or requires either its own processing language or substantial modification of an existing language to be adapted for use. To take advantage of the highly parallel structure of such computer architectures, the programmer is required to have an intimate knowledge of the computer architecture in order to write the necessary software. As a result, porting programs to these machines requires substantial amounts of the users effort, money and time.

Concurrent to this activity, work has also been progressing on the creation of new software and languages, independent of a specific computer architecture, that will expose (in a more direct manner), the inherent parallelism. Hence, most effort in designing supercomputers has been concentrated at the hardware end of the spectrum with some effort at the software end.

Davis has speculated that the best approach to the design of a fifth-generation machine is to concentrate efforts on the mapping of the concurrent program tasks in the software onto the physical hardware resources of the computer architecture. Davis terms this approach one of "task-allocation" and tauts it as being the ultimate key to successful fifth-generation architectures. He categorizes the allocation strategies into two generic types. "Static allocations" are performed once, prior to execution, whereas "dynamic allocations" are performed by hardware whenever the program is executed or run. The present invention utilizes a static allocation strategy and provides task allocations for a given program after compilation and prior to execution. The recognition of the "task allocation" approach in the design of fifth generation machines was used by Davis in the design of his "Data-driven Machine-II" constructed at the University of Utah. In the Data-driven Machine-II, the program was compiled into a program graph that resembles the actual machine graph or architecture.

Task allocation is also referred to as "scheduling" in the Gajski article. Gajski sets forth levels of scheduling to include high level, intermediate level, and low level scheduling. The present invention is one of low-level scheduling, but it does not use conventional scheduling policies of "first-in-first-out", "round-robin", "shortest type in job-first", or "shortest-remaining-time." Gajski also recognizes the advantage of static scheduling in that overhead costs are paid at compile time. However, Gajski's recognized disadvantage, with respect to static scheduling, of possible inefficiencies in guessing the run time profile of each task is not found in the present invention. Therefore, the conventional approaches to low-level static scheduling found in the Occam language and the Bulldog compiler are not found in the software portion of the present invention. Indeed, the low-level static scheduling of the present invention provides the same type, if not better, utilization of the processors commonly seen in dynamic scheduling by the machine at run time. Furthermore, the low-level static scheduling of the present invention is performed automatically without intervention of programmers as required (for example) in the Occam language.

Davis further recognizes that communication is a critical feature in concurrent processing in that the actual physical topology of the system significantly influences the overall performance of the system.

For example, the fundamental problem found in most data-flow machines is the large amount of communication overhead in moving data between the processors. When data is moved over a bus, significant overhead, and possible degradation of the system, can result if data must contend for access to the bus. For example, the Arvind data-flow machine, referenced in Davis, utilizes an I-structure stream in order to allow the data to remain in one place which then becomes accessible by all processors. The present invention teaches a method of hardware and software based upon totally coupling the hardware resources thereby significantly simplifying the communication problems inherent in systems that perform multiprocessing.

Another feature of non-Von Neumann type multiprocessor systems is the level of granularity of the parallelism being processed. Gajski terms this "partitioning." The goal in designing a system according to Gajski is to obtain as much parallelism as possible with the lowest amount of overhead. The present invention performs concurrent processing at the lowest level available, the "per instruction" level. The present invention teaches a method whereby this level of parallelism is obtainable without execution time overhead.

Despite all of the work that has been done with multiprocessor parallel machines, Davis (Id. at 99) recognizes that such software and/or hardware approaches are primarily designed for individual tasks and are not universally suitable for all types of tasks or programs as has been the hallmark with Von Neumann architectures. The present invention sets forth a computer system that is generally suitable for many different types of tasks since it operates on the natural concurrencies existent in the instruction stream at a very fine level of granularity.

The patent invention, therefore, pertains to a non-Von Neuman MIMD computer system capable of operating upon many different and conventional programs by a number of different users. The natural concurrencies in each program are statically allocated, at a very fine level of granularity, and intelligence is added to each instruction at essentially the object code level. The added intelligence includes a logical processor number and an instruction firing time in order to provide the time-driven decentralized control for the present invention. The detection and low level scheduling of the natural concurrencies and the adding of the intelligence occurs only once for a given program, after conventional compiling of the program, without user intervention and prior to execution. The results of this static allocation are executed on a system containing a plurality of identical processor elements. These processor elements are characterized by the fact that they contain no execution state information from the execution of previous instructions, i.e., they are context free. In addition, a plurality of contexts, one for each user, are provided wherein the plurality of context free processor elements can access any storage resource contained in any context through total coupling of the processor element to the shared resource during the processing of an instruction. Under the teachings of the present invention no condition code or results registers are found on the individual processor elements.

Based upon the features of the present invention, a patentability investigation was conducted resulting in the following references:

ARTICLES

Dennis, "Data Flow Supercomputers", Computer, November, 1980, Pgs. 48–56.

Hagiwara, H. et al., "A Dynamically Microprogrammable, Local Host Computer With Low-Level Parallelism", IEEE Transactions on Computers, C-29, No. 7, July, 1980, Pgs. 577–594.

Fisher et al., "Microcode Compaction: Looking Backward and Looking Forward", National Computer Conference, 1981, Pgs. 95–102.

Fisher et al., "Using an Oracle to Measure Potential Parallelism in Single Instruction Stream Programs", IEEE No. 0194-1895/81/0000/0171, 14th Annual Microprogramming Workshop, Sigmicro, October, 1981, Pgs. 171–182.

J. R. Vanaken et al., "The Expression Processor, IEEE Transactions on Computers, C-30, No. 8, August, 1981, Pgs. 525–536.

Bernhard, "Computing at the Speed Limit", IEEE Spectrum, July, 1982, Pgs. 26–31.

Davis, "Computer Architecture", IEEE Spectrum, November, 1983, Pgs. 94–99.

Hagiwara, H. et al., "A User-Microprogrammable Local Host Computer With Low-Level Parallelism", Article, Association for computing Machinery, #0149-7111/83/0000/0151, 1983, Pgs. 151–157.

McDowell, Charles Edward, "SIMAC: A Multiple ALU Computer", Dissertation Thesis, University of California, San Diego, 1983(111 pages).

McDowell, Charles E., "A Simple Architecture for Low Level Parallelism", Proceedings of 1983 International Conference on Parallel Processing, Pgs. 472–477.

Requa, et al., "The Piecewise Data Flow Architecture: Architectual Concepts, IEEE Transactions on Computers, Vol. C-32, No. 5, May, 1983, Pgs. 425–438.

Fisher, A. T., "The VLIW Machine: A Multiprocessor for Compiling Scientific Code", Computer, 1984 Pgs 45–52.

Fisher, et al., "Measuring the Parallelism Available for Very Long Instruction, Word Architectures", IEEE Transactions on Computers, Vol. C-33, No. 11, November, 1984, Pgs. 968–976.

PATENTS

Freiman, et al., (U.S. Pat. No. 3,343,135), "Compiling Circuitry for a Highly-Parallel Computing System", Sep. 19, 1967.

Reigel, (U.S. Pat. No. 3,611,306), "Mechanism to Control the Sequencing of Partially Ordered Instructions in a Parallel Data Processing System", Oct. 5, 1971.

Culler, (U.S. Pat. No. 3,771,141), "Data Processor With Parallel Operations for Instructions", Nov. 6, 1973.

Gruner, (U.S. Pat. No. 4,104,720), "CPU/Parallel Processor Interface with Microcode Extension", Aug. 1, 1978.

Blum, et al. (U.S. Pat. No. 4,109,311), "Instruction Execution Modification Mechanism for Time Slice Controlled Data Processors", Aug. 22, 1978.

Dennis, et al. (U.S. Pat. No. 4,153,932), "Data Processing Apparatus for Highly Parallel Execution of Stored Programs", May 8, 1979.

Kober, (U.S. Pat. No. 4,181,936), "Data Exchange Processor for Distributed Computing System", Jan. 1, 1980.

Bernhard, (U.S. Pat. No. 4,228,495), "Multiprocessor Numerical Control System", Oct. 14, 1980.

Gilliland, et al., (U.S. Pat. No. 4,229,790), "Concurrent Task and Instruction Processor and Method", Oct. 21, 1980.

Caril, (U.S. Pat. No. 4,241,398), "Computer Network Line Protocol System", Dec. 23, 1980.

Koehler, et al., (U.S. Pat. No. 4,270,167), "Apparatus and Method for Cooperative and Concurrent Coprocessing of Digital Information", May 26, 1981.

Lorie, et al., (U.S. Pat. No. 4,435,758), "Method for Conditional Branch Execution in SIMD Vector Processors", Mar. 6, 1984.

DeSantis, (U.S. Pat. No. 4,468,736), "Mechanism for Creating Dependency Free Code For Multiple Processing Elements", Aug. 28, 1984.

DeSantis, (U.S. Pat. No. 4,466,061), "Concurrent Processing Elements For Using Dependency Free Code", Aug. 14, 1984.

In the two McDowell references, a parallel processing system utilizing low level parallelism was disclosed. McDowell differentiates between low level and high level parallelism in that low level parallelism pertains to the execution of two or more machine level operations in parallel whereas high level parallelism is the parallel execution of high level language constructs which includes source language statements, tasks, procedures, or entire programs.

Like the present invention, McDowell identifies and statically schedules low level parallel operations found in existing "sequential" programming languages. Further, he does not require the creation of special purpose programming languages or user modifications to the parallelism existing with the program at compile time, rather he simply analyzes the low level parallelism existing within the basic blocks (BBs) that make up the program.

In the McDowell SIMAC system, processor elements are identical and communicate through a shared memory and a set of shared registers. The processor elements are controlled by a control processor that is fed by a single instruction stream.

McDowell recognizes his particular parallel processing system does not fit into the standard categories of: homogeneous multi-processors, non-homogeneous multi-processors, array processors, and pipeline processors. Rather, McDowell classified his computer system in the class of Schedulable Parallel Instruction Execution (SPIE) computers. McDowell's reasoning as to why SIMAC is categorized as a SPIE processor is as follows:

SPIE processors have only one instruction stream and are therefore immediately eliminated from the first two groups. They have some of the characteristics of array processors, but they are distinctly different in that each of the several processing elements may be executing different operations. In array processors all processing elements are restricted to executing the same instruction on different data. SPIE processors are also similar in capability to pipelined machines but again they are distinct in that each processing element may be given a new operation each instruction cycle that is independent of the operation it was performing in the previous cycle. Pipelined machines only specify a single operation per instruction cycle, and then other operations on other processing elements may be triggered from that one initial operation. Dissertation Thesis at 11.

The present invention also is properly categorized as a SPIE processing system since each processor element may be given a new operation each instruction cycle that is independent of the operation it was performing in the previous cycle. Hence, the McDowell reference provides important background material to the teachings of the present invention. However, important distinctions exist between McDowell's SIMAC system and the system of the present invention. SIMAC is quoted as being a SPIE machine that can perform scalar concurrent execution of a single user's program (i.e., SIMD). The present invention also fits into this SIMD category, however, it is further capable of performing scalar concurrent execution for multiple instruction streams (i.e., MIMD) and further for single or multiple context (i.e., SC-MIMD or MC-MIMD).

SIMAC implicitly assigns instructions (termed "machine operations") to processor elements by virtue of the physical ordering of the instructions when they are grouped together into "parallel instructions." The identity of the assigned processor is not a part of the instruction per'se. The present invention teaches that the order of the instructions within a group of concurrently executable instructions does not determine the processor assignment. Rather, the processor assignment, under the teachings of the present invention, is explicitly made by adding a logical processor number to become physically part of the instruction which is performed in software prior to execution. In addition, the present invention distinguishes the logical processor number from the actual physical processor number that executes the instruction. This allows for further machine independence of the software in that the physical processor assignment is performed dynamically at execution time.

SIMAC code generation can be divided into three components during which the static allocation and scheduling of its instructions are performed (prior to execution). First, is the determination of the machine operations to be performed. This is the typical code generation phase of a compiler. Second, is the formation of these operations into parallel instructions containing the operations that can be done in parallel. The third component comprises the ordering (scheduling) of the parallel instructions so ". . . to allow the execution of two [parallel instructions] containing different length [machine operations] to overlap using only simple hardware controls . . . " McDowell's Conference Paper @ Pg. 475.

In other words, McDowell attempts to schedule instructions with differing length execution times so that they can execute concurrently with a minimum amount of hardware support. To the contrary, the present invention does not require this third component. The use of the logical processor number and the instruction firing time that are physically attached to each instruction preclude the need for this phase.

As stated above, SIMAC performs its concurrency detection during compile time only. As a result, the static analysis of the concurrency present within the instruction stream is language dependent. In contrast, the concurrency detection of present invention is language independent since the detection takes place after compilation and prior to execution. The present invention can perform its concurrency detection and scheduling without requiring any modifications to the compiler.

Like SIMAC, the present invention is designed to be independent of the number of processor elements contained within the system. The processor elements in SIMAC, however, are conventional load/store RISC style processors that contain contextual information regarding the state of the previous execution status. These are the "T" and "V" bits associated with each of the SIMAC processor elements. These are used for branching and are the result of executing certain comparison and test instructions. The processor elements of the present invention are context free processors that support a RISC-like instruction set. The term "context free" means that the processor elements contain no state information, e.g., condition codes, registers, program status words, flags, etc. Like SIMAC, the processor elements of the present invention contain no local registers. All operations are performed on data already stored in an array of registers and are accessible by any of the individual processor elements through a register switch.

In SIMAC, only a single set (or level) of 32 registers is available and is shared by all processor elements. Each register may be physically read by any or all processor elements simultaneously. However, only one processor element may write into a specific register at any one time. (Dissertation Thesis at 26) Whereas the registers of this invention also have this characteristic, the architecture of the register set in the present invention is much different than that of the SIMAC machine. The SIMAC machine contains a single level of registers. The present invention contains a number of levels of register sets; each level corresponding to a procedural depth relative to the main program. In addition, each set of levels is replicated to support each context or user that is currently being executed. Thus, under the teachings of the present invention, contexts may be switched or procedures entered without having to flush any registers to memory.

SIMAC does not discuss the need for the production and assignment of condition codes. Without the use of multiple condition code sets, it is not possible to distribute instructions which affect the condition codes across multiple processor elements and guarantee proper condition code data for the execution of subsequent dependent instructions. The present invention teaches a method for the management and assignment of multiple condition code sets. The management and assignment of this resource is analogous to that done for the register resources.

SIMAC also requires a separate control processor that performs the branching operations. This processor contains the program counter and executes the branch operations Each processor element in SIMAC contains three status bits used in the branching operations. The present invention does not use a control processor, nor does it use a program counter and its processor elements contain no such status bits. SIMAC is a centralized control system under the Davis classification whereas the present invention is decentralized.

Hence, the present invention is significantly more general than the SIMAC approach since the present invention performs inter-program parallelism as well as intra-program parallelism.

In addition, while SIMAC provides a register array, McDowell indicates that this, perhaps is not desirable because of cost and proposes that future work be done on an arrangement other than shared registers (Id. at 79) The present invention not only makes use of the shared register concept but also provides sharing of condition codes and the management of those condition codes as well. While McDowell, implicitly, assigns the machine operations to his processor elements, the present invention explicitly extends each instruction with a logical processor number as well as providing a specific firing time for the instruction. There is no disclosure in SIMAC of either a firing time or a logical processor number. Therefore, the master controller, in SIMAC, uses a program counter that provides the control for the processor elements. Under the teaching of the present invention, a set of logical resource drivers (one for each context or user) is provided and instruction selection is based upon the firing times added to each instruction within a basic block (i.e., time driven).

DeSantis sets forth in U.S. Pat. Nos. 4,466,061 and 4,468,736 a concurrent data processor which is:

adapted to receive strings of object code, form them into higher level tasks and to determine sequences of such tasks which are logically independent so that they may be separately executed ('736 patent at col. 2, lines 50–54).

The logically independent sequences are separately executed by a plurality of processor elements. The first step in the DeSantis approach is to hardware compile the program into strings of object code or machine language in a form which is particularly designed for the computer architecture to provide a dependency free code. The DeSantis invention then forms an independency queue so that all processing for the entire queue is accomplished in one step or cycle. The hardware structure for the DeSantis approach is set forth in FIG. 2 of the patent and contemplates the use of a number of small processor elements (SPEs) each with local memories.

The nature of the interconnection between the local memories of each SPE and the direct storage module 14 is not clear. The patent states:

In the meantime, respective data items required for execution have been fetched from main memory and stored at the appropriate locations in local memories which locations are accessed by the pointers and the job queue ('736 patent at Col. 6, Lines 19–23).

It does not appear from this description, that each individual SPE has access to the local memories of the other SPE rather, this allocation seems to be made by the direct storage module (DSM). Hence, under DeSantis, the queue which contains the independent sequences for processing delivers the string to an identified processor element, so that the processor elements can process all strings concurrently and in parallel, the direct storage module must deliver the necessary results into the local memories for each SPE. With respect to each individual SPE, DeSantis states:

Since the respective processors are provided to execute different functions, they can also be special purpose microprocessors containing only that amount of logic circuitry required to perform the respective functions. The respective circuits are the arithmetic logic unit, shift unit, multiply unit, indexing unit, string processor and decode unit ('736 patent at Col. 7, Lines 7–13).

The primary difference between the approach of the present invention and DeSantis relates to when the detection of the concurrency occurs. TDA performs its concurrency detection during a pre-processing stage at the object level using information normally thrown away by the source code level language processors. DeSantis performs it with part of the hardware collectively called the cache mechanism 10 (see FIG. 1) dynamically during execution time. Hence, the DeSantis approach constantly uses overhead and resources to hardware de-compile each program. A secondary difference relates to the execution of individual streams of dependent instructions. DeSantis requires that a stream of dependent instructions be executed on the same processor. To the contrary, the present invention permits the execution of a stream of dependent instructions on the same or multiple processor elements.

It is believed that the aforesaid McDowell and DeSantis references are the most pertinent of the references discovered in the patentability investigation and, therefore, more discussion occurs for it than the following references.

J. R. Vanaken in "The Expression Processor" article classifies his processor as a "direct descendant of the tree processor." There is a similarity between the Vanaken architecture and the architecture of the present invention wherein each processor element is capable of accessing, through an alignment network, any one of a number of registers located in a register array. Vanaken utilizes thirty-two processor elements and eight register modules in the register storage. A crossbar switch is disclosed for the alignment network. In this configuration, the identical processor elements of Vanaken do not exchange data directly with the main memory. Rather, data transfers take place between the register storage and the memory. This is not the configuration of the present invention. Vanaken further contemplates utilizing a separate compiler (only for scaler programs) for the detection of low level parallelism and for the assignment of detected parallelism to individual processor elements. How this is done, however, is not disclosed. Vanaken simply discloses the desired goals:

First, it [the compiler] must detect the potential parallelism in the program. Second, it must map detected parallelism onto the structure of the target machine. *The Expression Processor* at 535.

Vanaken refers only to the parallelism detection techniques presented by Kuck. However, Vanaken's tree structured processor element architecture requires that the computational task be modeled as a computational tree, or as a computational wavefront (wavefront ref: Kuck's work). In the former case, processor assignment is accomplished by assigning a processor to each node in the tree. If there are more nodes in the tree than processors, the task must be broken down into smaller subtasks that will fit on the processor array. In the latter case, the wavefront propagates from the lowest level of processors to the next higher level and so on until the highest level is achieved. Again, if the number of processors required by the wavefront is greater than the number of processors available, the task must be broken into smaller subtasks. This type of flow through ordered processors does not exist in the present invention.

In the Hagiwara articles, the disclosed MIMD QA-1 computer system appears to be a very long instruction word (VLIW) machine having a 160 bit or 80 bit word. The Hagiwara references term this a "horizontal-type microinstruction" and the QA-1 machine takes advantage of the low-level parallel concurrency, at the microcode level. The QA-2 system has 62 working registers constructed of large capacity/high-speed RAM chips interconnected over a network to each of the four processor elements. The earlier QA-1 system utilized a stack of only 15 working registers. Hence, the QA-2 hardware design contemplates the use of individual processor elements having full access to a number of working registers through a switching network. In QA-2, through use of the network, the results of one processor element are delivered to a working register which is then delivered to another processor element as input data. Hence, the QA-1 and QA-2 configurations take advantage of scaler concurrency, multiple ALUs, and the sharing of working registers. The QA-2 approach modifies the QA-1 approach by providing special purpose registers in the register file (i.e., constant, general, indirect, and special); such a division, however, is not apparent in the QA-1 architecture. From a compiling point of view, the QA-1 was primarily designed to be encoded by a programmer at the microcode level to take programming advantage of the inherent power of the system's architecture. The QA-2 machine which is directed towards the personal computer or local host computer (e.g., for laboratory use) contemplates that programs written in high-level languages will be compiled into the QA-2 microprogrammed interpretations.

The four Fisher references disclose a SIMD system based upon a "very long instruction word" (VLIW). The goal presented in these articles is to determine the low level parallelism or "fine-grained parallelism" of a program in a separate compiler so that all individual movements of the data within the VLIW machine are completely specified at compile time. At the outset, it is important to recognize that the hardware architecture for implementing Fisher's VLIW machine is not discussed in these references other than in a general sense. Fisher contemplates:

Each of the eight processors contain several functional units, all capable of initiating an operation in each cycle. Our best guess is two integer ALUs, one pipelined floating ALU, one memory port, several register banks, and a limited crossbar for all of these to talk to each other. *Computer* article at pg. 50.

Rather, the Fisher articles concentrate on the software compiling technique called "trace scheduling" and nicknamed BULLDOG. Fisher further requires an instruction word of "fixed length." The length of Fisher's instruction word, therefore, dictates the amount of hardware required to process the instruction word. In that respect, the present invention is much more dynamic and fluid since it can have any number of processors wherein each processor processes the parallel instruction during the instruction firing time.

Lorie et al. (U.S. Pat. No. 4,435,758) sets forth a technique for ordering instructions for parallel execution during compile time by adding code to the instruction stream. The present invention does not add code to the instruction stream.

The Reigel patent (U.S. Pat. No. 3,611,306) relates to the ordering of the detected parallel instructions for a particular computer architectural approach.

The patent issued to Freiman, et al. (U.S. Pat. No. 5,343,135) teaches a dynamic compiling system, hardware based, for use in a multiprocessor environment for analyzing particular types of mathematical expressions for parallel execution opportunities and then to automatically assign individual operations to processors within the system. Freiman first identifies the concurrencies, in the hardware, and determines the time periods within which the operations may be performed. These determined times are "the earliest times in which a given operation may be performed." The Freiman invention also analyzes the particular mathematical expression and determines, in the hardware, "the latest times in which an operation can be performed." This information generated from the analysis of the mathematical algorithm is stored in a word register which is then used in the multiprocessor environment. Each processor has associated with it a processor control which for all processors is identical and which is driven by six control fields. One function of the control block is to determine whether or not a particular processor is ready to receive a job, to indicate when it has received a job, and to analyze each job to see if the processor can proceed immediately with the job or whether it must wait until one of the operants of the job is already assigned. Once a processor is assigned to a task the necessary data contained in the results register may not be available at that particular time and hence the processor must wait until a test of the results register indicates that the result is available. Once the result is available, the processor will perform its operation and place its result in the appropriate result register for access by another processor. All processors in Freiman have access to the results register by means of a crossbar switch.

The patent issued to Dennis et al. (U.S. Pat. No. 4,153,932) teaches a highly parallel multiprocessor for the concurrent processing of programs represented in data flow form. Specifically, a mathematical computation as shown at column 5, lines 17–23 and as represented in FIG. 2 in data flow language is used as an example. Hence, the data flow form is generated and stored in the memory of the processor in designated instruction cells wherein each instruction cell corresponds to an operator in the data flow program. In operation, when an instruction cell is complete (i.e., containing the instruction and all necessary operands), a signal is generated to the Arbitration Network which directs the flow of the information in the instruction cell to the identified processor. The processor operates on the information and delivers it back through a distribution network into the main memory.

The patent issued to Culler (U.S. Pat. No. 3,771,141) discloses a high speed processor capable of parallel operations on data. Multiple or parallel processors, however, are not used. Rather, the parallelism is achieved structurally by implementing each of the processor's data registers with four separate multi-bit data input ports. Hence, four operations can be performed at once. This results in a "tightly coupled" arrangement since the data from any given processor register is ready to be received by any other register at the next clock cycle. The control of which register is to receive which information occurs at the object code level and, as shown in Table 1 of Culler, four additional fields are provided in each object code instruction for controlling the flow of data among the processor's registers. Culler states:

> The data pad memory is tightly coupled to the arithmetic unit and serves as an effective buffer between the high speed arithmetic unit and a large capacity random access core memory. As an indication of the effective speed, a complete multiplication of two signed eight bit words can be accomplished in three cycles or 375 nanoseconds.

The Gilliland et al. patent (U.S. Pat. No. 4,229,790) sets forth a processor for processing different and independent jobs concurrently through the use of pipelining with precedent constraints. The Gilliland invention is capable of processing programming tasks concurrently as well as processing the parallel parts of each programming task concurrently. It appears that the invention operates on concurrencies in the program at the source code level rather than at the object code level. The Gilliland processor is capable of processing up to 128 parallel processor paths.

The patent issued to Blum et al. (U.S. Pat. No. 4,109,311) relates to a data processing system based upon time slice multiprogramming. The Blum invention contemplates a conventional multiprocessor arrangement wherein a first processor controls a keyboard and display interface, a second processor controls printer, disk storage, and tape storage interface, and a third processor executes the problem oriented programs located in the main storage.

Gruner (U.S. Pat. No. 4,104,720) sets forth a CPU control multiprocessor system wherein each parallel processor is directly interfaced through an interface control circuit to the CPU. Each interface circuit contains memory for storing portions of the micro instructions contained within the CPU. Gruner calls this an "extension" of the micro instructions from the CPU into the interface circuit for each parallel processor. The Gruner system while controlling each interface circuit to allocate and to assign concurrent tasks utilizes a conventional bus structure for the transfer of information between the processors.

The patent issued to Caril (U.S. Pat. No. 4,241,398) relates to a supervisory control system wherein a central processing unit controls and supervises the operation of a number of remote processing units. The Caril invention relates to a low overhead line protocol for controlling the asynchronous exchange of communication information between the central processing unit and each remote processing unit.

Bernhard et al. (U.S. Pat. No. 4,228,495) relates to multiprocessor numerical control system. The Bernhard invention relates to a main processor coupled over a bus structure to a plurality of programmable interface processors.

Koehler et al. patent (U.S. Pat. No. 4,270,167) discloses a multiprocessor arrangement wherein a central processor has primary control and access to a local bus and wherein the remaining plurality of processors also share access to the local bus. Arbitration among the processors is provided to the local bus as well as the generation of query status and processor status signals.

The patent issued to Kober (U.S. Pat. No. 4,181,936) relates to a distributed computing system for increasing the efficiency of the data bus.

The Requa article discusses a piecewise data flow architecture which seeks to combine the strengths of other supercomputers. The goal of the Requa architecture is to take the source code program and recompile it into "basic blocks." These basic blocks are designed to be no longer than 255 instructions and the natural concurrencies existing in each basic block are identified and processed separately by a number of "scaler processors." The natural concurrencies are encoded as part of the instructions to the scaler processors. The concurrent instructions waiting for execution reside in a stack of registers to which all of the scaler processors has access to deliver data into and to receive data from. As in the Dennis approach, when a particular instruction residing in the register is completed (i.e., when a prior data dependency has been satisfied and stored) the scaler instruction apparently raises a flag which will be detected for delivery to a scaler processor.

In the Bernhard article, the author surveys the current state of art concerning supercomputer design. The article discusses the current supercomputer research projects and provides critical comments concerning each type of design. The disclosure in this article appears to be cumulative to the analysis set forth above and none of the approaches set forth suggest the TDA processor register communication technique.

SUMMARY OF INVENTION

The present invention provides a method and a system that is non-Von Neuman and one which is adaptable for use in single or multiple context SISD, SIMD, and MIMD configurations. The method and system is further operative upon a myriad of conventional programs without user intervention.

The present invention statically determines at a very fine level of granularity, the natural concurrencies in the basic blocks (BBs) of programs at essentially the object code level and adds a logical processor number (LPN) and an instruction firing time (IFT) to each instruction in each basic block in order to provide a time driven decentralized control. The detection and low level scheduling of the natural concurrencies and the adding of the intelligence occurs only once for a given program after conventional compiling and prior to execution. At this time all instruction resources are assigned.

The present invention further executes the basic blocks containing the added intelligence on a system containing a plurality of identical processor elements each of which does not retain execution state information from prior operations. Hence, all processor elements are context free. Instructions are selected for execution based on instruction firing time. Each processor element is capable of executing instructions on a per-instruction basis such that dependent instructions can execute on the same or different processor elements. A given processor element in the present invention is capable of executing an instruction from one context followed by an instruction from another context. All context information necessary for processing a given instruction is contained elsewhere in the system.

The system and method of the present invention are described in the following drawing and specification.

DESCRIPTION OF THE DRAWING

FIG. 1 is the generalized flow of the TOLL software of the present invention;

FIG. 2 is a graphic representation of a sequential series of basic blocks found within the conventional compiler output;

FIG. 3 is a graphical presentation of the extended intelligence added to each basic block under the teachings of the present invention;

FIG. 4 is a graphical representation showing the details of the extended intelligence added to each instruction within a given basic block;

FIG. 5 is the breakdown of the basic blocks carrying the extended information into discrete execution sets;

GENERAL DESCRIPTION

1. Introduction

Figure 6:
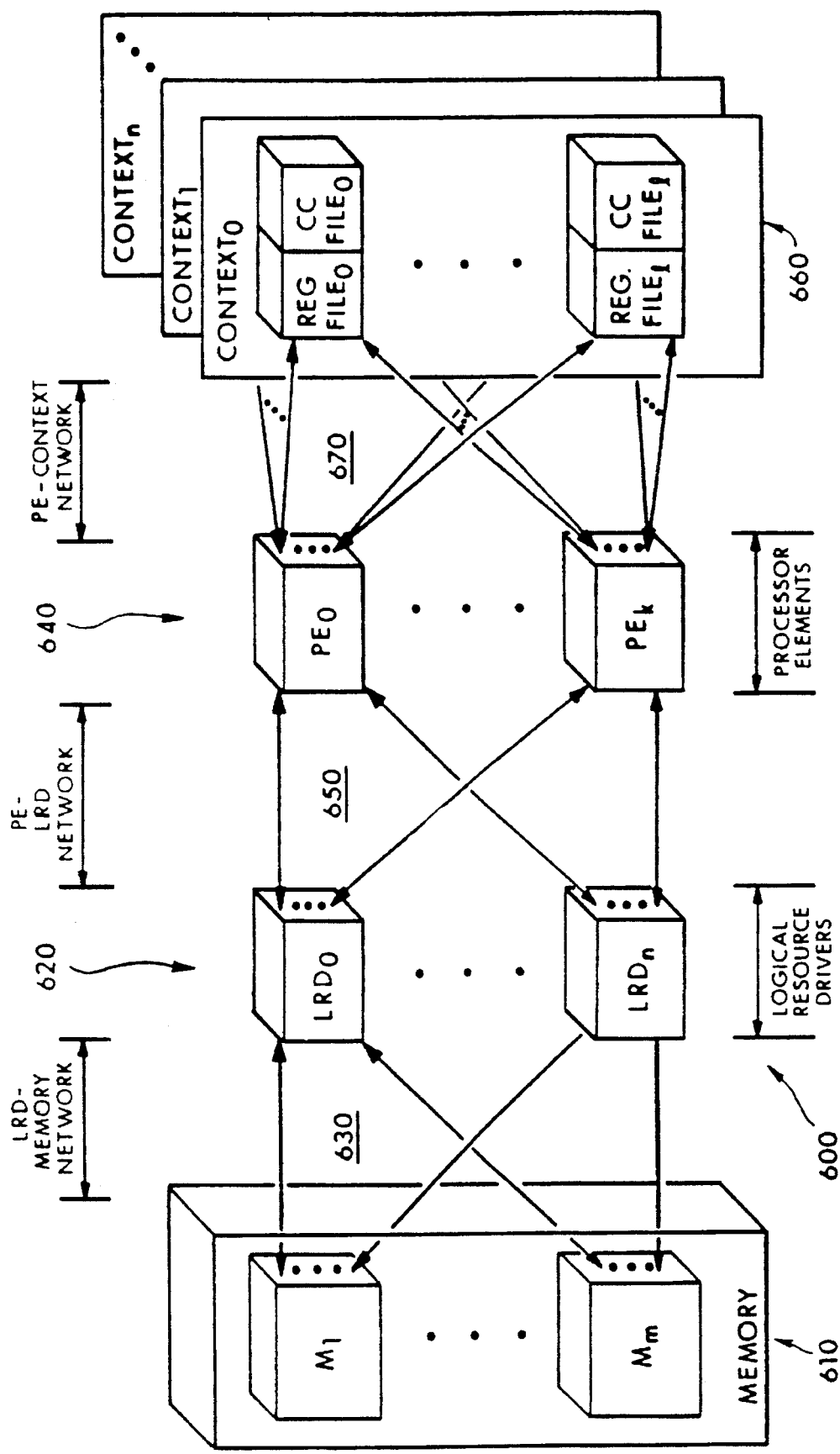
FIG. 6 is a block diagram presentation of the architectural structure of the present invention.

In the following two sections, a general description of the software and hardware of the present invention takes place. The system of the present invention is designed based upon a unique relationship between the hardware and software components. While many prior art approaches have primarily provided for multiprocessor parallel processing based upon a new architecture design or upon unique software algorithms, the present invention is based upon a unique hardware/software relationship. The software of the present invention provides the intelligent information for the routing and synchronization of the instruction streams through the hardware. In the performance of these tasks, the software spatially and temporally manages all user accessible resources, e.g., registers, condition codes, memory and stack pointers. This routing and synchronization is done without any user intervention, and does not require changes to the source code. Additionally, the analysis of an instruction stream to provide the additional intelligent information for routing and synchronization is performed only once during the program preparation process (i.e., static allocation) on a given piece of software, and is not performed during execution (i.e, dynamic allocation) as is found in some conventional prior art approaches. The analysis is performed on the object code output from conventional compilers and therefore is programming language independent.

2. General Software Description

In FIG. 1, the general description of the software of the present invention is set forth and is generally termed "TOLL." The software TOLL located in a processing system 160 operates on standard compiler output 100 which is typically object code or an intermediate object code such as "p-code." It is known that the output of conventional compilers is a sequential stream of object code instructions hereinafter referred to as the instruction stream. Conventional language processors typically perform the following functions in generating the sequential instruction stream:

1. lexical scan of the input text,
2. syntactical scan of the condensed input text including symbol table construction,
3. performance of machine independent optimization including parallelism detection and vectorization, and 4. an intermediate (PSEUDO) code generation including instruction functionality, resources required, and structural properties.

In the creation of the sequential instruction stream, the conventional compiler creates a series of basic blocks (BBs) which are single entry single exit (SESE) groups of contiguous instructions. See, for example, *Principles of Compiler Design*, Alfred v. Aho and Jeffery D. Ullman, Addison Wesley, 1979, pg. 6, 409, 412–413 and *Compiler Construction for Digital Computers,* David Gries, Wiley, 1971. The conventional compiler, although it utilizes basic block information in the performance of its tasks, provides an output stream of sequential instructions without any basic block designations. The TOLL software of the present invention is designed to operate on the formed basic blocks (BBs) which are created within a conventional compiler. In each of the conventional SESE basic blocks there is exactly one branch (at the end of the block) and there are no control dependencies; the only relevant dependencies within the block are those between the resources required by the instructions.

The output of the compiler 100 in the basic block format, is shown in FIG. 2. The TOLL software 110 of the present invention being processed in a computer 160 performs three basic determining functions on the compiler output 100 as shown in FIG. 1. These functions are to analyze the resource usage of the instructions 120, extend intelligence for each instruction in each basic block 130, and to build execution sets composed of one or more basic blocks 140. The resulting output of these three basic functions 120, 130, and 140 from processor 160 comprise the TOLL output 150 of the present invention.

At the outset, the TOLL software of the present invention operates on a compiler output 100 only once and without user intervention. Therefore, for any given program, the TOLL software need operate on the compiler output 100 only once.

The functions of the TOLL software 110 are to analyze the instruction stream in each basic block for natural concurrencies, to perform a translation of the instruction stream onto the actual hardware system of the present invention, to alleviate any hardware induced idiosyncracies that may result from this translation and to encode the resulting stream into an actual machine language to be used on the hardware of the present invention. The TOLL software 110 performs these features by analyzing the instruction stream and then assigning context free processor elements and resources as a result thereof. The TOLL software 110 provides the "synchronization" of the overall system by assigning appropriate firing times to each instruction in the instruction stream.

Instructions can be dependent on one another in a variety of ways although there are only three basic types of dependencies. First, there are procedural dependencies due to the actual structure of the instruction stream; i.e., instructions may follow one another in other than a sequential order due to branches, jumps, etc. Second, operational dependencies are due to the finite number of hardware elements present in the system. These hardware elements include the registers, condition codes, stack pointers, processor elements, and memory. Thus if two instructions are to execute in parallel, they must not require the same hardware element unless they are both reading that element (provided of course, that the element is capable of being read simultaneously). Finally, there are data dependencies between instructions in the instruction stream. This form of dependency will be discussed at length later. However, within a basic block only data and operational dependencies are present.

The TOLL software 110 maintains the proper execution of a program; i.e., TOLL must assure that the parallelized code 150 generates the same results as those of the original serial code. In order to do this, the parallelized code 150 must access the resources in the same relative sequence as the serial code for instructions that are dependent on one another; i.e., the relative ordering must be satisfied. However, independent sets of instructions may be effectively executed out of sequence.

In Table 1 is set forth an example of a SESE basic block representing the inner loop of a matrix multiply routine. This example will be used throughout this specification and the teachings of the present invention are application for any routine. The instruction is set forth in the left hand column and the conventional object code function for this basic block is represented in the right hand column.

TABLE 1

| INSTRUCTION | OBJECT CODE |
| --- | --- |
| LD R0, (R10) + | I0 |
| LD R1, (R11) + | I1 |
| MM R0, R1, R2 | I2 |
| ADD R2, R3, R3 | I3 |
| DEC R4 | I4 |
| BRNZR LOOP | I5 |

The instruction stream contained within the SESE basic block set forth in Table 1 performs the following functions. In instruction I0, register R0 is loaded with the contents of memory whose address is contained in R10. The instruction shown above increments the contents of R10 after the address has been fetched from R10. The same statement can be made for instruction I1, with the exception that register R1 is loaded and register R11 incremented. The contents of register R0 are then multiplied with the contents of register R1 and stored in register R2 in instruction I2. In instruction I3, the contents of register R2 and register R3 are added together and stored in register R3. In instruction I4, register R4 is decremented. Note that instructions I2, I3 and I4 also generate a set of condition codes that reflect the status of their respective execution. In instruction I5, the contents of register R4 are indirectly tested for zero (via the condition codes generated by instruction I4). A branch occurs if the decrement operation produced a non-zero value; otherwise execution proceeds with the next basic block's first instruction.

As shown in FIG. 1, the first function performed by TOLL 110 is to analyze the resource usage of the instructions; which in Table 1 are instructions I0 through I5. The TOLL software 110 analyzes each instruction to ascertain the resource requirements of each instruction.

This analysis is important in determining whether or not sets of resources share any elements and, therefore, whether or not the instructions are independent of one another. Clearly, mutually independent instructions can be executed in parallel and are termed naturally concurrent." Instructions that are independent can be executed in parallel and do not rely on one another for any information nor do they share any hardware resources in other than a read only manner.

On the other hand, instructions that are dependent on one another can be formed into a set wherein each instruction in the set is dependent on every other instruction in that set, although this dependency may not be direct. The set can be described by the instructions within that set, or conversely, by the resources used by the instructions in that set. Instructions within different sets are completely independent of one another, i.e., there are no resources shared by the sets. Hence, the sets are independent of one another.

In the example of Table 1, there are two independent sets of dependent instructions determined by TOLL:

| Set 1: | CC1: | I0, I1, I2, I3 |
|---|---|---|
| | | and |
| Set 2: | CC2: | I4, I5 |

As can be seen, instructions I4 and I5 are independent of instructions I0–I3. In set 2, I5 is directly dependent on I4. In set 1, I2 is directly dependent on I0 and I1. Instruction I3 is directly dependent on I2 and indirectly dependent on I0 and I1.

The TOLL software of the present invention detects these independent sets of dependent instructions and assigns condition codes sets such as CC1 and CC2 to each set. This avoids the operational dependency that would occur if only one set of condition codes were available to the instruction stream.

In other words, the results of the execution of instructions I0 and I1 are needed for the execution of instruction I2. Similarly, the results of the execution of instruction I2 are needed for the execution of instruction I3. Thus, the TOLL software 110 determines if an instruction will perform a read and/or a write to a resource. This functionality is termed the resource requirement analysis of the instruction stream.

It should be noted that, unlike the teachings of prior art, the present invention teaches that it is not necessary for dependent instructions to execute on the same processor element. The determination of dependencies is needed only to assign condition code sets and to assign instruction firing times, as will be described later. The present invention can execute dependent instructions on different processor elements because of the context free nature of the processor elements and the total coupling of the processor elements to the shared resources, such as register files, as will also be described later.

The results of the analysis stage 120, for the example set forth in Table 1, are set forth in Table 2.

TABLE 2

| BB | FUNCTION |
|---|---|
| I0 | Memory Read, Reg. Write, Reg. Read & Write |
| I1 | Memory Read, Reg. Write, Reg. Read & write |
| I2 | Two Reg. Reads, Reg. Write, Set Cond. Code (Set #1) |
| I3 | Two Reg. Reads, Reg. Write, Set Cond. Code (Set #1) |
| I4 | Read Reg., Reg. Write, Set Cond. Code (Set #2) |
| I5 | Read Cond. Code (Set #2) |

In Table 2, for instructions I0 and I1, a register is read and written followed by a memory read (at a distinct address), followed by a register write. Likewise, condition code writes and register reads and writes occur for instructions I2 through I4. Finally, instruction I5 is a simple read of a condition code storage and a resulting branch or loop.

The second pass 130 through the SESE basic block 100 is to add or extend the intelligence of each instruction within the basic block. This is the assignment of an instruction's execution time relative to the execution times of the other instructions in the stream, the assignment of a logical processor number on which the instruction is to execute and the assignment of any static shared context storage mapping information that may be needed.

In order to assign the instruction's firing time, the temporal usage of each resource required by the instruction must be considered. The temporal usage of each resource is characterized by a "free time" and a "load time." The free time is the last time the resource is used by an instruction. The load time is the last time the resource is modified by an instruction. If an instruction is going to modify a resource, it must execute after the last time the resource is used, in other words, after the free time. If an instruction is going to read the resource, it must perform the read after the last time the resource has been loaded, in other words, after the load time.

The link between the temporal usage of each resource and the actual usage of the resource is as follows. If the instruction is going to write/modify the resource, the last time the resource is read or written by other instructions (i.e., the "free time" for the resource) plus one time interval will be the firing time for this resource. The "plus one time interval" comes from the fact that an instruction is still using the resource during the free time. On the other hand, if the instruction reads a resource, the last time the resource is modified by other instructions (i.e., the load time for the resource) plus one time interval will be the resource firing time. The "plus one time interval" comes from the time required for the instruction that is performing the load to execute.

The above discussion assumes that the exact location of the resource that is accessed is known. This is always true of resources that are directly named such as registers and condition codes. However, memory operations may, in general, be to unknown (at compile time) locations. In particular, addresses that are generated by effective addressing constructs fall under this domain. In the previous example, it has been assumed (for the purposes of communicating the basic concepts of TOLL) that the addresses used by instructions I0 and I1 are distinct. If this were not the case, the TOLL software would assure that only those instructions that did not use memory would be allowed to execute in parallel with an instruction that was accessing an unknown location in memory.

The resource firing time is evaluated by TOLL 110 for each resource that the instruction uses. These resource firing times are then compared to determine which is the largest or latest with this maximum value determining the actual firing time assigned to the instruction. At this point, TOLL 110 then updates all resources' free and load times, to reflect this instruction's firing time. TOLL 110 then proceeds by analyzing the next instruction.

There are many methods available for determining inter-instruction dependencies within a basic block. The previous discussion is just one possible implementation assuming a specific compiler-TOLL partitioning. Many other compiler-TOLL partitionings and methods for determining inter-instruction dependencies may be possible and realizable to one skilled in the art. As an example, the TOLL software uses a linked list analysis to represent the data dependencies within a basic block. Other possible data structures that could be used are trees, stacks, etc.

Assume a linked list representation is desired for the analysis and representation of the inter-instruction dependencies. Each register is associated with a set of pointers to the instructions that use the value contained in that register. For the matrix multiply example in Table 1, the resource usage is set forth in the following:

TABLE 3

| Resource | Loaded By | Read By |
|---|---|---|
| R0 | I0 | I2 |
| R1 | I1 | I2 |
| R2 | I2 | I3 |

TABLE 3-continued

| Resource | Loaded By | Read By |
|---|---|---|
| R3 | I3 | I3, I2 |
| R4 | I4 | I5 |
| R10 | I0 | I0 |
| R11 | I1 | I1 |

Thus, by following the "read by" links and knowing the resource utilization for each instruction, the independencies of Sets 1 and 2, above, are constructed in the analyze instruction stage 120 by TOLL 110.

For purposes of the example of Table 1, it is assumed that the basic block commences with an arbitrary time interval, in an instruction stream, such as time interval, for example purposes only, T16. In other words, this particular basic block in time sequence is assumed to start with time interval T16. The results of the analysis in stage 120 are set forth in Table 4.

TABLE 4

| REG | I0 | I1 | I2 | I3 | I4 | I5 |
|---|---|---|---|---|---|---|
| R0 | T16 | | T17 | | | |
| R1 | | T16 | T17 | | | |
| R2 | | | T17 | T18 | | |
| R3 | | | | T18 | | |
| R4 | | | | | T16 | |
| CC1 | | | T17 | T18 | | |
| CC2 | | | | | | T17 |
| R10 | T16 | | | | | |
| R11 | | T16 | | | | |

The left hand column of Table 4 relates to the identity of the register or condition code storage whereas the rows in the table represent the instructions in the basic block example of Table 1. Instruction I0 requires that a register be read and written and another register written at time T16, the start of the basic block. Hence, at time T16, register R10 is read from and written into and register R0 is written into.

Under the teachings of the present invention, there is no reason that registers R1, R11, and R4 cannot also have operations performed on them during time T16. These three instructions, I0, I1, and I4, are data independent of each other and can be operated on concurrently during time T16. Instruction I2 requires first that registers R0 and R1 be operated on so that they may be multiplied together and the results stored in register R2. Although, register R2 could be operated on in time T16, instruction I2 is data dependent and depends upon the results of loading registers R0 and R1, which occurs during time T16. Therefore, the completion of instruction I2 is data dependent and must occur during or after timeframe T17. Hence, in Table 4 above, the entry T17 for the intersection of instruction I2 and register R2 is underlined because it is data dependent. Likewise, instruction I3 requires data to be present in register R2 which first occurs during time T17. Hence, register R2 can have an operation occur on it only during or after time T18. As it turns out, instruction I5 depends upon the reading of the condition code storage CC2 which is updated in instruction I4. The reading of the condition code storage is data dependent upon the results stored in time T16 and, therefore, must occur during or after the next time, T17.

Hence, in stage 130, the object code instructions are assigned "instruction firing times" (IFTs) as set forth in Table 5 based upon the above analysis.

TABLE 5

| OBJECT CODE | INSTRUCTION FIRING TIME (IFT) |
|---|---|
| I0 | T16 |
| I1 | T16 |
| I2 | T17 |
| I3 | T18 |
| I4 | T16 |
| I5 | T17 |

Each of the instructions in the sequential instruction stream in a basic block can be performed in the assigned time intervals. As is clear in Table 5, the same six instructions of Table 1 normally processed sequentially in six cycles can be processed, under the teachings of the present invention, in only three firing times: T16, T17, and T18. The instruction firing time (IFT) provides the "time-driven" feature of the present invention.

The next function in the extend intelligence stage 130 is to reorder the natural concurrencies in the instruction stream according to instruction firing times (IFTs) and then to assign the individual logical parallel processors. It should be noted that the reordering is only required due to limitations in currently available technology. If true fully associative memories were available, the reordering of the stream would not be required and the processor numbers could be assigned in a first come, first served manner. The hardware of the instruction selection mechanism could be appropriately modified by one skilled in the art to address this mode of operation.

For example, assuming currently available technology, and a system with four parallel processor elements (PEs) and a branch execution unit (BEU) within each LRD, the processor elements and the branch execution unit can be assigned, under the teachings of the present invention, according to that set forth in Table 6 below. It should be noted that the processor elements execute all non-branch instructions, while the branch execution unit (BEU) of the present invention executes all branch instructions. These will be described in greater detail subsequently.

TABLE 6

| Logical Processor Number | T16 | T17 | T18 |
|---|---|---|---|
| 0 | I0 | I2 | I3 |
| 1 | I1 | — | |
| 2 | I4 | — | — |
| 3 | — | — | — |
| BEU | — | I5 (delay) | — |

Hence, under the teachings of the present invention, during time interval T16, parallel processor elements 0, 1, and 2 concurrently process instructions I0, I1, and I4. Likewise, during the next time interval T17, parallel processor elements 0 and the user's BEU concurrently process instructions I2 and I5. And finally, during time interval T18, processor element 0 processes instruction I3. During instruction firing times T16, T17, and T18, parallel processor element 3 is not utilized in the example of Table 1. In actuality, since the last instruction is a branch instruction, the branch cannot occur until the last processing is finished in time T18 for instruction I3. A delay field is built into the processing of instruction I5 so that even though it is processed in time interval T17, its execution is delayed before looping or branching out until after instruction I3 has executed.

The TOLL software 110 of the present invention in the extend intelligence stage 130 looks at each individual instruction and its resource usage both as to type and as to location (if known) (e.g., Table 3). It then assigns instruction firing times (IFTs) on the basis of this resource usage (e.g., Table 4), reorders the instruction stream based upon these firing times (e.g., Table 5) and assigns logical processor numbers (LPNs) (e.g., Table 6) as a result thereof.

The extended intelligence information involving the logical processor number (LPN) and the instruction firing time (IFT) is added to each instruction of the basic block as shown in FIGS. 3 and 4. As will also be pointed out subsequently, this extended intelligence (EXT) for each instruction in a basic block (BB) will be translated onto the physical processor architecture of the present invention. The physical translation is done by hardware. It is important to note that the actual hardware may contain less, the same as, or more physical processor elements than the number of logical processor elements.

The Shared Context Storage Mapping (SCSM) information shown in FIG. 4 and attached to an instruction has two components, static and dynamic. Static information is attached by the TOLL software or compiler and is a result of the static analysis of the instruction stream. Dynamic information is attached at execution time by a logical resource drive (LRD) as will be discussed later.

At this stage 130, the TOLL software 110 has analyzed the instruction stream as a set of single entry single exit (SESE) basic blocks (BBs) for natural concurrencies that can be processed individually by separate processor elements (PEs) and has assigned to each instruction an instruction firing time (IFT) and a logical processor number (LPN). Under the teachings of the present invention, the instruction stream is pre-processed by TOLL to statically allocate all processing resources in advance of execution. This is done once for any given program and is applicable to any one of a number of different program languages such as FORTRAN, COBOL, PASCAL, BASIC, etc.

In stage 140, the TOLL software 110 builds execution sets (ESs). These are set forth in FIG. 5 wherein a series of basic blocks (BBs) form a single execution set (ES). Once TOLL identifies an execution set 500, header 510 and/or trailer 520 information is placed on the ends. In the preferred embodiment only header information 510 is attached although the invention is not so limited.

Under the teachings of the present invention, basic blocks generally follow one another in the instruction stream. There may be no need for re-ordering of the basic blocks even though individual instructions within a basic block, as discussed above, are re-ordered and assigned extended intelligence information. However, the invention is not so limited. Each basic block is single entry and single exit (SESE) with the exit through a branch instruction. Typically, the branch to another instruction is within a localized neighborhood such as within 400 instructions of the branch. The purpose of forming the execution sets (stage 140) is to determine the minimum number of basic blocks that can exist within an execution set such that the number of "instruction cache faults" are minimized. In other words, in a given execution set, branches or transfers out of an execution set are statistically minimized. TOLL in stage 140 can use a number of conventional techniques for solving this linear programming-like problem which is based upon branch distances and the like. The purpose is to define an execution set as set forth in FIG. 5 so that the execution set can be placed in a hardware cache, as will be discussed subsequently, in order to minimize instruction cache faults (i.e., transfers out of the execution set).

What has been set forth above is an example shown in Tables 1 through 6 of TOLL software 110 in a single context of use. In essence, TOLL determines the natural concurrencies within the instruction streams for each basic block within a given program. TOLL adds an instruction firing time (IFT) and a logical processor number (LPN) to each instruction in the determined natural concurrencies. Hence, all processing resources are statically allocated in advance of processing. The TOLL software of the present invention can be used in a number of different programs, each being used by the same or different users on a processing system of the present invention as will be explained next.

3. General Hardware Description

In FIG. 6, the block diagram format of the system architecture of the present invention termed "TDA" is shown. The TDA system architecture 600 includes a memory sub-system 610 interconnected to a number of logical resource drivers (LRDs) 620 over a network 630. The logical resource drivers 620 are further interconnected to a group of context free processor elements 640 over a network 650. Finally, the group of processor elements 640 are connected to the shared resources containing a pool of register set and condition code set files 660 over a network 670. The LRD-memory network 630, the PE-LRD network 650, and the PE-context file network 670 are full access networks that could be composed of conventional crossbar networks, omega networks, banyon networks, or the like. The networks are full access (non-blocking in space) so that, for example, any processor element 640 can access any register file or condition code file in any context 660. Likewise, any processor element 640 can access any logical resource driver 620 and any logical resource driver 620 can access any portion of the memory subsystem 610. In addition, the PE-LRD and PE-context networks are non-blocking in time. In other words, these two networks guarantee access to any resource from any resource regardless of load conditions on the network. The architecture of the switching elements of the PE-LRD network 650 and the PE-context network 670 are considerably simplified since the TOLL software guarantees that collisions in the network will never occur. The diagram of FIG. 6 is a MIMD system wherein one context 660 corresponds to at least one user program.

The memory subsystem 610 can be constructed using a conventional memory architecture and conventional memory elements. There are many such architectures and elements that could be constructed by a person skilled in the art that would satisfy the requirements of this system. For example, a banked memory architecture could be used. *High Speed Memory Systems,* A. V. Pohm and O. P. Agrawal, Beston Publishing Co., 1983.

The logical resource drivers 620 are unique to the system architecture 600 of the present invention. Each LRD provides the data cache and instruction selection support for a single user (who is assigned a context) on a timeshared basis. The LRDs receive execution sets from the various users wherein one or more execution sets per context is stored on any given LRD. The instructions within the basic blocks of the stored execution sets are stored in queues based on the logical processor number. For example, if the system has 64 users and 8 LRDs, 8 users would share an individual LRD on a timeshared basis. The operating system determines who gets an individual LRD and for how long. The LRD is detailed at length subsequently.

The context free processor elements 640 are also unique to the TDA system architecture and will be discussed later. These processor elements display the context free stochastic property in which the future state of the system depends only on the present state of the system and not on the path by which the present state was achieved. As such, architecturally, the context free processor elements are uniquely different from conventional processor elements in two ways. First, the elements have no internal permanent storage or remnants of past events such as general purpose registers or program status words. Second, the elements do not perform any routing or synchronization functions. These tasks are performed by the software TOLL and are implemented in the LRDs. The significance of the architecture is that the context free processor elements of the present invention are a true shared resource to the LRDs.

Finally, the register set and condition code set files in contexts 660 can also be constructed of commonly available components such as AMD 29300 series register files, available from Advanced Micro Devices, 901 Thompson Place, P.O. Box 3453, Sunnyvale, Calif. 94088. However, the particular configuration of the files 660 as shown in FIG. 6 is unique under the teachings of the present invention and will be discussed later.

Figure 7A:
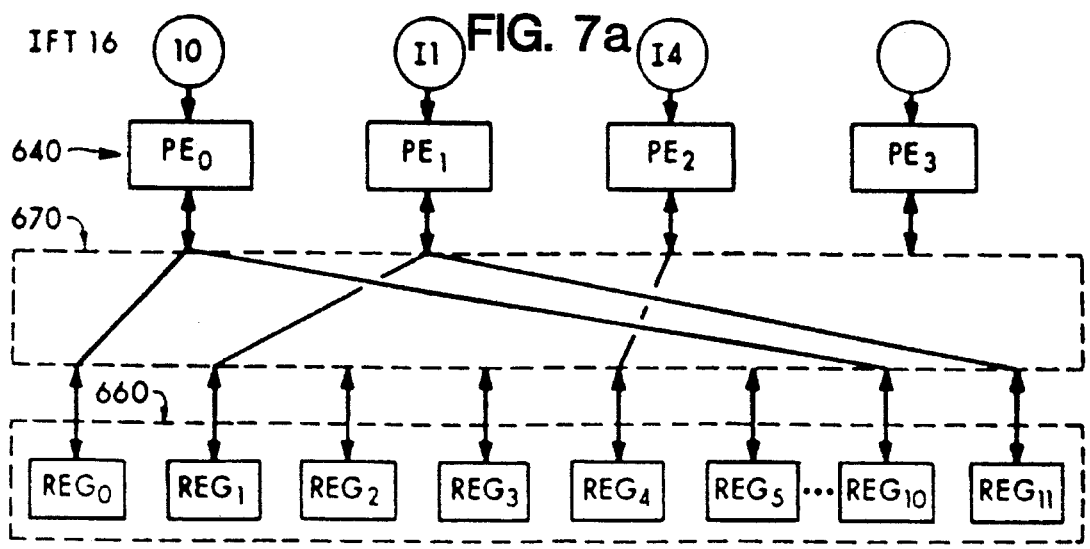
FIGS. 7a–7c represents an illustration of the network interconnections during three successive instruction firing times.
Figure 7B:
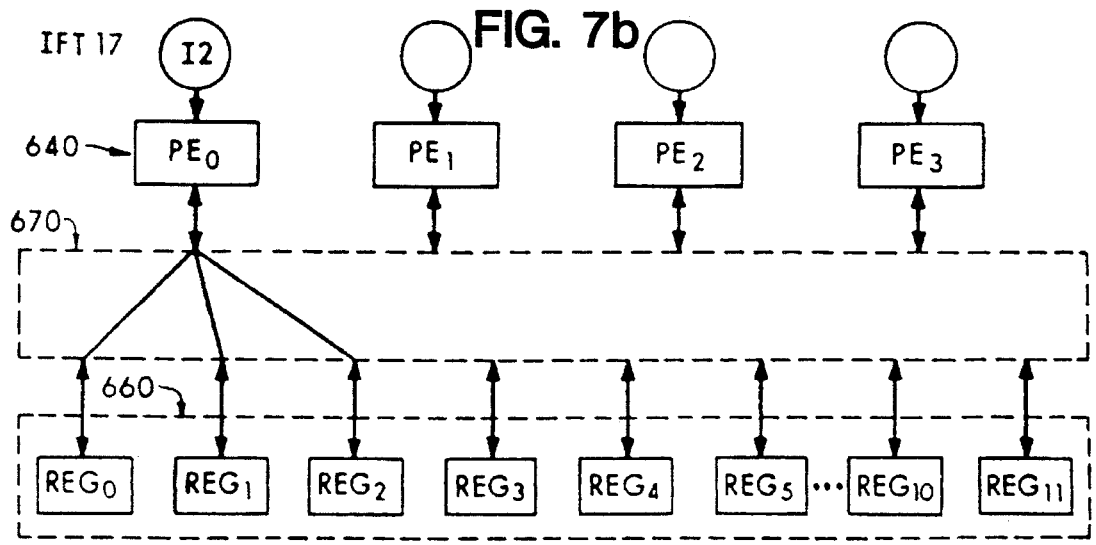
Figure 7C:
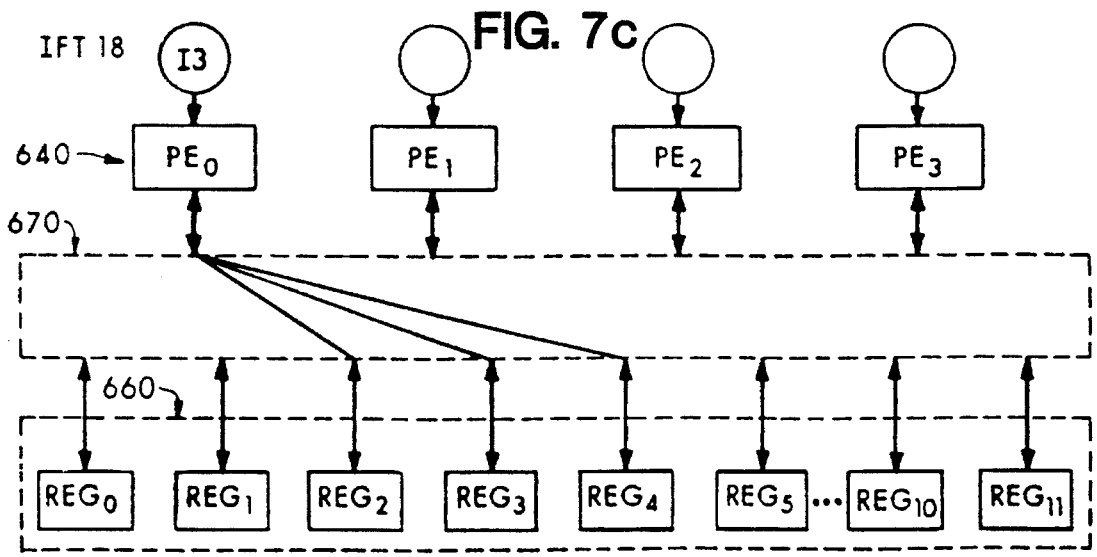

The general operation of the present invention based upon the example set forth in Table 1 is illustrated with respect to the processor-context register file communication in FIGS. 7a, 7b, and 7c. As mentioned, the time-driven control of the present invention is found in the addition of the extended intelligence relating to the logical processor number (LPN) and the instruction firing time (IFT) as specifically set forth in FIG. 4. FIG. 7 generally represents the configuration of the context free processor elements PE0 through PE4 with registers R0 through R4, R10 and R11 of the register set and condition code set file 660.

In explaining the operation of the TDA system architecture 600 for the single user example in Table 1, reference is made to Tables 3 through 5. In the example, for instruction firing time T16, the context-PE network 670 is set up to interconnect processor element PE0 with registers R0 and R10, processor element PE1 is interconnected with registers R1 and R11 processor element PE2 is interconnected with register R4. Hence, during time T16, the three processor elements PE0, PE1, and PE2 process instructions I0, I1, and I4 concurrently and store the results in registers R0, R10, R1, R11, and R4. During time T16, the LRD 620 selects and delivers the instructions that can fire during time T17 to the appropriate processor elements. During instruction firing time T17, only processor element PE0 which is now assigned to process instruction I2 and it is interconnected with registers R0, R1, and R2. The BEU is also connected to the condition codes (not shown). Finally, during instruction firing time T18, only processor element PE0 is interconnected to registers R2 and R3.

Several important observations need to be made. First, when a particular processor element (PE) places the results in a given register, any processor element, during a subsequent instruction firing time (IFT), can be interconnected to that register when performing a subsequent operation. For example, processor element PE1 for instruction I1 loads register R1 with the contents of a memory location during IFT T16 as shown in FIG. 7a. During instruction firing time T17, processor element PE0 is now interconnected with register R1 to perform an additional operation on the results stored therein. Under the teachings of the present invention, each processor element (PE) is "totally coupled" to the necessary registers in the register file 660 during any particular instruction firing time (IFT) and, therefore, there is no need to move the data out of the register file for delivery to another resource; e.g. in another processor's register as in some conventional approaches.

In other words, under the teachings of the present invention, each process or element can be totally coupled, in any individual instruction firing time, to any one of the shared registers 660. In addition, under the teachings of the present invention, none of the processor elements has to contend (or wait) for the availability of a particular register or for results to be placed in a particular register as is found in some prior art systems. Also during any individual firing time, any processor element has full access to any configuration of registers in the register set file 660 as if such registers were their own internal registers.

Hence, under the teachings of the present invention, the added intelligence as shown in FIG. 4, is based upon detected natural concurrencies within the object code. The detected concurrencies are analyzed by TOLL which logically assigns individual logical processor elements (LPNs) to process the instructions in parallel, and assigns unique firing times (IFTs) so that each processor element (PE) for its given instruction will have all necessary resources available for processing according to its instruction requirements. In the above example, the logical processor numbers correspond to the actual processor assignment or LPN0 to PE0, LPN1 to PE1, LPN2 to PE2, and LPN3 to PE3. The invention is not so limited since any order such as LPN0 to PE1, LPN1 to PE2, etc. could be used. Or, if the TDA system had only more or less than four processors, a different assignment could be used as will be discussed.

The timing control for the TDA system is provided by the instruction firing times—i.e., time-driven. As can be observed in FIGS. 7a through 7c, during each individual instruction firing time, the TDA system architecture composed of the processor elements 640 and the PE-register set file network 670, takes on a new and unique and particular configuration fully adapted for the individual processor elements to concurrently process instructions while making full use of all the available resources. The processor elements are context free since data, condition, or information relating to past processing is not required, nor does it exist internally to the processor element. The processor elements of the present invention react only to requirements of each individual instruction and are interconnected to the necessary shared registers.

4. Summary

In summary, the TOLL software 110 for each different program or compiler output 100 de-analyzes the natural concurrencies existing in each single entry, single exit (SESE) basic block (BB) and adds intelligence comprising a logical processor number (LPN) and an instruction firing time (IFT) to each instruction. In a MIMD system of the present invention as shown in FIG. 6, each context would contain a different user executing the same or different programs. Each user is assigned a different context and as shown in FIG. 7, the processor elements (PEs) are capable of individually accessing the necessary resources such as registers and condition codes storage required by the instruction. The instruction itself carries the shared resource information (i.e., registers and condition code storage). Hence, the TOLL software statically allocates only once for each program the necessary information for controlling the processing of the instruction in the TDA system architecture in FIG. 6 to insure a time-driven decentralized control wherein the memory, the logical resource drivers, the processor elements, and the context shared resources are totally coupled through their respective networks in a pure, non-blocking fashion. The logical resource drivers (LRDs) are receptive of the basic blocks formed in an execution set and are responsible for delivering the instructions to the processor element 640 on a per instruction firing time (IFT) basis. While the example shown in FIG. 7 is a simplistic representation for a single user, it is to be expressly understood that the delivery by the logical resource driver 620 of the instructions to the processor elements 640, in a multi-user sense, makes full use of the processor elements as will be fully discussed subsequently. Because the timing and the identity of the shared resources and the processor elements are all contained within the extended intelligence added to the instructions by the TOLL software, each processor element 640 is context free and, in fact, from instruction firing time to instruction firing time can process individual instructions of different users and their respective context. As will be explained, in order to do this, the logical resource driver 520, in a predetermined order, deliver the instructions to the processor element 640 through the PE-LRD network 650.

DETAILED DESCRIPTION

1. Detailed Description of Software

Figure 8:
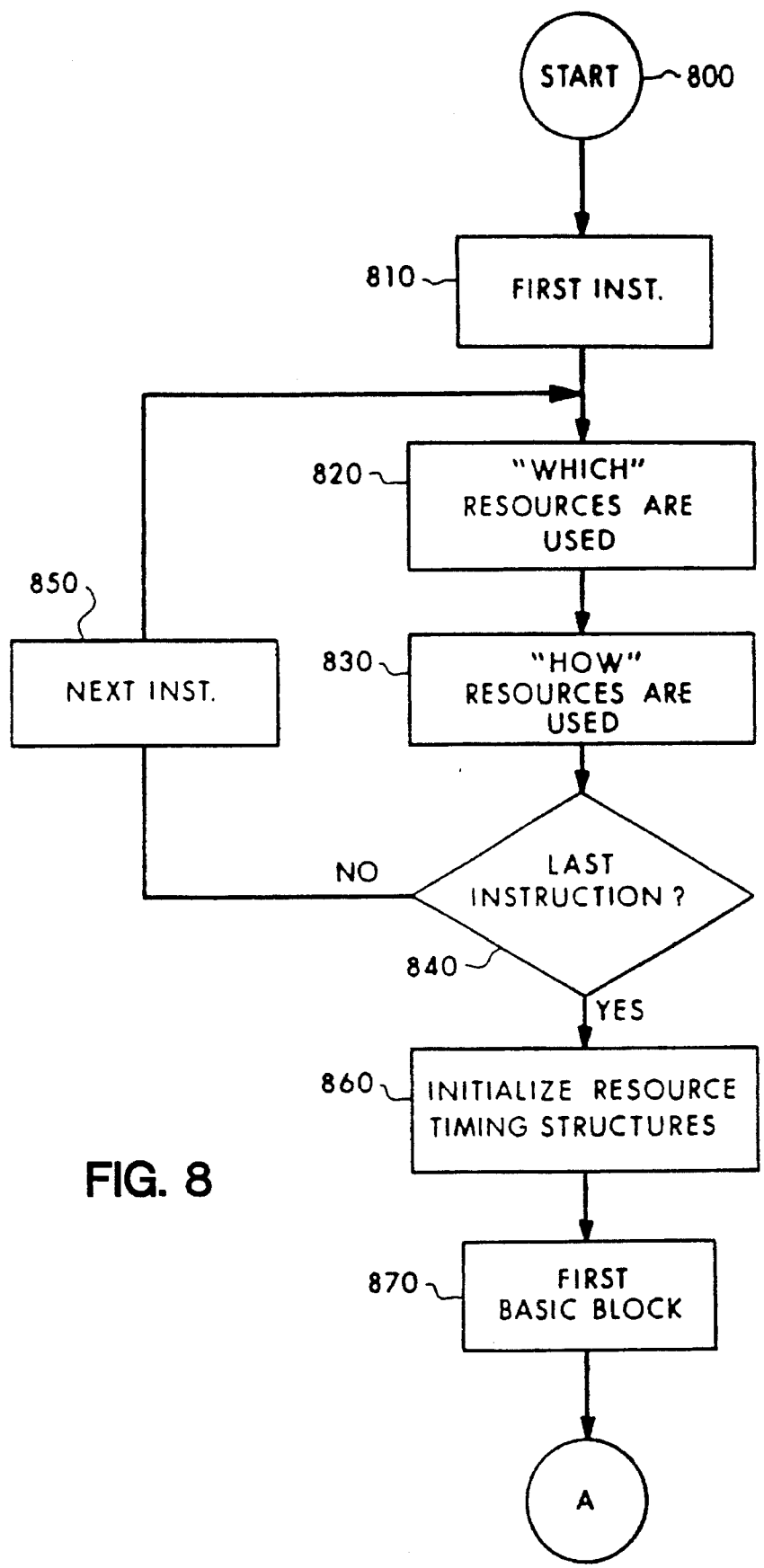
FIGS. 8–11 are the flow diagrams setting forth the program features of the software of the present invention.

In FIGS. 8 through 11, the details of the TOLL software 110 of the present invention are set forth. In FIG. 8, the conventional output from a compiler is delivered to the TOLL software at the start stage 800. The following information is contained within the conventional compiler output 800: (a) instruction functionality, (b) resources required by the instruction, (c) locations of the resources (if possible), and (d) basic block boundaries. TOLL software then starts with the first instruction at stage 810 and proceeds to determine "which" resources are used in stage 820 and to determine "how" the resources are used in stage 830. This continues for each instruction within the instruction stream through stages 840 and 850 and was discussed in the previous section.

When the last instruction is processed in stage 840, a table is constructed and initialized with the "free time" and "load time" for each resource. Such a table is set forth in Table 7 for the inner loop matrix multiply example and at initialization contains all zeros. The initialization occurs in stage 860 and once constructed the TOLL software proceeds to start with the first basic block in stage 870.

TABLE 7

| Resource | Load Time | Free Time |
|----------|-----------|-----------|
| R0       | T0        | T0        |
| R1       | T0        | T0        |
| R2       | T0        | T0        |
| R3       | T0        | T0        |
| R4       | T0        | T0        |
| R10      | T0        | T0        |
| R11      | T0        | T0        |

Figure 9:
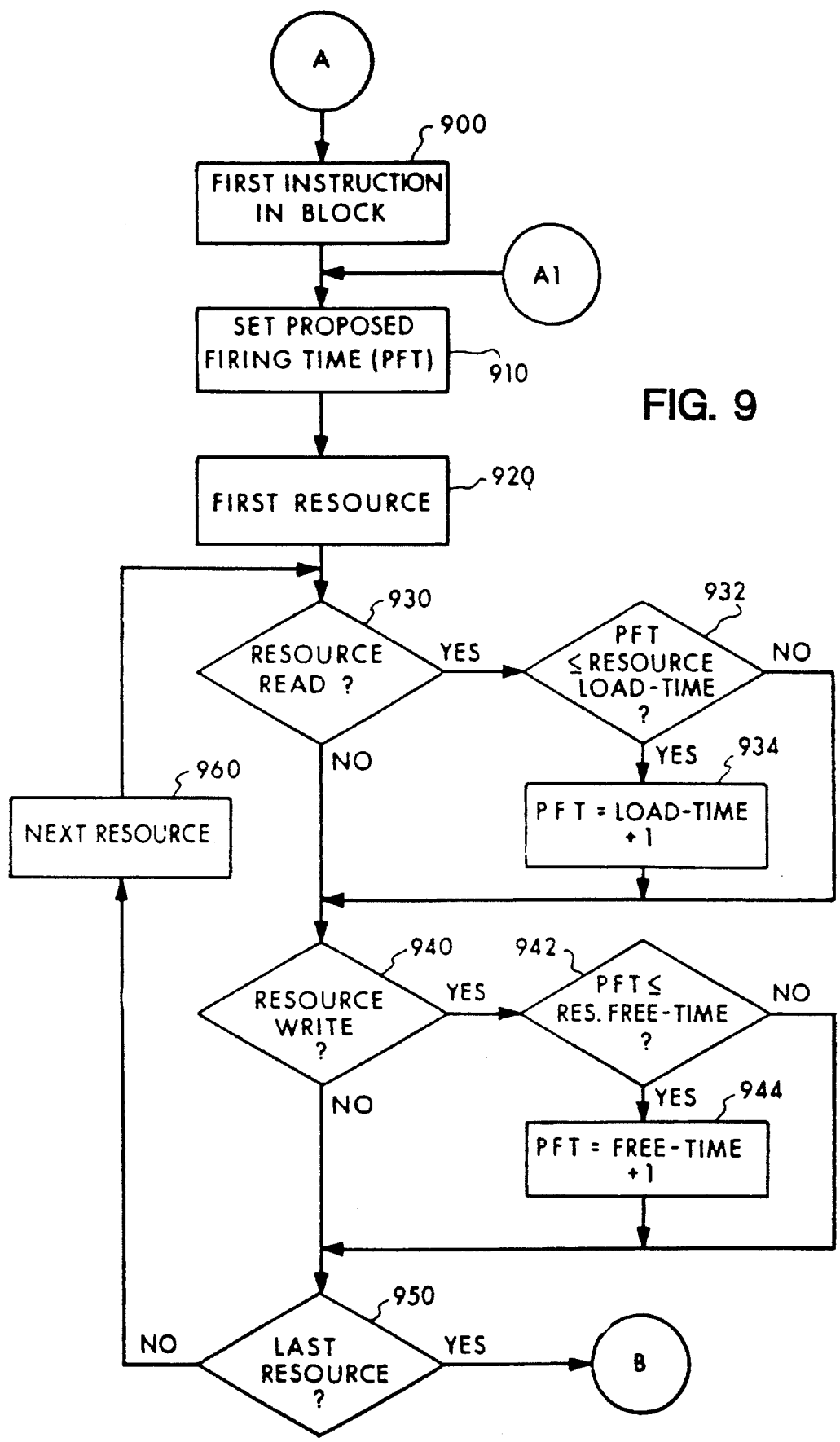

In FIG. 9, the TOLL software continues the analysis of the instruction stream with the first instruction of the next basic block in stage 900. As stated previously, TOLL performs a static analysis of the instruction stream. Static analysis assumes (in effect) straight line code, i.e., each instruction is analyzed as it is seen in a sequential manner. In other words, static analysis assumes that a branch is never taken. For non-pipelined instruction execution, this is not a problem, as there will never be any dependencies that arise as a result of a branch. Pipelined execution is discussed subsequently (although, it can be stated that the use of pipelining will only affect the delay value of the branch instruction).

Clearly, the assumption that a branch is never taken is incorrect. However, the impact of encountering a branch in the instruction stream is straightforward. As stated previously, each instruction is characterized by the resources (or physical hardware elements) it uses. The assignment of the firing time (and hence, the logical processor number) is dependent on how the instruction stream accesses these resources. Within TOLL, the usage of each resource is represented by data structures termed the free and load times for that resource. As each instruction is analyzed as it is seen, the analysis of a branch impacts these data structures in the following manner.

When all of the instructions of a basic block have been assigned firing times, the maximum firing time of the current basic block (the one the branch is a member of) is used to update all resources load and free times (to this value). When the next basic block analysis begins, the proposed firing time is then given as the last maximum value plus one. Hence, the load and free times for each of the register resources R0 through R4, R10 and R11 are set forth below in Table 8, for the example, assuming the basic block commences with a time of T16.

TABLE 8

| Resource | Load Time | Free Time |
|----------|-----------|-----------|
| R0       | T15       | T15       |
| R1       | T15       | T15       |
| R2       | T15       | T15       |
| R3       | T15       | T15       |
| R4       | T15       | T15       |
| R10      | T15       | T15       |
| R11      | T15       | T15       |

Hence, TOLL sets a proposed firing time (PFT) in stage 910 to the maximum firing time plus one of the previous basic blocks firing times. In the context of the above example, the previous basic blocks firing time is T15, and the proposed firing time for the instructions in this basic block commence with T16.

In stage 920, the first resource of the first instruction, which in this case is register R0 of instruction I0, is first analyzed. In stage 930 a determination is made as to whether or not the resource is read. In the above example, for instruction I0, register R0 is not read but written into and, therefore, stage 940 is next entered to make the determination of whether or not the resource is written. In this case, register R0 in instruction I0 is written into and stage 942 is entered. Stage 942 makes a determination as to whether the proposed firing time (PFT) for instruction I0 is less than or equal to the register resource free time for that resource. In this case, in Table 8, the resource free time for register R0 is T15 and, therefore, the instruction proposed firing time of T16 is greater than the resource free time of T15 and the determination is "no" and stage 950 is accessed.

The analysis by the TOLL software proceeds to the next resource which in the case for instruction I0 is register R10. This resource is both read and written by the instruction. Stage 930 is entered and a determination is made as to whether or not the instruction reads the resource. It does, so stage 932 is entered where a determination is made as to whether the current proposed firing time for the instruction (T16) is less than the resources load time (T15). It is not, so stage 940 is entered. Here a determination is made as to whether the instruction writes the resource—it does, so stage 942 is entered. In this stage a determination is made as to whether the proposed firing time for the instruction (T16) is less than the free time for the resource (T15). It is not, and stage 950 is accessed. The analysis by the TOLL software proceeds to the next resource which for instruction I0 is non-existent.

Figure 10:
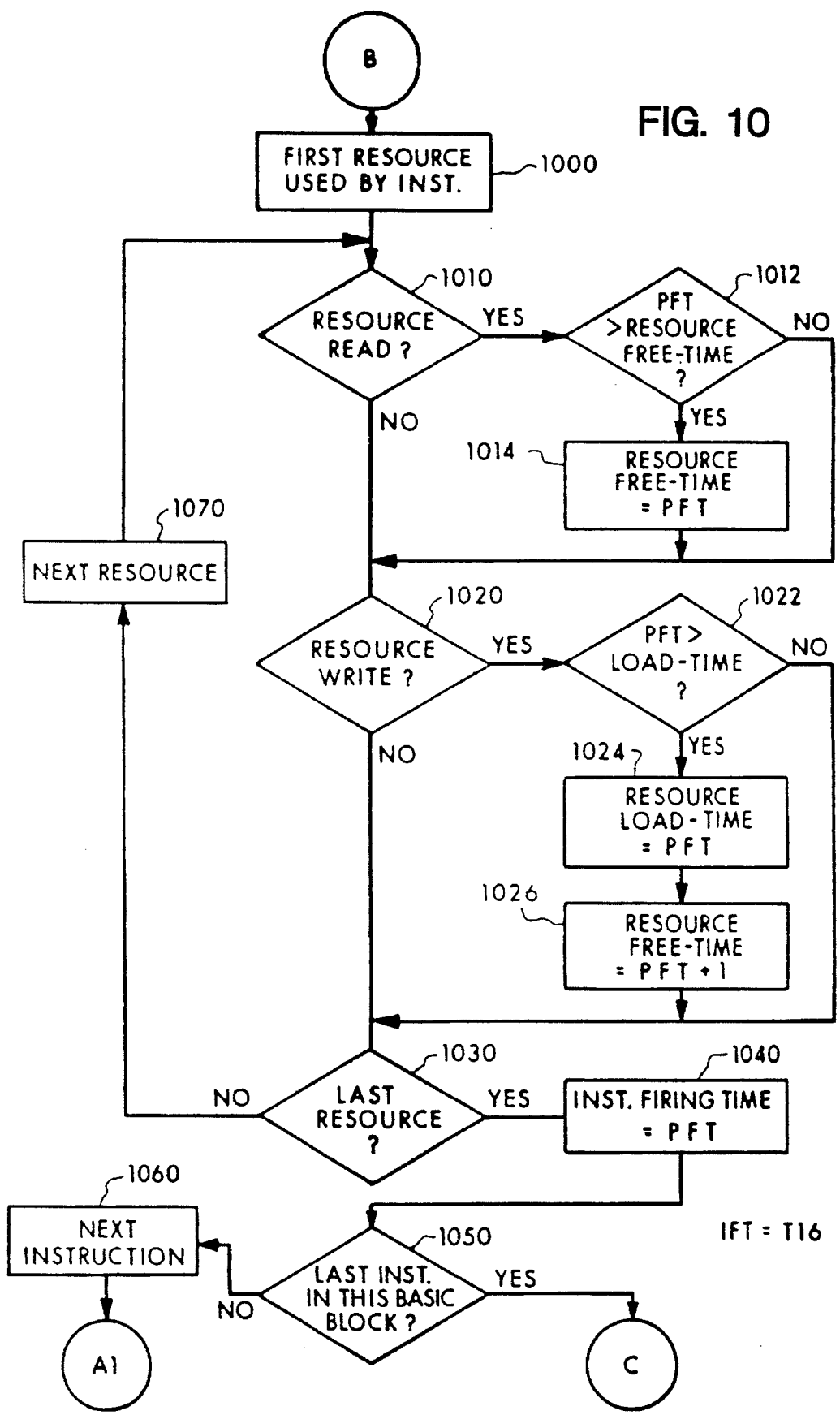

Hence, the answer to the determination of stage 950 is affirmative and the analysis then proceeds to FIG. 10. In FIG. 10, in stage 1000, the first resource for instruction I0 is register R0. The first determination in stage 1010 is whether or not the instruction reads the resource. As before, register R0 in instruction I0 is not read but written and the answer to this determination is "no" in which case the analysis then proceeds to stage 1020. In stage 1020, the answer to the determination as to whether or not the resource is written is "yes" and the analysis proceeds to stage 1022. Stage 1022 makes the determination as to whether or not the proposed firing time for the instruction is greater than the resource load time. In the example, the proposed firing time is T16 and with reference back to Table 8, the firing time T16 is greater than the load time T15 for register R0. Hence, the response to this determination is "yes" and stage 1024 is entered. In stage 1024, the resource load time is converted to the instructions proposed firing time and the table of resources updated to reflect that change. Likewise, stage 1026 is entered and the resource free time is updated to the instruction's proposed firing time plus one or T16 plus one equals T17.

Stage 1030 is then entered and a determination made as to whether there are any further resources used by this instruction. There are—register R10, and so analysis proceeds with this resource. Stage 1010 is entered where a determination is made as to whether or not the resource is read by the instruction. It is and so stage 1012 is entered where a determination is made as to whether the current proposed firing time (T16) is greater than the resources free time (T15). It is, so stage 1014 is entered where the resources free time is updated to reflect the use of this resource by this instruction. It is, and so stage 1022 is entered where a determination is made as to whether or not the current proposed firing time (T16) is greater than the load time of the resource (T15). It is, so stage 1024 is entered. In this stage, the resources load time is updated to reflect the firing time of the instruction, i.e., it is set to T16. Stage 1026 is then entered where the resource's free time is updated to reflect the execution of the instruction, i.e., it is set to T17. Stage 1030 is then entered where a determination is made as to whether or not this is the last resource used by the instruction. It is and stage 1040 is entered. The instruction firing time (IFT) is now set to equal the proposed firing time (PFT) of T16. Stage 1050 is then accessed which makes a determination as to whether or not this is the last instruction in the basic block which in this case is "no" and stage 1060 is entered to proceed to the next instruction, I1, which enters the analysis stage at A1 of FIG. 9.

In Table 9 below, that portion of the resource Table 8 is modified to reflect these changes. (Instructions I0 and I1 have been fully processed by TOLL.)

TABLE 9

| Resource | Load Time | Free Time |
| --- | --- | --- |
| R0 | T16 | T17 |
| R1 | T16 | T17 |
| R10 | T16 | T17 |
| R11 | T16 | T17 |

The next instruction in the example is I1 and the identical analysis is had for instruction I1 for registers R1 and R11 as presented for instruction I0 with registers R0 and R10. Hence, Table 9, above, also shows the update of the resource table to reflect the analysis of instruction I1.

The next instruction in the basic block example is instruction I2 which involves a read of registers R0 and R1 and a write into register R2. Hence, in stage 910 of FIG. 9, the proposed firing time for the instruction is set to T16 (T15 plus 1). Stage 920 is then entered and the first resource in instruction I2 is register R0. The first determination made in stage 930 is "yes" and stage 932 is entered. At stage 932, a determination is made whether the instruction's proposed firing time of T16 is less than or equal to the resource register R0 load time of T16. It is important to note that the resource load time for register R0 was updated during the analysis of register R0 for instruction I0 from time T15 to time T16. The answer to this determination in stage 932 is that the proposed firing time equals the resource load time (T16 equals T16) and stage 934 is entered. In stage 934, the instruction proposed firing time is updated to equal the resource load time plus one or in this case T16 plus one equals T17. The instruction I2 proposed firing time is now updated to T17. Now stage 948 is entered and since instruction I2 does not write resource R0, the answer to the determination is "no" and stage 960 is entered to process the next resource which in this case is register R1.

Stage 960 causes the analysis to take place for register R1 and a determination is made in stage 930 whether or not the resource is read. The answer, of course, is "yes" and stage 932 is entered. This time the instruction proposed firing time is T17 and a determination is made whether or not the instruction proposed firing time of T17 is less than or equal to the resource load time for register R1 which is T16. Since the instruction proposed firing time is greater than the register load time (T17 is greater than T16), the answer to this determination is "no" and stage 940 is entered which does not result in any action and, therefore, the analysis proceeds to stage 950. The next resource to be processed for instruction I2 in stage 960 is resource register R2.

The first determination of stage 930 is whether or not this resource R2 is read. It is not and hence the analysis moves to stage 940 and then to stage 942. At this point in time the instruction I2 proposed firing time is T17 and in stage 942 a determination is made whether or not the instructions proposed firing time of T17 is less than or equal to resources, R2 free time which in Table 8above is T15. The answer to this determination is "no" and therefore stage 950 is entered. This is the last resource processed for this instruction and the analysis continues in FIG. 10.

The analysis then proceeds to FIG. 10 and for instruction I2 the first resource R0 is analyzed. In stage 1010, the determination is made whether or not this resource is read and the answer is "yes." Stage 1012 is then entered to make the determination whether or not instruction I2 proposed firing time T17 is greater than the resource free time for register R0. In Table 9, the register free time for R0 is T17 and the answer to determination is "no" since both are equal. Stage 1020 is then entered which also results in a "no" answer transferring the analysis to stage 1030. Since this is not the last resource processed, stage 1070 is entered to advance the analysis to the next resource register R1. Precisely the same path through FIG. 10 occurs for register R1. Next, stage 1070 processes register R2. In this case, the answer to the determination of stage 1010 is "no" and stage 1020 is accessed. Since register R3 for instruction I2 is written, stage 1022 is accessed. In this case, the instruction I2's proposed firing time is T17 and the resource load time is T15 from Table 8. Hence, the proposed firing time is greater than the load time and stage 1024 is accessed. Stages 1024 and 1026 cause the load time and the free time for register R2 to be advanced, respectively, to T17 and T18 and the resource table is updated as shown in FIG. 10:

TABLE 10

| Resource | Load Time | Free Time |
| --- | --- | --- |
| R0 | T16 | T17 |
| R1 | T16 | T17 |
| R2 | T17 | T18 |

As this is the last resource processed, the proposed firing time of T17 becomes the actual firing time in stage 1040 and the next instruction is analyzed.

It is in this fashion that each of the instructions in the inner loop matrix multiply example are analyzed so that when fully analyzed the resource table appears in Table 11 below:

TABLE 11

| Resource | Load Time | Free Time |
| --- | --- | --- |
| R0 | T16 | T17 |
| R1 | T16 | T17 |
| R2 | T17 | T18 |
| R3 | T18 | T19 |
| R4 | T16 | T17 |
| R10 | T16 | T17 |
| R11 | T16 | T17 |

Figure 11:
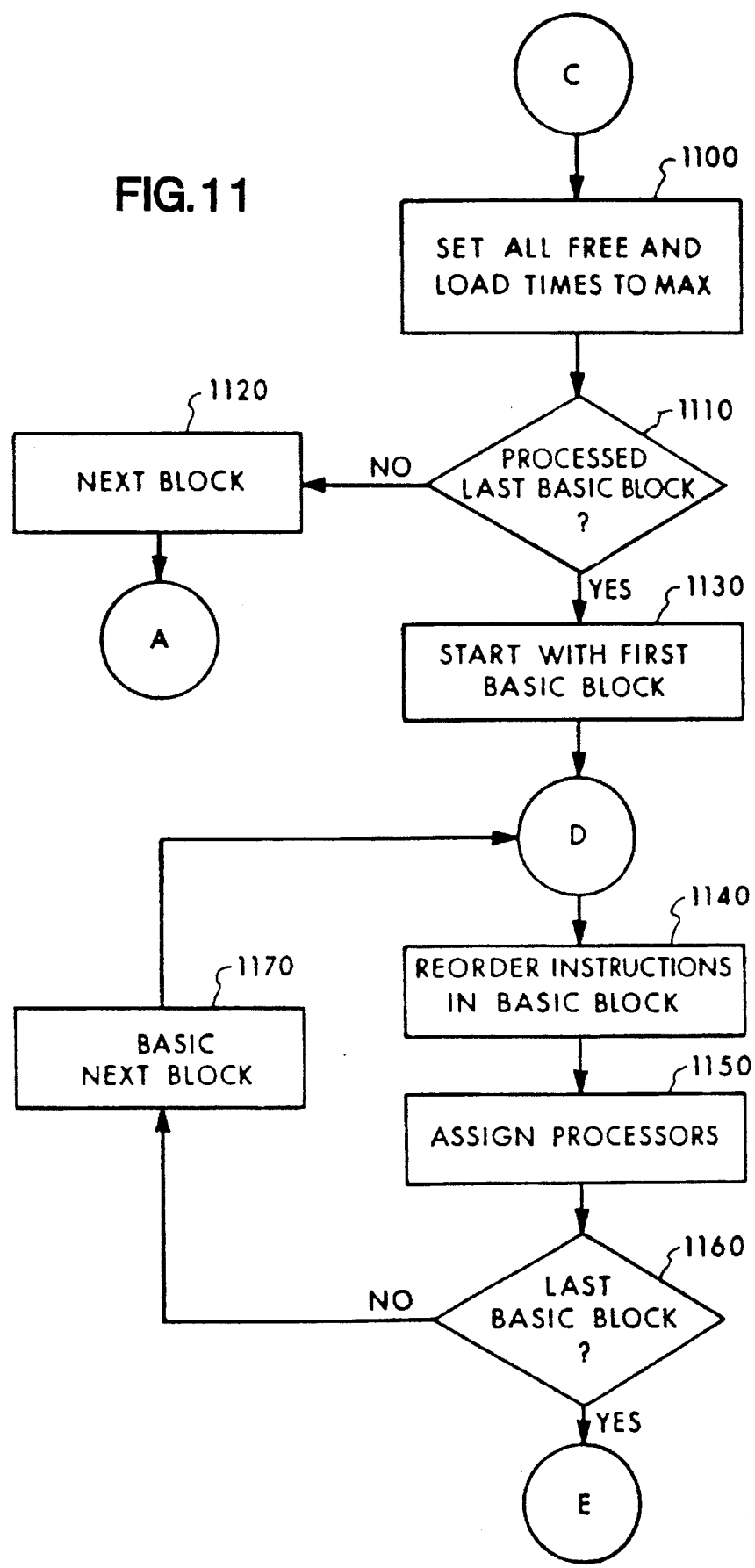

In FIG. 11, the TOLL software after performing the tasks set forth in FIGS. 9 and 10 enter stage 1100. Stage 1100 sets all resource free and load times to the maximum of those within the given basic block. For example, the maximum time set forth in Table 11 is T18 and, therefore, all free and load times are set to time T18. Stage 1110 is then entered to make the determination whether or not this is the last basic block for processing. If not, stage 1120 is entered to proceed with the next basic block and, if so, stage 1130 is entered and starts with the first basic block in the instruction stream. The purpose of this analysis is to logically reorder the instructions within each basic block and to assign logical processor numbers. This is summarized in Table 6 for the inner loop matrix multiply example. Stage 1140 performs the function of sorting the instruction in each basic block in ascending order using the instruction firing time (IFT) as the basis. Stage 1150 is then entered wherein the logical processor numbers (LPNs) are assigned. In making the assignment of the processor elements, the instructions are assigned as a set to the same instruction firing time (IFT) on a first come, first serve basis. For example, in reference back to Table 6, the first set of instructions for firing time T16 are I0, I1, and I4 are assigned respectively to processors PE0, PE1, and PE2. Next, during time T17, the second set of instructions I2 and I5 are assigned to processors PE0 and PE1, respectively. Finally, during the final time T18, the final instruction I3 is assigned to processor PE0. It is to be expressly understood that the assignment of the processor elements could be done in other fashions and is based upon the actual architecture of the processor element. As is clear, in the preferred embodiment the set of instructions are assigned to the logical processors on a first in time basis. After making the assignment, stage 1160 is entered to determine whether or not the last basic block has been processed and if not, stage I170 brings forth the next basic block and the process is repeated until finished.

Hence, the output of the TOLL software results in the assignment of the instruction firing time (IFT) for each of the instructions as shown in FIG. 4. As previously discussed, the instructions are reordered based upon the natural concurrencies appearing in the instruction stream according to the instruction firing times and, then, individual logical processors are assigned as shown in Table 6. While the above discussion has concentrated on the inner loop matrix multiply example, the analysis set forth in FIGS. 9 through 11 can be made on any SESE basic block (BB) in order to detect the natural concurrencies contained therein and then to assign the instruction firing times (IFTs) and the logical processor numbers (LPNs) for each user's program. This intelligence is then added to the reordered instructions within the basic block. This is only done once for a given program and provides the necessary time-driven decentralized control and processor mapping information to run on the TDA system architecture of the present invention.

Figure 12:
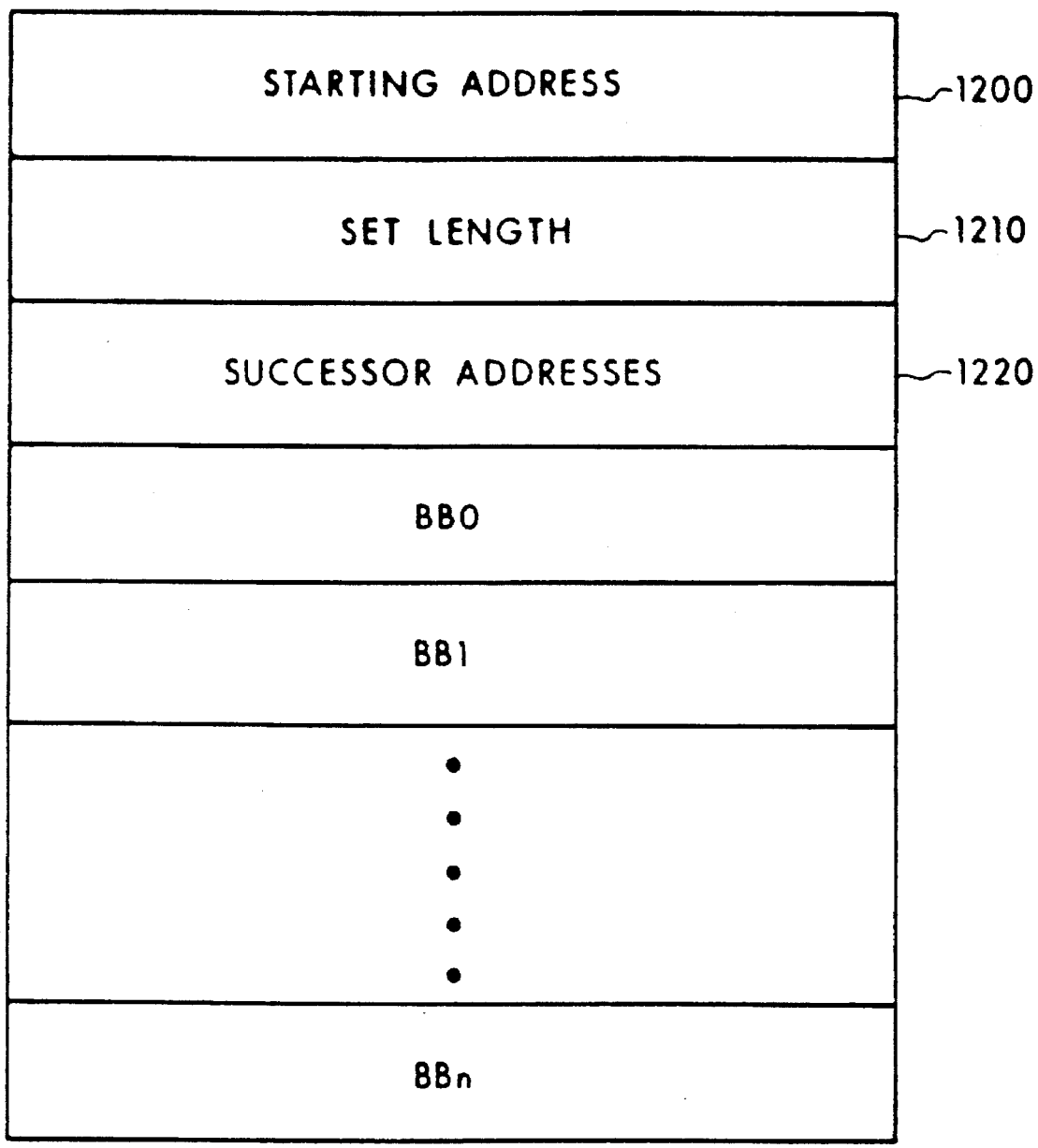
FIG. 12 is the flow diagram for determining the execution sets in the TOLL Software.

The purpose of execution sets, as shown in FIG. 12, is to optimize program execution by maximizing instruction cache hits within an execution set or, in other words, to statically minimize transfers by a basic block within an execution set to a basic block in another execution set. Support of execution sets consists of three major components: data structure definitions, pre-execution time software which prepares the execution set data structures, and hardware to support the fetching and manipulation of execution sets in the process of executing the program.

The execution set data structure consists of a set of one or more basic blocks and an attached header. The header contains the following information: the address 1200 of the start of the actual instructions (this is implicit if the header has a fixed length), the length of the execution set 1210 (or the address of the end of the execution set), and zero or more addresses 1220 of potential successor (in terms of program execution) execution sets.

The software to support execution sets manipulates the output of the post-compile processing which performs dependency analysis, resource analysis, resource assignment, and individual instruction stream re-ordering. The formation of execution sets uses one or more algorithms for determining the probable order and frequency of execution of basic blocks, and the grouping of basic blocks accordingly. The possible algorithms are similar to the algorithms used in solving linear programming problems for least-cost routing. In the case of execution sets, cost is associated with branching. Branching between basic blocks contained in the same execution set incurs no penalty with respect to cache operations: it is assumed that the basic blocks of an execution set are resident in the cache in the steady state. Cost is associated with branching between basic blocks in different execution sets, because the target execution set's basic blocks may not be in cache. Cache misses delay program execution while the retrieval of the appropriate block from main memory to cache is made.

There are several possible algorithms which can be used to assess and assign costs under the teaching of the present invention. One algorithm is the static branch cost approach. Here one begins by placing basic blocks into execution sets based on block contiguity and the maximum allowable execution set size (this would be an implementation limit, such as maximum instruction cache size). The information about branching between basic blocks is known and is an output of the compiler. Using this information, one calculates the "cost" of the resulting grouping of basic blocks into execution sets, based on the number of (static) branches between basic blocks in different execution sets. One can then use standard linear programming techniques to minimize this cost function, thereby obtaining the "optimal" execution set cover. This algorithm has the advantage of ease of implementation; however, it ignores the actual dynamic branching patterns during actual program execution.

Other algorithms could be used under the teachings of the present invention which provide better estimation of actual dynamic branch patterns. One example would be the collection of actual branch data from a program execution, and re-grouping of basic blocks using weighted assignment of branch costs based on the actual inter-block branching. Clearly, this approach is data dependent. Another approach would be to allow the programmer to specify branch probabilities, after which the weighted cost assignment would be made. This approach has the disadvantages of programmer intervention and programmer error. Still other approaches would be based using parameters, such as limiting the number of basic blocks per execution set, and applying heuristics to these parameters.

The algorithms described above are not unique to the problem of creating execution sets. However, the use of execution sets as a means of optimizing instruction cache performance is novel. Like the novelty of pre-execution time assignment of processor resources, the pre-execution time grouping of basic blocks for maximizing cache performance is not found in prior art.

The final element required to support execution sets is the hardware. As will be discussed subsequently, this hardware includes storage to contain the current execution set starting and ending addresses and to contain the other execution set header data. The existence of execution sets and the associated header data structures are, in fact, transparent to the actual instruction fetching from the cache to the processor elements. The latter depends strictly upon the individual instruction and branch addresses. The execution set hardware operates independently of instruction fetching to control the movement of instruction words from main memory to the instruction cache. This hardware is responsible for fetching basic blocks of instructions into the cache until either the entire execution set resides in cache or program execution has reached a point such that a branch has occurred to a basic block outside the execution set. At this point, if the target execution set is not resident in cache, the execution set hardware begins fetching the target execution set's basic blocks.

Figure 13:
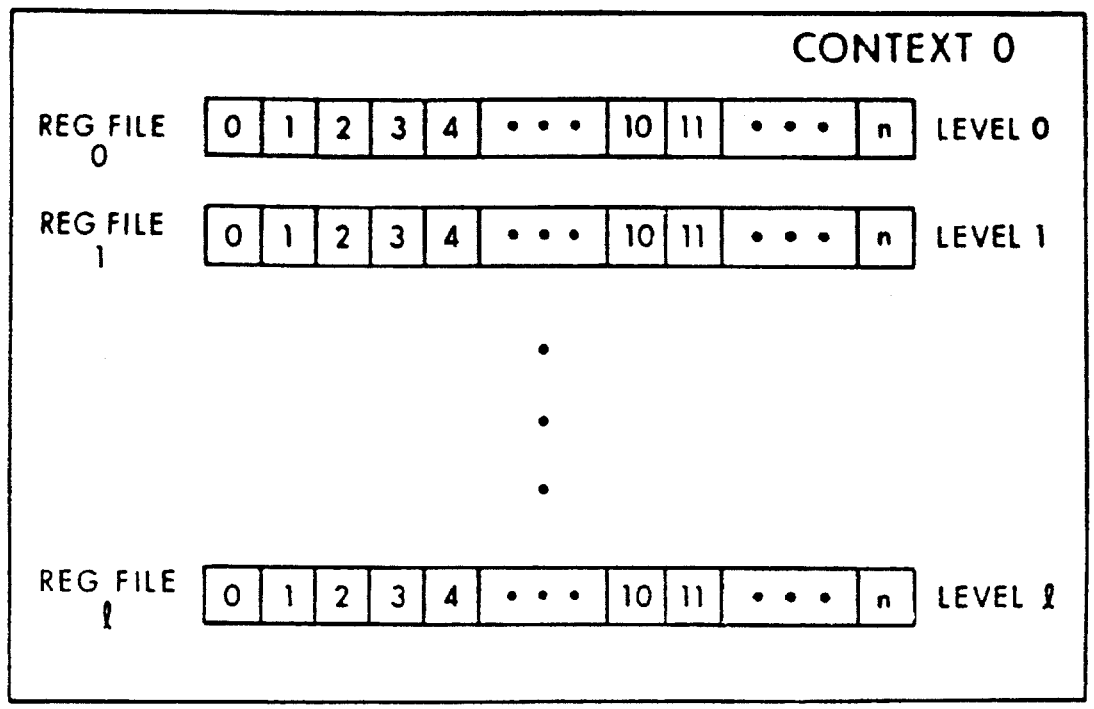
FIG. 13 sets forth the register file organization of the present invention.

In FIG. 13, the structure of the register set file of context zero of the contexts 660 is set forth. As shown in FIG. 13, there are L levels of register sets with each register set containing N separate registers. For example, N could equal 31 for a total of 32 registers. Likewise, the L could equal 15 for a total of 16 levels. Note that these registers are not shared between levels; i.e. each levels' set of registers is physically distinct from each other level.

Each level of registers corresponds to the registers available to a subroutine instantiation at a particular depth relative to the main program. In other words, level zero corresponds to the set of registers available to the main program, level one to any subroutine that is called directly from the main program. Level two corresponds to any subroutine called directly by a first level subroutine, level three to any subroutine called directly by a level two subroutine and so on.

As these sets of registers are independent, the number of levels corresponds to the number of subroutines that can be nested before having to physically share any registers between subroutines; i.e. before having to flush any registers to memory. The register sets in their different levels constitute a shared resource of the present invention and significantly saves system overhead in subroutine calls in that only rarely do sets of registers need to be pushed onto a stack in memory.

Communication between different levels of subroutines takes place in the preferred embodiment by allowing each routine three possible levels from which to obtain a register; the current level, the previous (calling) level and the global (main program) level. The designation of which level is to be accessed uses the static SCSM information attached to the instruction by the TOLL software. This can be illustrated by a subroutine call for a SINE function that takes as its argument a value representing an angular measure and returns the trigonometric SINE of that measure. This is set forth in Table 12:

TABLE 12

| Main Program | Purpose |
|---|---|
| LOAD X, R1 | Load X from memory into Reg R1 for parameter passing |
| CALL SINE | Subroutine Call - Returns result in Reg R2 |
| LOAD R2, R3 | Temporarily save results in Reg R3 |
| LOAD Y, R1 | Load Y from memory into Reg R1 for parameter passing |
| CALL SINE | Subroutine Call - Returns result in Reg R2 |
| MULT R2, R3, R4 | Multiply Sin (x) with Sin (y) and store result in Reg R4 |
| STORE R4, Z | Store final result in memory at Z |

The SINE subroutine is set forth in Table 13:

TABLE 13

| Instruction | Subroutine | Purpose |
|---|---|---|
| I0 | Load R1(10), R2 | Load Reg R2, level 1 with contents of Reg R1, level 0 |
| Ip-1 | (Perform SINE), R7 | Calculate SINE function and store result in Reg R7, level 1 |
| Ip | Load R7, R2(10) | |

Figure 14:
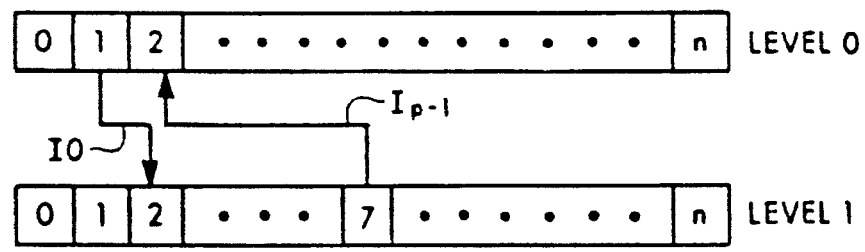
FIG. 14 illustrates the transfers between registers in levels during a subroutine call.

Hence, under the teachings of the present invention and with reference to FIG. 14, instruction I0 of the subroutine loads register R1 of the current level (the subroutine's level or called level) with the contents of register R2 from the previous level (the calling routine or level). Note that the subroutine has a full set of registers with which to perform the processing independent of the calling routines register set. Upon completion of the subroutine call, instruction Ip causes register R7 of the current level to be stored into register R2 of the calling routines level (which returns the results of the SINE routine back to the calling program's register set).

The transfer between the levels occurs through the use of the SCSM statically provided information which contains the current procedural level of the instruction (i.e., the called routine or level), the previous procedural level (i.e. the calling routine or level) and the context identifier. The context identifier is only used when processing a number of programs in a multiuser system. This is shown in Table 13 for register R1 (of the calling routine) as R1(10) and for register R2 as R2(10). Note all registers of the current level have appended an implied (00) signifying current procedural level.

This differs substantially from prior art approaches where physical sharing of registers occurs between registers of a subroutine and its calling routine. The limiting of the number of registers that are available for use by the subroutine requires more system overhead for storing registers in memory. See, for example, the MIPS approach as set forth in "Reduced Instruction Set computers" David A. Patterson, Communications of the ACM, January, 1985, Vol. 28, #1, Pgs. 8–21. In that reference, the first sixteen registers are local registers to be used by the subroutine, registers 16 through 23 are shared between the calling routine and the subroutine, and registers 24 through 31 are shared between the global (or main) program and the subroutine. Clearly, out of 32 registers that are accessible by the subroutine, only 16 can be privately used by the subroutine in the processing of its program. In the processing of complex subroutines, the remaining registers that are private to the subroutine may not (in general) be sufficient for the processing of the subroutine. Data shuffling (entailing the storing of intermediate data in memory) would occur resulting in significant overhead in the processing of the routine.

Under the teachings of the present invention, the transfers between the levels occur at compile time by adding the requisite information to the register identifiers as shown in FIG. 4, to appropriately map the instructions between the various levels. Hence, a completely independent set of registers are available to the calling routine and to each level of the subroutines. The calling routine, in addition to accessing its own complete set of registers, can also gain direct access to a higher set of registers using the aforesaid static SCSM mapping code added to the instruction as previously discussed. There is literally no reduction in the size of the register sets available to the subroutines as specifically found in prior art approaches. Furthermore, the mapping code for the SCSM information can be a field of sufficient length to access any number of desired levels. For example, a calling routine can access up to seven higher levels in addition to its own registers with a field of three bits. The present invention is not to be limited to any particular number of levels nor to any particular number of registers within a level. Under the teachings of the present invention, the mapping shown in FIG. 14 is a logical mapping and not a conventional physical mapping. For example, if three levels such as calling routine level, the subordinate level, and the global level, three bit maps are used: calling routine (00), subordinate level (01), and global level (11). Thus, each user's program is analyzed and the static SCSM window code added prior to the issuance of the user to a specific LRD. When the user is assigned to a specific LRD, the LRD dependent and dynamic SCSM information is added as it is needed.

2. Detailed Description of the Hardware

As shown in FIG. 6, the TDA system 600 of the present invention is composed of memory 610, logical resource drivers (LRD) 620, context free processor elements (PEs) 640, and shared context storage 660. The following detailed description starts with the logical resource drivers since the TOLL output is loaded into this hardware.

a. Logical Resource Drivers (LRDs)

Figure 15:
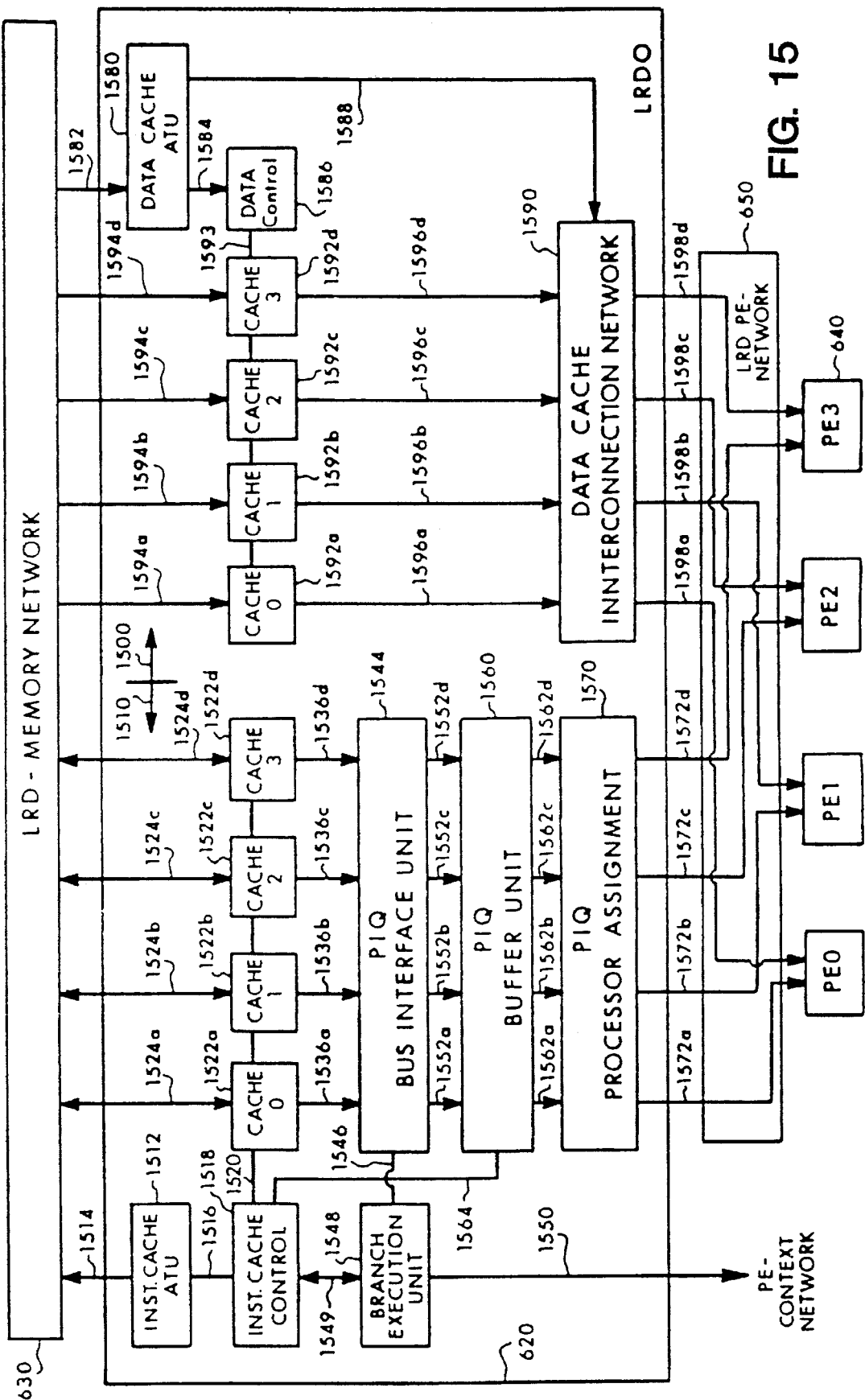
FIG. 15 sets forth the structure of the logical resource drivers (LRDs) of the present invention.

The details of an individual logical resource driver (LRD) are set forth in FIG. 15. As shown in FIG. 6, each logical resource driver 620 is interconnected to the LRD-memory network 630 on one side and to the processor elements 640 through the PE-LRD network 650 on the other side. If the present invention were a SIMD machine, then only one LRD is provided and only one context is provided. For MIMD capabilities one LRD and context is provided for each user so that in FIG. 6 up to "n" users are shown.

The logical resource driver 620 is composed of the data cache section 1500 and an instruction selection section 1510. In the instruction selection section, the following components are interconnected. The instruction cache address translation unit (ATU) 1512 is interconnected to the LRD-memory network 630 over bus 1514. The instruction cache ATU 1512 is further interconnected over bus 1516 to an instruction cache control circuit 1518. The instruction cache control circuit 1518 is interconnected over lines 1520 to a series of cache partitions 1522a, 1522b, 1522c, and 1522d. Each of the cache partitions are respectively connected over busses 1524a, 1524b, 1524c, and 1524d to the LRD-memory network 630. Each cache partition circuit is further interconnected over lines 1536a, 1536b, 1536c, and 1536d to a processor instruction queue (PIQ) bus interface unit 1544. The PIQ bus interface unit 1544 is connected over lines 1546 to a branch execution unit (BEU) 1548 which in turn is connected over lines 1550 to the PE-context network 670. The PIQ bus interface unit 1544 is further connected over lines 1552a, 1552b, 1552c, and 1552d to a processor instruction queue (PIQ) buffer unit 1560 which in turn is connected over lines 1562a, 1562b, 1562c, and 1562d to a processor instruction queue (PIQ) processor assignment circuit 1570. The PIQ processor assignment circuit 1570 is in turn connected over lines 1572a, 1572b, 1572c, and 1572d to the processor elements 640.

On the data cache portion 1500, the data cache ATU 1580 is interconnected over bus 1582 to the LRD-memory network 630 and is further interconnected over bus 1584 to the data cache control circuit 1586 and over lines 1588 to the data cache interconnection network 1590. The data cache control 1586 is also interconnected to data cache partition circuits 1592a, 1592b, 1592c and 1592d over lines 1593. The data cache partition circuits, in turn, are interconnected over lines 1594a, 1594b, 1594c, and 1594d to the LRD-memory network 630. Furthermore, the data cache partition circuits 1592 are interconnected over lines 1596a, 1596b, 1596c, and 1596d to the data cache interconnection network 1590. Finally, the data cache interconnection network 1590 is interconnected over lines 1598a, 1598b, 1598c, and 1598d to the PE-LRD network 650 and hence to the processor elements 640.

The operation of each logical resource driver (LRD) 620 shown in FIG. 15 will now be explained. As stated previously, there are two sections to the LRD, the data cache portion 1500 and the instruction selection portion 1510. The data cache portion 1500 acts as a high speed data buffer between the processor elements 640 and memory 610. Note that due to the number of memory requests that must be satisfied per unit time, the data cache 1500 is interleaved. All data requests made to memory by the processor element 640 are issued on the data cache interconnection network 1590 and intercepted by the data caches 1592. The requests are routed to the appropriate data caches 1592 by the data cache interconnection network 1590 using the context identifier that is part of the dynamic SCSM information attached to each instruction by the LRD that is executed by the processors. The address of the desired datum determines which cache partition the datum resides in. If the requested datum is present (i.e., a cache hit occurs), the datum is sent back to the requesting processor element 640.

If the requested datum is not present, the address delivered to the cache 1592 is sent to the data cache ATU 1580 to be translated into a system address and this address is then issued to memory. In response, a block of data from memory (a cache line or block) is delivered into the cache partition circuits 1592 )Vunder control 1586. The requested data that is resident in this cache block is then sent through the data cache interconnection network 1590 to the requesting processor element 640. It is to be expressly understood that this is only one possible design. The data cache portion is of conventional design and many possible implementations are realizable to one skilled in the art. As the data cache is of standard functionality and design, it will not be discussed further.

The instruction selection portion 1510 of the LRD consists of three major functions; instruction caching, instruction queueing and branch execution. The system function of the instruction cache portion 1510 is typical of any instruction caching mechanism. It acts as a high speed instruction buffer between the processors and memory. However, the current invention presents methods for realizing this function that are unique.

The purpose of the instruction cache 1510 is to receive execution sets from memory, place the sets into the caches 1522 and furnish the instructions within the sets on an as needed basis to the processor elements 640. As the system contains multiple independent processors elements 640, requests to the instruction cache are for a set of concurrently executable instructions. Again, due to the number of requests that must be satisfied per unit time, the instruction cache is interleaved. The set size ranges from none to the number of processors available to the user. The sets are termed packets, although this does not necessarily imply that the instructions are stored in a contiguous manner. Instructions are fetched from the cache on the basis of their instruction firing time (IFT). The next instruction firing time register contains the firing time of the next packet of instructions to be fetched. This register may be loaded by the branch execution unit of the context as well as incremented by the cache control unit when an instruction fetch has been completed.

The next IFT register is a storage register that is accessible from the context control unit and the branch execution unit. Due to its simple functionality, it is not explicitly shown. Technically, it is a part of unit 1518, the instruction cache control unit, and is further buried in the control unit 1660. The key point here is that the NIFTR is merely a storage register and does not necessarily perform a sophisticated function.

The instruction cache portion 1510 receives an execution set from memory over bus 1524 and, in a round robin manner, places instructions word into each cache partition, 1522a, 1522b, 1522c and 1522d. In other words, each instructions in the execution set is delivered wherein the first instruction is delivered to cache partition 1522a, the second instruction to cache partition 1522b, the third instruction to cache partition 1522c and the fourth instruction to cache partition 1522d. The next instruction is then delivered to cache partition 1522a and so on until all of the instructions in the execution set are delivered into the cache partition circuits.

All the words delivered to the cache partitions are not necessarily stored in the cache. As will be discussed, the execution set header and trailer may not be stored. Each cache partition attaches a unique identifier (termed a tag) to all the information that is to be stored in that cache partition. This is used to verify that information obtained from the cache is indeed the information desired. When a packet of instructions is requested, each cache partition determines if the partition contains an instruction that is a member of the requested packet. If none of the partitions contain an instruction that is a member of the requested packet (i.e., a miss occurs), the execution set that contains the requested packet is requested from memory in a manner analogous to a data cache miss.

If a hit occurs (i.e., at least one of the partitions 1522 contain an instruction from the requested packet), the partition(s) attach any appropriate dynamic SCSM information to the instruction(s). The dynamic SCSM information which is attached to each instruction is important for multi-user applications. The dynamically attached SCSM information identifies the context, n, of FIG. 6 assigned to a given user. Hence, under the teachings of the present invention, the system 600 is capable of delay free switching among many user contexts without requiring a master processor or access to memory.

The instruction(s) are then delivered to the PIQ bus interface unit 1544 of the LRD 620 where it is routed to the appropriate PIQ buffers 1560 by the logical processor number (LPN) contained in the extended intelligence that the TOLL software attached to the instruction. The instructions in the PIQ buffer with 1560 are buffered up for assignment to the actual processor elements 640 which is performed by the PIQ processor assignment unit 1570. The assignment of the physical processor elements is performed on the basis of the number of processor elements currently available and the number of instructions that are available to be assigned. These numbers are dynamic. The selection process is set forth below.

Figure 16:
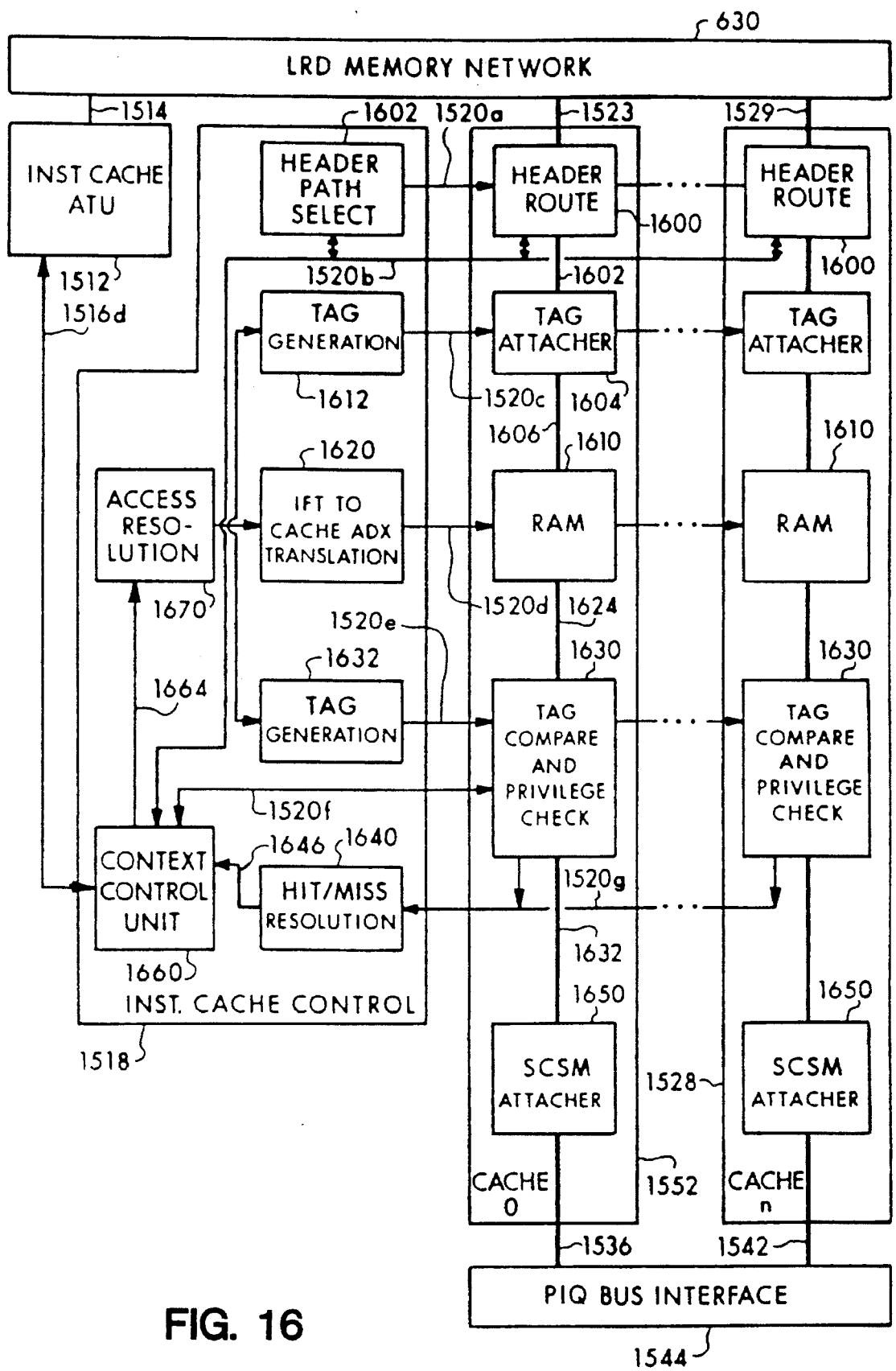
FIG. 16 sets forth the structure of the instruction caches control and of the caches of the present invention.

The details of the instruction cache control 1560 of each cache partition 1522 of FIG. 15 are set forth in FIG. 16. In each cache partition circuit 1522, five circuits are utilized. The first circuit is the header route circuit 1600 which routes an individual word in the header of the execution set over path 1520b to the instruction cache control unit 1660. The control of the header route circuit 1600 by the control unit 1660 is also over path 1520b through the header path select circuit 1602. The header path select circuit 1602 based upon the address received over lines 1502b from the control unit 1660 selectively activates the required number of header routers 1600 in the cache partitions. For example, if the execution set has two header words, only the first two header route circuits 1600 are activated by the header path select circuit 1602 which causes the header information to be delivered over bus 1520b to the control unit 1660 from the two activated header route circuits 1600. As mentioned, each word in the execution set is delivered to each successive cache partition circuit 1552.

Assume that the example of Table 1 comprises an entire execution set and that appropriate header words appear at the beginning of the execution set. The instructions with the earliest instruction firing times (IFTs) listed first and with the lowest logical processor number first are:

TABLE 14

| |
| --- |
| Header Word 1 |
| Header Word 2 |
| I0 (T16) (PE0) |
| I1 (T16) (PE1) |
| I4 (T16) (PE2) |
| I2 (T17) (PE0) |
| I5 (T17) (PEI) |
| I3 (T18) (PE0) |

Hence, the example of Table 1 (i.e., the matrix multiply inner loop, now has associated with it two header words and the extended information of the firing time (IFT) and the logical processor number (LPN). As shown in Table 14, the instructions were reordered by the TOLL software according to firing times. Hence, as the execution set shown in Table 14 is delivered through the LRD-memory network 630 from memory, the first word is routed by partition CACHE0 to the control unit 1660. The second word is routed by partition CACHE1 to the control unit 1660, instruction I0 is delivered into partition CACHE2, instruction I1 into partition CACHE3, instruction I2 into partition CACHE0, and so forth. As a result, the caches partition 1522 now contain the instructions as shown in Table 15:

TABLE 15

| Cache0 | Cache1 | Cache2 | Cache3 |
|---|---|---|---|
|  |  | I0 | I1 |
| I4 | I2 | I5 | I3 |

It is important to clarify, the above example has only one basic block in the execution set (i.e., a simplistic example). In actuality, an execution set would have a number of basic blocks.

The instructions are then delivered into a cache random access memory (RAM) 1610 resident in each cache for storage. Each instruction is delivered from the header router 1600 over a bus 1602 into the tag attaching circuit 1604 and then over line 1606 into the RAM 1610. The tag attacher circuit 1604 is under control of a tag generation circuit 1612 and is interconnected therewith over line 1520c. Cache RAM 1610 could be a conventional cache high speed RAM as found in conventional superminicomputers.

The tag generation circuit 1612 provides a unique identification code (ID) for attachment to each instruction before storage of that instruction in the designated RAM 1610. The assigning of process identification tags to instructions stored in cache circuits is conventional and is done to prevent aliasing of the instructions. "Cache Memories" by Alan J. Smith, ACM Computing Surveys, Vol. 14, September, 1982. The tag comprises a sufficient amount of information to uniquely identify it from each other instruction and user. The instructions already include the IFT and LPN, so that subsequently, when instructions are retrieved for execution, they can be fetched based on their firing times. As shown in Table 16, below, each instruction containing the extended information and the hardware tag is stored as shown for the above example:

TABLE 16

| CACHE0: | I4 (T16) (PE2) (ID2) |
|---|---|
| CACHE1: | I2 (T17) (PE0) (ID3) |
| CACHE2: | I0 (T16) (PE0) (ID0) |
|  | I5 (T17) (PE1) (ID4) |
| CACHE3: | I1 (T16) (PE1) (ID1) |
|  | I3 (T18) (PE0) (ID5) |

As stated previously, the purpose of the cache partition circuits 1552 is to provide a high speed buffer of the between the slow main memory 610 and the fast processor elements 640. Typically, the cache RAM 1610 is a high speed memory capable of being quickly accessed. If the RAM 1610 were a true associative memory; as can be witnessed in Table 16, each RAM 1610 could be addressed based upon instruction firing times (IFTs). At the present, such associative memories are not economically justifiable and an IFT to cache address translation circuit 1620 must be utilized. Such a circuit is conventional in design and controls the addressing of each RAM 1610 over bus 1520d. The purpose of circuit 1620 is to generate the RAM address of the desired instructions given the instruction firing time. Hence, for instruction firing time T16, CACHE0, CACHE2, and CACHE3, as seen in Table 16, would produce instructions I4, I0, and I1 respectively. Hence, when the cache RAMs 1610 are addressed, those instructions associated with a specific firing time are delivered into a tag compare and privilege check circuit 1630.

The purpose of the tag compare and privilege check circuit 1630 is to compare the hardware tags (ID) to the generated tags to verify that the proper instruction has been delivered. Again, the tag is generated through a generation circuit 1632 which is interconnected to the tag compare and privilege check circuit 1630 over line 1520e. A privilege check is also performed on the instruction delivered to verify that the operation requested by the instruction is permitted given the privilege status of the process (e.g., system program, application program, etc.) This is a conventional check performed by computer processors which support multiple levels of processing states. The hit/miss circuit 1640 determines which RAMs 1610 have delivered the proper instructions to the PIQ bus interface unit 1544 in response to a specific instruction fetch request.

For example, and with reference back to Table 16, if the RAMs 1610 are addressed by circuit 1620 for instruction firing time T16, CACHE0, CACHE2, and CACHE3 would respond with instructions thereby comprising a hit indication on those cache partitions. Cache 1 would not respond and that would constitute a miss indication and this would be determined by circuit 1640 over line 1520g. Likewise, for instruction firing time T16 three instructions are delivered. Each addressed instruction is then delivered over bus 1632 into the SCSM attacher 1650 wherein any dynamic SCSM information is added onto each instruction by the hardware 1650.

When all of the instructions associated with an individual firing time have been read from the RAM 1610, the hit and miss circuit 1640 over lines 1646 informs the instruction cache control unit 1660 of this information. The instruction cache control unit 1660 contains the next instruction firing time register 1518 which increments the instruction firing time to the next value. Hence, in the example, upon the completion of reading all instructions associated with instruction firing time T16, the instruction cache control unit 1660 increments to the next firing time, T17 and delivers this information over lines 1664 to the access resolution circuit 1670, and over lines 1666 to the tag compare and privilege check circuit 1630. Also note that there may be firing times which have no valid instructions, possibly due to operational dependencies detected by TOLL. In this case, no instructions would be fetched from the cache and transmitted to the PIQ.

The present invention can be a multiuser computer architecture capable of supporting several users simultaneously in both time and space. In previous prior art approaches (CDC, IBM, etc.), multiuser support was accomplished by timesharing the processor(s). In other words, the processors were shared in time. In this system, multiuser support is accomplished by assigning an LRD to each user that is given time on the processor elements. Thus, there is a spatial aspect to the sharing of the processor elements. The operating system of the machine would assign users to the LRDs in a timeshared manner, thereby adding the temporal dimension to the sharing of the processors.

Hence, multiuser support is accomplished by the multiple LRDs, the use of context free processor elements, and the multiple context support present in the register and condition code files. As several users may be executing in the processor elements at a time, additional pieces of information must be attached to each instruction prior to its execution in order to uniquely identify the instruction source and any resources that it may use. For example, a register identifier must contain the procedural level and context identifier as well as the actual register number. Memory addresses must also contain the LRD identifier that the instruction was issued from in order to get routed through the data cache interconnection network to the appropriate data cache.

The information comprises two components—static and dynamic and, as maintained, is termed shared context storage mapping (SCSM). The static information is composed of information that the compiler or TOLL can glean from the instruction stream. For example, the register window tag would be generated statically and attached to the instruction prior to its being received by an LRD.

The dynamic information is hardware attached to the instruction by the LRD prior to its issuance to the processors. This information is composed of the context/LRD identifier that is issuing the instruction, the current procedural level of the instruction, the process identifier of the current instruction stream, and the instruction status information that would normally be contained in the processors of a system with processors that are not context free. This later information would be composed of error masks, floating point format modes, rounding modes and so on.

The operation of the circuitry in FIG. 16 can be summarized as follows. One or more execution sets are delivered into the instruction cache circuitry of FIG. 16, the header information for each set is delivered to one or more successive cache partitions and is routed into the control unit 1660. The remaining instructions in the execution set are then individually, on a round robin basis, routed into each successive cache partition unit 1552, a hardware identification tag is attached to each instruction and it is stored in RAM 1610. As previously discussed, each execution set is of sufficient length to minimize instruction cache defaults and the RAM 1610 is of sufficient size to store the execution sets. When the processor elements require the information, the instructions stored in the RAMs 1610 are read out, the identification tags are verified and the privilege status checked. The number and cache locations of valid instructions matching the appropriate IFTs are determined. The instructions are then delivered to PIQ bus interface unit 1544. The information that is delivered to the PIQ bus interface unit 1544 is set forth in Table 17 including the identification tag (ID) and the hardware added SCSM information.

TABLE 17

| CACHE0: | I4 (T16) (PE2) (ID2) (SCSM0) |
|---|---|
| CACHE1: | I2 (T17) (PE0) (ID3) (SCSM1) |
| CACHE2: | I0 (T16) (PE0) (ID0) (SCSM2) |
|  | I5 (T17) (PE1) (ID4) (SCSM3) |
| CACHE3: | I1 (T16) (PE1) (ID1) (SCSM4) |
|  | I3 (T18) (PE0) (ID5) (SCSM5) |

Figure 17:
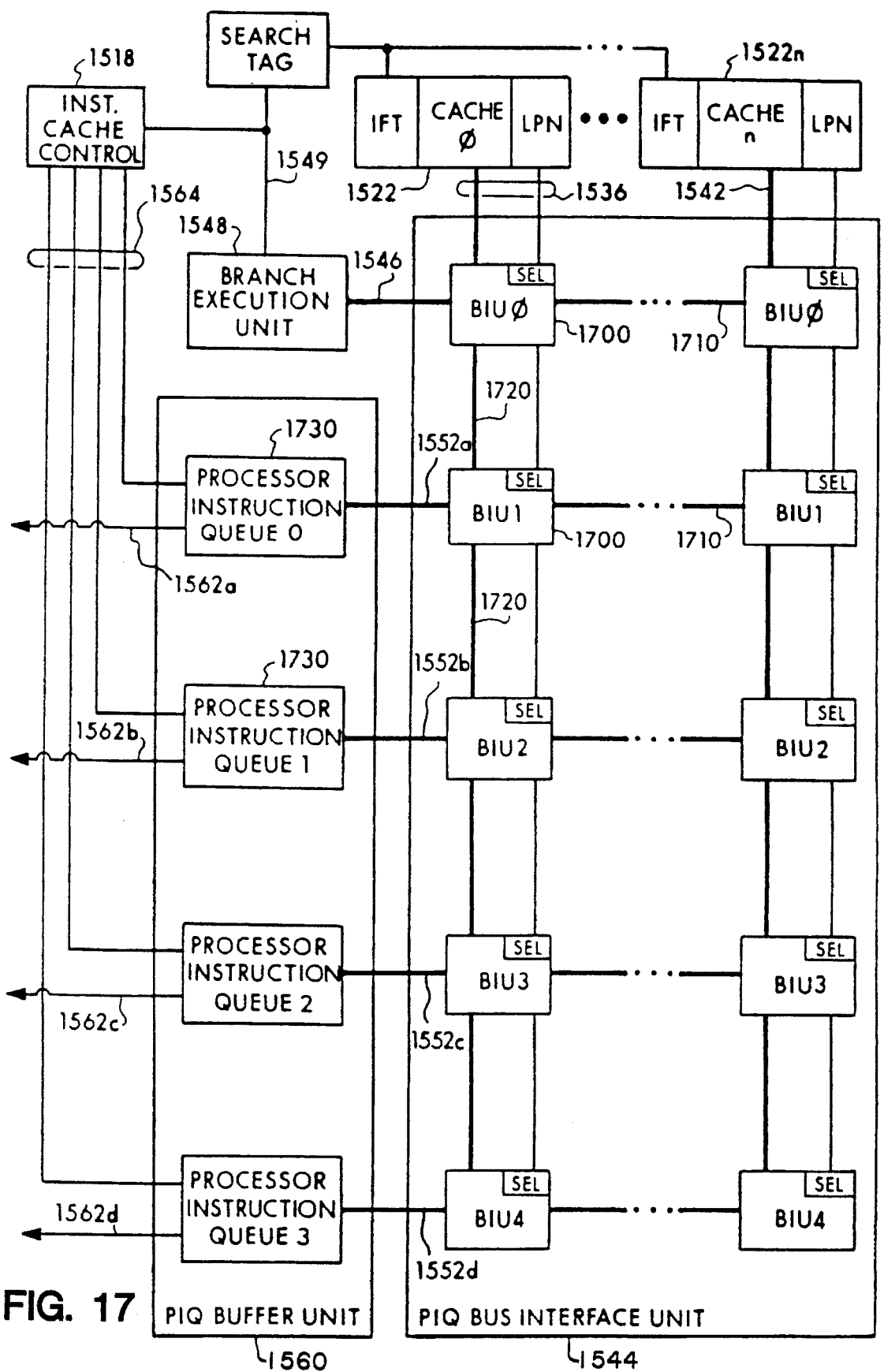
FIG. 17 sets forth the structure of the PIQ buffer unit and the PIQ bus interface unit of the present invention.

In FIG. 17, the details of the PIQ bus interface unit 1544 and the PIQ buffer unit 1560 are set forth. These circuits function as follows. The PIQ bus interface unit 1544 receives instructions as set forth in Table 17, above, over leads 1536. These instructions access, in parallel, a series of bus interface units (BIUs) 1700. The bus interface units 1700 are interconnected together in a full access non-blocking network by means of connections 1710 and 1720 over lines 1552 to the PIQ buffer unit 1560. Each bus interface unit (BIU) 1700 is a conventional address comparison circuit composed of: TI 74L85 4 bit magnitude comparators, Texas Instruments Company, P.O. Box 225012, Dallas, Tex. 75265. In the matrix multiply example, for instruction firing time T16, CACHE0 contains instruction I4 and CACHE3 (corresponding to CACHE N in FIG. 17) contains instruction I1. The logical processor number assigned to instruction I4 is PE2 and, therefore, the logical processor number PE2 activates a select (SEL) signal of the bus interface unit 1700 for processor instruction queue 2 (BIU3). In this example, only BIU3 is activated and the remaining bus interface units 1700 are not activated. Likewise, for CACHE3 (CACHE N), BIU2 is activated for processor instruction QUEUE 1.

The PIQ buffer unit 1560 is comprised of a number of processor instruction queues 1730 which store the instructions received from the PIQ bus interface unit 1544 in a first in-first out (FIFO) fashion as shown in Table 18:

TABLE 18

| PIQ0 | PIQ1 | PIQ2 | PIQ3 |
|---|---|---|---|
| I0 | I1 | I4 | — |
| I2 | — | — | — |
| I3 | — | — | — |

In addition to performing instruction queueing functions, the PIQs 1730 also keep track of the execution status of each instruction that are issued to the processor elements 640. In an ideal system, instructions could be issued to the processor elements every clock cycle without worrying about whether or not the instructions have finished execution. However, the processor elements 640 in the system may not be able to complete an instruction every clock cycle due to exceptional conditions occurring, such as a data cache miss and so on. As a result, each PIQ 1730 tracks all instructions that it has issued to the processor elements 640 that are still in execution. The primary result of this tracking is that the PIQ's 1730 perform the instruction clocking function for the LRD 620. In other words, the PIQs 1730 determine when the next firing time register can be updated when executing straight-line code. This in turn begins a new instruction fetch cycle.

Instruction clocking is accomplished by having each PIQ 1730 form an instruction done signal that specifies that the instruction(s) issued by a given PIQ have executed or proceeded to the next stage in the case of pipelined PEs. This is then combined with all other PIQs instruction done signals from this LRD and used to gate the increment signal that increments the next firing time register. These signals are delivered over lines 1564 to the instruction cache control 1518.

Figure 18:
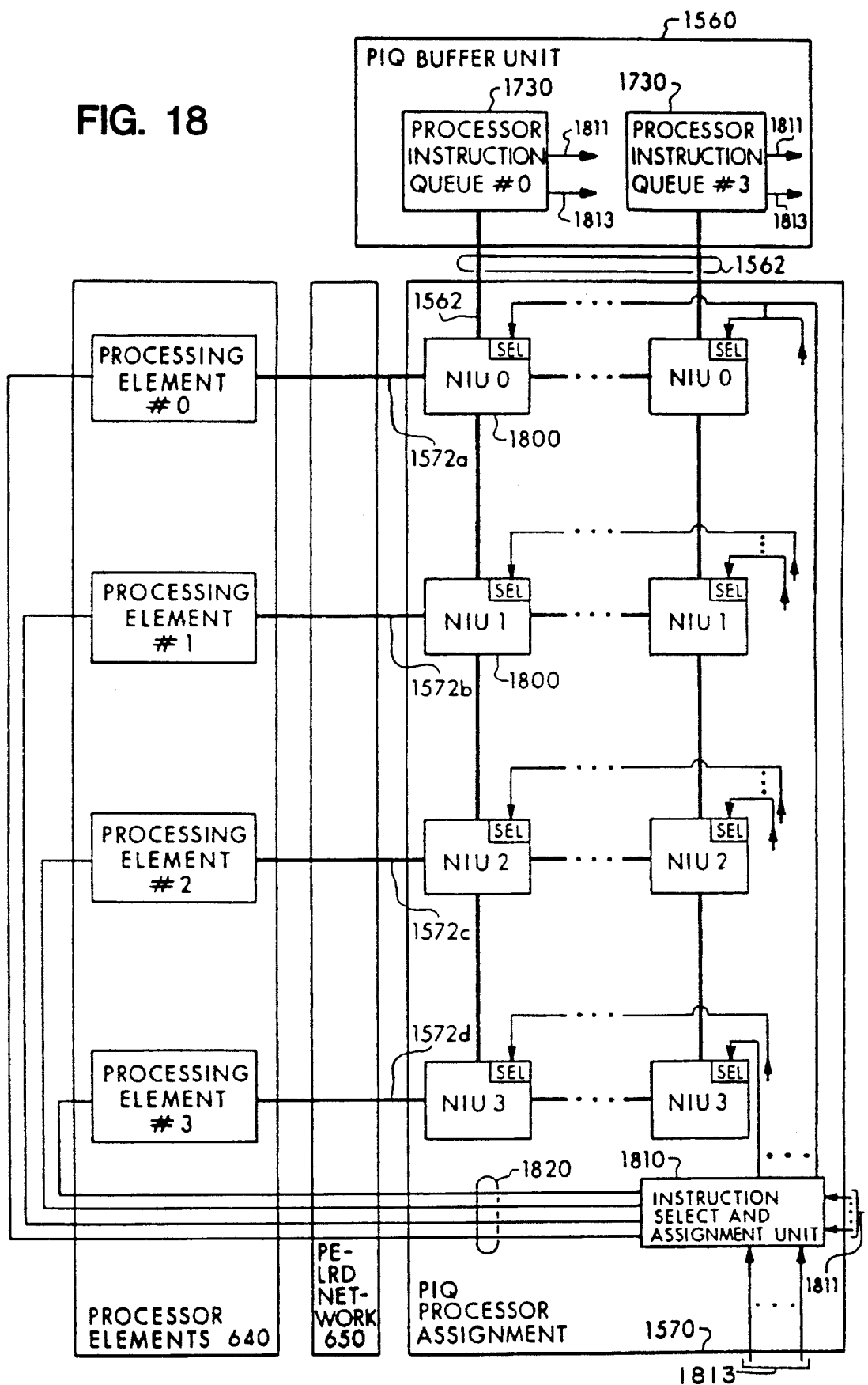
FIG. 18 sets forth interconnection of the processor elements through the PE-LRD network to the PIQ processor alignment circuit of the present invention.

The details of the PIQ processor assignment circuit 1570 is set forth in FIG. 18. The PIQ processor assignment circuit 1570 contains a set of network interface units (NIUs) 1800 interconnected in a full access switch to the PE-LRD network 650 and then to the various processor elements 640. Each network interface unit (NIU) 1800 is comprised of the same circuitry as the bus interface units (BIU) 1700 of FIG. 17. In normal operation, the processor instruction queue (PIQ0) directly accesses processor element 0 and NIU0 is activated and the remaining network interface units NIU1, NIU2, NIU3, for PIQ are deactivated. Likewise, processor instruction PIQ3 normally accesses processor element 3 having its NIU3 activated and the corresponding NIU0, NIU1, deactivated. The activation of which network interface unit 1800 is under the control of an instruction select and assignment unit 1810.

This unit 1810, receives signals from the PIQs within the LRD over lines 1811 that the unit 1810 is a member of, and from all other LRDs unit 1810 over lines 1813, and from the processor elements 640 through the network 650. Each PIQ furnishes the unit a signal that corresponds to "I have an instruction that is ready to be assigned to a processor." The other units furnish this unit and every other unit a signal that corresponds to "My PIQ #x has an instruction ready to be assigned to a processor." Finally, the processor elements furnish the unit and all other units in the system a signal that corresponds to "I can accept a new instruction."

The unit 1810 transmits signals to the PIQs of the LRD over lines 1811, the network interface units 1800 of the LRD and the other units 1810 of the other LRDs in the system over lines 1813. The unit transmits a signal to each PIQ that corresponds to "Gate your instruction onto the PE-PIQ interface bus (1562)." The unit transmits a select signal to the network interface units 1800. Finally, the unit transmits a signal that corresponds to "I have used processor element #x" for each processor in the system to each other unit 1810 in the system.

In addition, each unit 1810 in each LRD has associated with it a priority that corresponds to the priority of the LRD. This is used to order the LRDs into an ascending order from zero to the number of LRDs in the system. The method used for assigning the processor elements is as follows. Given that the LRDs are ordered, many allocation schemes are possible (e.g., round robin, first come first served, time slice, etc.). However, these are implementation details and do not impact the functionality of this unit under the teachings of the present invention.

Consider the LRD with the current highest priority. This LRD gets any and all processor elements that it requires and assigns the instructions that are ready to be executed to the available processor elements in any manner whatsoever due to the fact that the processor elements are context free. Typically, however, assuming that all processors are functioning correctly, instructions from PIQ #0 are routed to processor element #0, provided of course, processor element #0 is available.

The unit 1810 in the highest priority LRD then transmits this information to all other 1810 units in the system. Any processors left open are then utilized by the next highest priority LRD with instructions that can be executed. This allocation continues until all processors have been assigned. Hence, processors may be assigned on a priority basis in a daisy chained manner.

If a particular processor element, for example, element 1 has failed, the instruction selective assignment unit 1810 can deactivate that processor element by deactivating all network instruction units corresponding to NIU1. It can then, through hardware, reorder the processor elements so that, for example, processor element 2 receives all instructions logically assigned to processor element 1, processor element 3 is now assigned to receive all instructions logically assigned to processor 2. Indeed, redundant processor elements and network interface units can be provided to the system to provide for a high degree of fault tolerance.

Clearly, this is but one possible implementation. Other methods are also realizable.

b. Branch Execution Unit (BEU)

Figure 19:
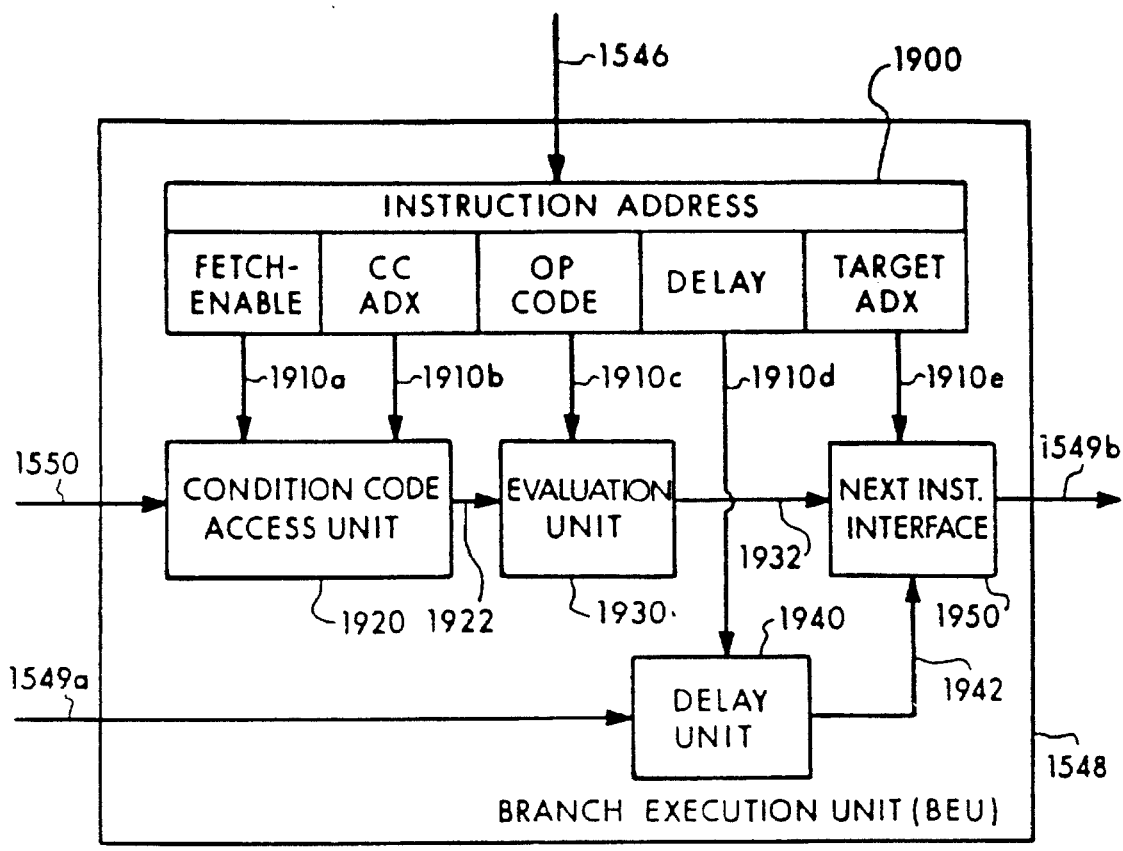
FIG. 19 sets forth the structure of the branch execution unit of the present invention.

The details of a Branch Execution Unit (BEU) 1548 are shown in FIG. 19. The Branch Execution Unit (BEU) 1548 is the unit in the present invention responsible for the execution of all branch instructions which occur at the end of each basic block. There is one BEU 1548 per context support hardware in the LRD and so, with reference back to FIG. 6 "n" contexts would require "n" BEUs. The reasoning being that each BEU 1548 is of simple design and, therefore, the cost of sharing it between contexts would be more expensive than allowing each context to have its own BEU.

Under the teachings of the present invention it is desired that branches be executed as fast as possible. In order to accomplish this, the instructions do not perform conventional next instruction address computation and with the exception of the subroutine return branches, already contain the full target or next branch address. In other words, the target address is static when the branch is executed, there is no dynamic generation of branch target addresses. Further, the target address is fully contained within the branch, i.e. all branch addresses are known at program preparation time in the TOLL output and, as a result, are directed to absolute addresses only. When a target address has been selected to be taken as a result of a branch other than the aforementioned subroutine return branch, the address is read out of the instruction and placed directly into the next instruction fetch register.

Return from subroutine branches are handled in a slightly different fashion. In order to understand the subroutine return branch, discussion of the subroutine call branch is required. A subroutine call is an unconditional branch whose target address is determined at program preparation time, as described above. When the branch is executed, a return address is created and stored. The return address is normally the address of the instruction following the subroutine call. The return address can be stored in a stack in memory or in other storage local to the branch execution unit. In addition, the execution of the subroutine call increments the procedural level counter.

The return from subroutine branch is also an unconditional branch. However, rather than containing the target address within the instruction, this type of branch reads the previously stored return address from the storage, decrements the procedural level counter, and loads the next instruction fetch register with the return address. The remainder of the disclosure discusses the evaluation and execution of conditional branches. It should be noted that techniques described also apply to unconditional branches, since these are, in effect, conditional branches in which the condition is always satisfied. Further, these same techniques also apply to the subroutine call and return branches, which perform the additional functions described above.

To speed up conditional branches, the determination of whether a conditional branch is taken or not, depends solely on the analysis of the appropriate set of condition codes. Under the teachings of the present invention, there is no evaluation of data performed other than to manipulate the condition codes appropriately. In addition, an instruction generating a condition code that a branch will use can transmit the code to BEU 1548 as well as to the condition code storage. This eliminates the conventional extra time required to wait for the code to become valid in the condition code storage prior to the BEU being able to fetch it.

Also, the present invention makes extensive use of delayed branching. In order to guarantee program correctness, when a branch has executed and its effects are propagated in the system, all instructions that are within the procedural domain of the given branch must have been executed or be in the process of being executed as discussed with the example of Table 6. In other words, the changing of the next instruction pointer (in response to the branch) must take place after the current firing time has been updated to point to the firing time that would have followed the last (temporally executed) instruction governed by this branch. Hence, in the example of Table 6, instruction I5 at firing time T17 is delayed until the completion of T18 which is the last firing time for this basic block. The instruction time for the next basic block is then T19.

The functionality of the BEU 1548 can be described as a four-state state machine:

| Stage 1: | Instruction decode |
|---|---|
| | - Operation decode |
| | - Delay field decode |
| | - Condition code access decode |
| Stage 2: | Condition code fetch/receive |
| Stage 3: | Branch operation evaluation |
| Stage 4: | Next instruction fetch |
| | location and firing time update |

Along with determining the operation to be performed, the first stage also determines how long fetching can continue to take place after receipt of the branch by the BEU, and how the BEU is to access the condition codes for a conditional branch, i.e. are they received or fetched.

The branch instruction is delivered over bus 1546 from the PIQ bus interface unit 1544 into the instruction register 1900 of the BEU 1548. In FIG. 19 the fields of the instruction register 1900 are designated as: FETCH/EN-ABLE, CONDITION CODE ADDRESS, OP CODE, DELAY FIELD, and TARGET ADDRESS. The instruction register 1900 is connected over lines 1910$a$ and 1910$b$ to a condition code access unit 1920, to an evaluation unit 1930 over lines 1910$c$, a delay unit 1940 over lines 1910$d$, and to a next instruction interface 1950 over lines 1910$e$.

Once an instruction has been issued to BEU 1548 from the PIQ bus interface 1544, instruction fetching must be held up until the value in the delay field has been determined. This value is measured relative to the receipt of the branch by the BEU, i.e. stage 1. If there are no instructions that may be overlapped with this branch, this field value is zero. In this case, instruction fetching is held up until the outcome of the branch has been determined. If this field is non-zero, instruction fetching may continue for a number of firing times given by the value in this field.

The condition code access unit 1920 is connected to the register file—PE network 670 over lines 1550 and to the evaluation unit 1930 over lines 1922. The condition code access decode unit 1920 determines whether or not the condition codes must be fetched by the instruction, or whether or not the instruction that determines the branch condition delivers them. As there is only one instruction per basic block that will determine the conditional branch, there will never be more than one condition code received by the BEU. As a result, the actual timing of when the condition code is received is not important. If it comes earlier than the branch, no other codes will be received prior to the execution of the branch. If it comes later, the branch will be waiting and the codes received will always be the right ones.

The evaluation unit 1930 is connected to the next instruction interface 1950 over lines 1932. The next instruction interface 1950 is connected to the context control circuit 1518 over lines 1549$b$ and to the delay unit 1940 over lines 1942. The evaluation stage combines the condition codes according to a Boolean function that represents the condition. The final stage either enables the fetching of the stream to continue if a conditional branch is not taken, or, loads up the next instruction pointer if the branch is taken. Finally the delay unit 1940 is also connected to the instruction cache control unit 1518 over lines 1549.

The impact of a branch in the instruction stream can be described as follows. Instructions, as discussed, are sent to their respective PIQ's 1730 by analysis of the resident logical processor number (LPN). Instruction fetching can be continued until a branch is seen, i.e. an instruction is delivered into the instruction register 1900 of the BEU 1548.

At this point in a conventional system without delayed branching, fetching would be stopped until the resolution of the branch. See, for example, "Branch Prediction Strategies and Branch Target Buffer Design", J. F. K. Lee & A. J. Smith, IEEE Computer Magazine, January, 1984.

In the present system having delayed branching, instructions must continue to be fetched until the point where the next instruction fetch is the last instruction to be fired in the basis block. The time that the branch is executed is the last time that fetching takes place without the possible modification of the next instruction address. Thus, this difference in firing times between when the branch is executed and when the effects of the branch are actually felt corresponds to the number of additional firing times that fetching may be continued.

The impact of the above on the instruction cache is that the BEU 1548 must have access to the next instruction firing time register of the cache controller. The BEU 1548 also controls the initiation or disabling of the fetch process of the instruction cache control 1518 via the instruction cache control unit 1518. These tasks are accomplished over bus 1549.

In operation the branch execution unit (BEU) 1548 functions as follows. The branch instruction such as instruction I5 in the example is loaded into the instruction register 1900 from the PIQ bus interface unit 1544. The instruction register contents then control the operation of BEU 1548. The FETCH-ENABLE field indicates whether or not the condition code access unit 1920 should retrieve the condition code located at the address stored in the CC-ADX field (i.e. FETCH) or whether the condition code will be delivered by the generating instruction.

Figure 20:
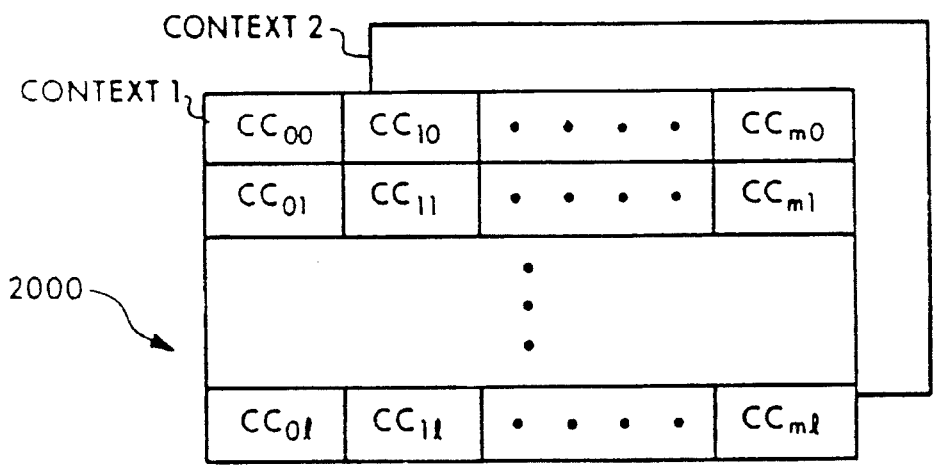
FIG. 20 illustrates the organization of the contexts of the present invention.

If a FETCH is requested, the unit 1920 accesses the register file-PE network 670 (see FIG. 6) to access the condition code registers 2000 which are shown in FIG. 20. In FIG. 20, the condition code registers 2000 for each context are shown in the generalized case. A set of registers CCm are provided for storing condition codes for procedural levels, L. Hence, the condition code registers 2000 are accessed and addressed by the unit 1920 to retrieve pursuant to a FETCH request, the necessary condition code. An indication that the condition code is received by the unit 1920 is delivered over lines 1922 to the evaluation unit 1930 as well as the actual condition code. The OPCODE field delivered to the evaluation unit 1930 in conjunction with the received condition code functions to deliver a branch taken signal over line 1932 to the next instruction interface 1950. The evaluation unit 1930 is comprised of standard gate arrays such as those from LSI Logic Corporation, 1551 McCarthy Blvd., Milpitas, California 95035.

The evaluation unit 1930 accepts the condition code set that determines whether or not the conditional branch is taken, and under control of the OPCODE field combines the set in a Boolean function to generate the conditional branch taken signal.

The next instruction interface 1950 receives the branch target address from the TARGET-ADX field of the instruction register 1900. However, the interface 1950 cannot operate until an enable signal is received from the delay unit 1940 over lines 1942.

The delay unit 1940 determines the amount of time that instruction fetching can be continued after the receipt of a branch by the BEU. Previously, it has been described that when a branch is received by the BEU, instruction fetching continues for one more cycle and then stops. The instructions fetched during this cycle are held up from entering the PIQ 1544 until the length of the delay field has been determined. For example, if the delay field is zero (implying that the branch is to be executed immediately), these instructions must be withheld from the PIQ until it is determined whether or not these are the right instructions to be fetched. Otherwise, (the delay field is non-zero), the instructions would be gated into the PIQ as soon as the delay value was determined to be non-zero. The length of the delay is obtained from DELAY field of the instruction register 1900 and receives clock impulses from the context control 1518 over lines 1549a. The delay unit 1940 decrements the value of the delay with the clock pulses and when fully decremented the interface unit 1950 becomes enabled.

Hence, in the discussion of Table 6, instruction I5 is assigned to firing time T17 but is delayed until firing time T18. During the delay time, the interface 1950 signals the instruction cache control 1518 over line 1549b to continue to fetch instructions to finish the current basic block. When enabled, the interface unit 1950 delivers the next address (i.e. the branch execution) for the next basic block into the instruction cache control 1518 over lines 1549b.

In summary and for the example on Table 6, the branch instruction I5 is loaded into the instruction register 1900 during time T17. However, a delay of one firing time (DELAY) is also loaded into the instruction register 1900 as the branch instruction cannot be executed until the last instruction I3 is processed during time T18. Hence, when the instruction I5 is loaded, the branch contained in the TARGET ADDRESS to the next basic block does not take place until the completion of time T18. In the meantime, the next instruction interface 1950 issues instructions to the context control 1518 to continue processing the stream of instructions in the basic block. Upon the expiration of the delay, the interface 1950 is enabled, and the branch is executed by delivering the address of the next basic block to the context control 1518.

c. Processor Elements (PE)

So far in the discussions pertaining to the matrix multiply example, a single cycle processor element has been assumed. In other words, an instruction is issued to the processor element and the processor element completely executes the instruction before proceeding to the next instruction. However, greater performance can be obtained by pipelined processor elements, the tasks performed by TOLL change slightly. In particular, the assignment of the processor elements is more complex than is shown in the previous example. In addition, the hazards that characterize a pipeline must be handled by the TOLL software. The hazards that are present in any pipeline manifest themselves as a more sophisticated set of data dependencies. This can be encoded into the TOLL software by someone skilled in the art. See for example, T. K. R. Gross, Stanford University, 1983, "Code Optimization of Pipeline Constraints", Doctorate Dissertation Thesis.

The assignment of the processors is dependent on the implementation of the pipelines and again, can be performed by someone skilled in the art. The key parameter is determining how data is exchanged between the pipelines. For example, assume that each pipeline contains feedback paths between its stages. In addition, assume that the pipelines can exchange results only through the register sets 660. Instructions would be assigned to the pipelines by determining sets of dependent instructions that are contained in the instruction stream and then assigning each specific set to a specific pipeline. This minimizes the amount of communication that must take place between the pipelines (via the register set), and hence speeds up the execution time of the program. The use of the logical processor number guarantees that the instructions will execute on the same pipeline.

Alternatively, if there are paths available to exchange data between the pipelines, dependent instructions may be distributed across several pipes instead of being assigned to a single pipe. Again, the use of multiple pipelines and the interconnection network between them that allows the sharing of intermediate results manifests itself as a more sophisticated set of data dependencies imposed on the instruction stream. Clearly, the extension of the teachings of this invention to a pipelined system is within the skill of the art.

Figure 21:
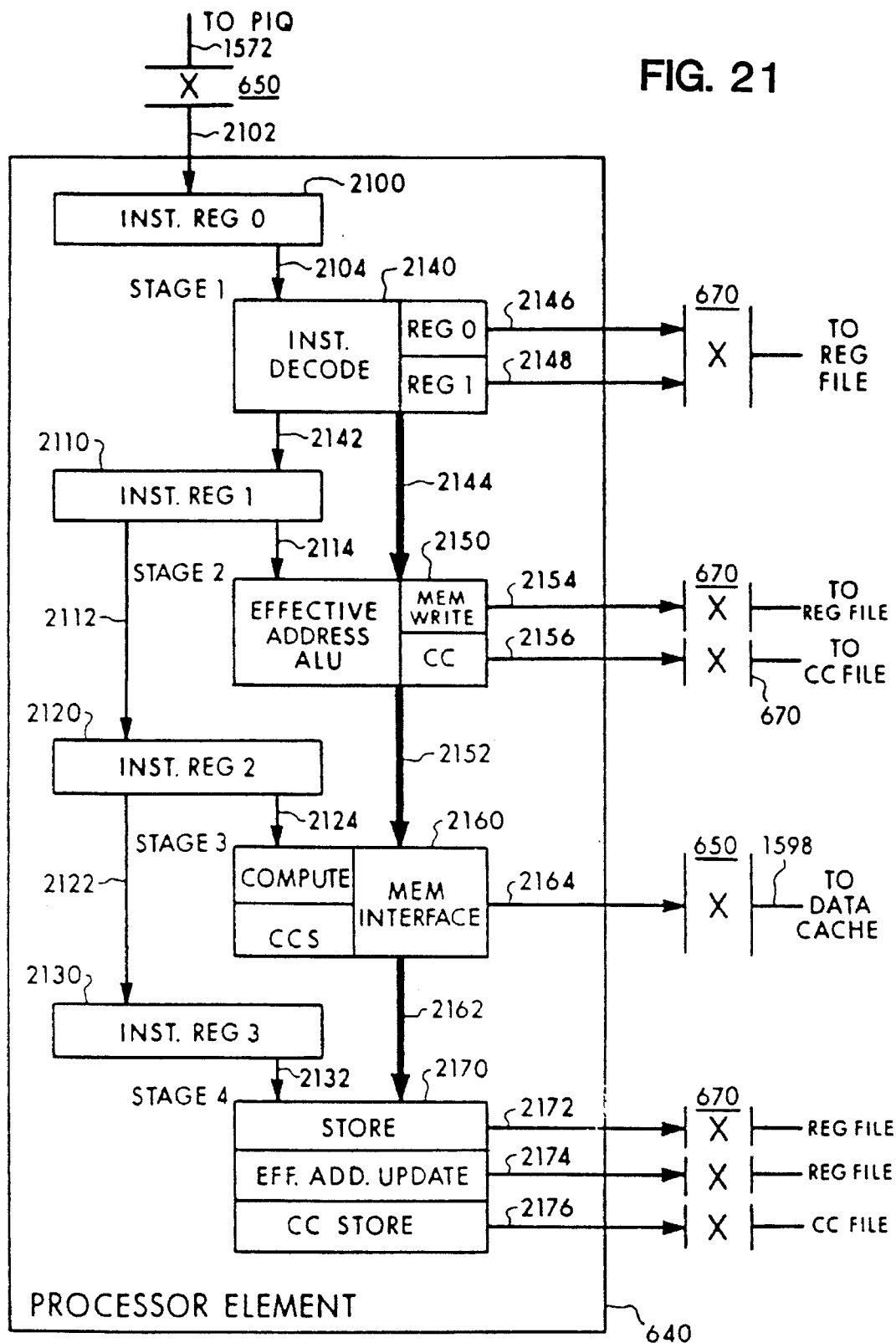
FIG. 21 sets forth the structure of one embodiment of the processor element of the present invention.

In FIG. 21, the details of the processor elements 640 are set forth for a four-stage pipeline processor element. All processor elements 640 are identical. It is to be expressly understood, that any prior art type of processor element such as a micro-processor or other pipeline architecture could not be used under the teachings of the present invention, because such processors retain the state information of the program they are processing. However, such a processor could be programmed with software to emulate or simulate the type of processor necessary for the present invention. As previously mentioned, each processor element 640 is context-free which differentiates it from conventional processor elements that requires context information. The design of the processor element is determined by the instruction set architecture generated by TOLL and, therefore, is the most implementation dependent portion of this invention from a conceptual viewpoint. In the preferred embodiment shown in FIG. 21, each processor element pipeline operates autonomously of the other processor elements in the system. Each processor element is homogeneous and is capable of executing all computational and data memory accessing instructions. In making computational executions, transfers are from register to register and for memory interface instructions, the transfers are from memory to registers or from registers to memory.

In FIG. 21, the four-stage pipeline for the processor element 640 of the present invention includes four discrete instruction registers 2100, 2110, 2120, and 2130. It also includes four stages: stage 1, 2140; stage 2, 2150; stage 3, 2160, and stage 4, 2170. The first instruction register 2100 is connected through the network 650 to the PIQ processor assignment circuit 1570 and receives that information over bus 2102. The instruction register then controls the operation of stage 1 which includes the hardware functions of instruction decode and register 0 fetch and register 1 fetch. The first stage 2140 is interconnected to the instruction register over lines 2104 and to the second instruction register 2110 over lines 2142. The first stage 2140 is also connected over bus 2144 to the second stage 2150. Register 0 fetch and register 1 fetch of stage 1 are connected over lines 2146 and 2148, respectively, to network 670 for access to the register file 660.

The second instruction register 2110 is further interconnected to the third instruction register 2120 over lines 2112 and to the second stage 2150 over lines 2114. The second stage 2150 is also connected over bus 2152 to the third stage 2160 and further has the memory write (MEM WRITE) register fetch hardware interconnected over lines 2154 to network 670 for access to the register file 660 and its condition (CC) code hardware connected over lines 2156 through network 670 to the condition code file 660.

The third instruction register 2120 is interconnected over lines 2122 to the fourth instruction register 2130 and is also connected over lines 2124 to the third stage 2160. The third stage 2160 is connected over bus 2162 to the fourth stage 2170 and is further interconnected over lines 2164 through network 650 to the data cache interconnection network 1590.

Finally, the fourth instruction register 2130 is interconnected over lines 2132 to the fourth stage, and the fourth stage has its store hardware (STORE) output connected over 2172 and its effective address update (EFF. ADD.) hardware circuit connected over 2174 to network 670 for access to the register file 660. In addition, it has its condition code store (CC STORE) hardware connected over lines 2176 through network 670 to the condition code file 660.

The operation of the four-stage pipeline shown in FIG. 21 will now be discussed with respect to the example of Table 1. This operation will be discussed with reference to the information contained in Table 19.

TABLE 19

|  | Instruction I0, (I1): |
|---|---|
| Stage 1 | Fetch Reg to form Mem-adx |
| Stage 2 | Form Mem-adx |
| Stage 3 | Perform Memory Read |
| Stage 4 | Store R0, (R1) |
|  | Instruction I2: |
| Stage 1 | Fetch Reg R0 and R1 |
| Stage 2 | No-Op |
| Stage 3 | Perform multiply |
| Stage 4 | Store R2 and CC |
|  | Instruction I3: |
| Stage 1 | Fetch Reg R2 and R3 |
| Stage 2 | No-Op |
| Stage 3 | Perform addition |
| Stage 4 | Store R3 and CC |
|  | Instruction I4: |
| Stage 1 | Fetch Reg R4 |
| Stage 2 | No-Op |
| Stage 3 | Perform decrement |
| Stage 4 | Store R4 and CC |

The operation for each instruction is set forth in Table 19 above. For instructions I0 and I1, the performance by the processor element 640 in FIG. 21 is the same but for the final stage. The first stage is to fetch the memory address from the register which contains the address in the register file. Hence, stage 1 interconnects circuitry 2140 over lines 2146 through network 670 to that register and downloads it into register 0 from the interface of stage 1. Next, the address is delivered over bus 2144 to stage 2, and the memory write hardware forms the memory address. The memory address is then delivered over bus 2152 to the third stage which reads memory over 2164 through network 650 to the data cache interconnection network 1590. The results of the read operation are then stored and delivered to stage 4 for storage in register R2 which is delivered over lines 2172 through network 672 from register R2 in the register file. The same operation takes place for instruction I1 except that the results are stored in register 1. Hence, the four stages of the pipeline (Fetch, Form Memory Address, Perform Memory Read, and Store The Results) flow through the pipe in the manner discussed. Clearly, when instruction I0 has passed through stage 1, the first stage of instruction I1 commences. This overlapping or pipelining is conventional in the art.

Instruction I2 fetches the information stored in registers R0 and R1 in the register file 660 and delivers them into registers REG0 and REG1 of stage 1. The contents are delivered over bus 2144 through stage 2 as a no operation and then over bus 2152 into stage 3. A multiply occurs with the contents of the two registers, the results are delivered over bus 2162 into stage 4 which then stores the results over lines 2172 through network 670 into register R2 of the register file 660. In addition, the condition code is stored over lines 2176 in the condition code file 660.

Likewise, instruction I3 performs the addition in the same fashion to store the results, in stage 4, in register R3 and to update the condition code for that instruction. Finally, instruction I4 operates in the same fashion except that stage 3 performs a decrement.

Hence, per the example of Table I, the instructions for PE0, as shown in Table 18 are delivered from the PIQO in the following order: I0, I2, and I3. Hence, these instructions are sent through the PE0 pipeline stages (S1, S2, S3, and S4) based upon instruction firing times (T16, T17, and T18) as follows:

TABLE 20

| PE | Inst | T16 |  |  |  |  |
|---|---|---|---|---|---|---|
| PE0: | I0 | S1 | S2 | S3 | S4 |  |
|  |  |  | T17 |  |  |  |
|  | I2 |  | S1 | S2 | S3 | S4 |
|  |  |  |  | T18 |  |  |
|  | I3 |  |  | S1 | S2 | S3 | S4 |
|  |  | T16 |  |  |  |  |
| PE1: | I1 | S1 | S2 | S3 | S4 |  |
|  |  | T16 |  |  |  |  |
| PE2: | I4 | S1 | S2 | S3 | S4 |  |

Such scheduling is entirely possible since resolution of all data dependencies between instructions and all scheduling of processor resources are performed during TOLL processing prior to program execution. The speed up in processing can be observed in Table 20 since the three firing times (T16, T17, and T18) for the basic block are completed in the cycle time of only six pipeline stages.

The pipeline of FIG. 21 is composed of four equal (temporal) length stages. The first stage 2140 performs the instruction decode and determines what registers to fetch and store as well as performing the two source register fetches required for the execution of the instruction.

The second stage 2150 is used by the computational instructions for the condition code fetch if required. It is the effective address generation stage for the memory interface instructions.

The effective address operations that are supported in the preferred embodiment of the invention are shown below:
1. Absolute address The full memory address is contained in the instruction.
2. Register indirect The full memory address is contained in a register.
3. Register indexed/based The full memory address is formed by combining the designated registers and immediate data.
  a. Rn op K
  b. Rn op Rm
  c. Rn op K op Rm
  d. Rn op Rm op K In each of the subcases of case 3 above, op may be addition (+), subtraction (−), or multiplication (*). As an example, the addressing constructs presented in the matrix multiply inner loop example are formed from case 3-a where the constant k would be the length of a data element within the array and the operation would be addition (+). These operations are executed in stage two (2150) of the pipeline.

At a conceptual level, the effective addressing portion of a memory access instruction is composed of three basic functions; the designation and procurement of the registers and immediate data involved in the calculation, the combination of these operands in order to form the desired address and the possible updating of any one of the registers involved. This functionality is common in the prior art and is illustrated by the autoincrement and autodecrement modes of addressing available in the DEC processor architecture. See, for example, DEC VAX Architecture Handbook.

Aside from the obvious hardware support required, the effective addressing supported impacts the TOLL software by adding functionality to the memory accessing instructions. In other words, an effective address memory access can be interpreted as a concatenation of two operations, the first the effective address calculation and the second the actual memory access. This functionality can be easily encoded into the TOLL software by one skilled in the art in much the same manner as an add, subtract or multiply instruction would be.

The effective addressing constructs shown are to be interpreted as one possible embodiment of a memory accessing system. Clearly, there are a plethora of other methods and modes for generating a memory address that are known to those skilled in the art. In other words, the effective addressing constructs shown above are shown for design completeness only, and are not to be construed as a key element in the design of the system.

In FIG. 22, are set forth the various structures of data or data fields within the pipeline processor element of FIG. 21. Note that the system is a multiuser system in both time and space. As a result, across the multiple pipelines, instructions from different users may be executing, each with its own processor state. As the processor state is not associated with the processor element, the instruction must carry along the identifiers that specify this state. This processor state is supported by the LRD, register file and condition code file assigned to the user.

Figure 22A:
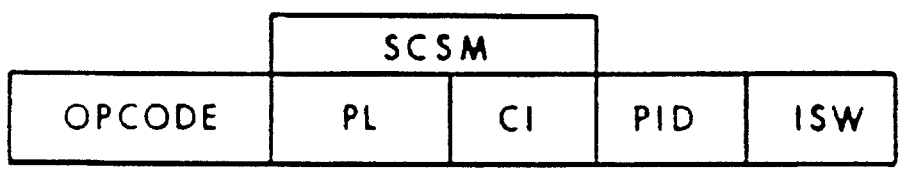
FIGS. 22(a) through 22(d) sets forth the data structures in the processor element of FIG. 21.
Figure 22B:
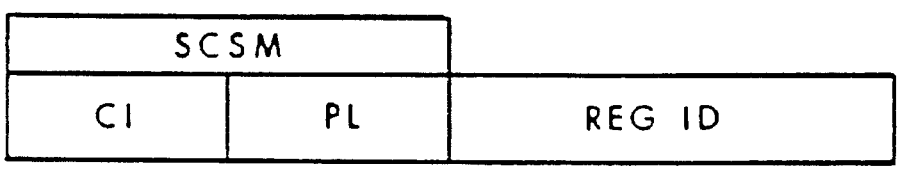
Figure 22C:
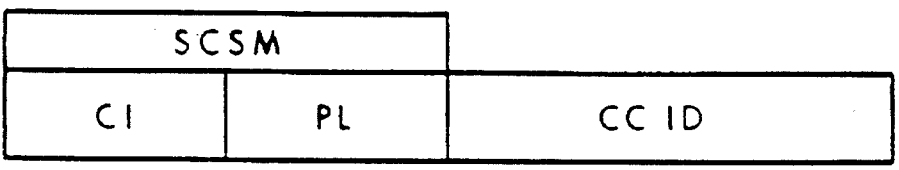
Figure 22D:

Hence, a sufficient amount of information must be associated with each instruction so that each memory access, condition code access or register access can uniquely identify the target of the access. In the case of the registers and condition codes, this additional information constitutes the procedural level (PL) and context identifiers (CI) and is attached to the instruction by the SCSM attachment unit 1650. This is illustrated in FIGS. 22*a*, 22*b* and 22*c* respectively. The context identifier portion is used to determine which register or condition code plane is being accessed. The procedural level is used to determine which procedural level of registers is to be accessed.

Memory accesses require that the LRD that supports the current user be identified so that the appropriate data cache can be accessed. This is accomplished through the context identifier. The data cache access requires that the process identifier (PID) of the current user be available in order to verify that the data present in the cache is indeed the data desired. Thus, an address issued to the data cache takes the form of FIG. 22*d*. The miscellaneous field is composed of additional information describing the access, e.g., read or write, user or system, etc.

Finally, due to the fact that there are several users executing across the pipelines during a single time interval, information that controls the execution of the instructions that would normally be stored within the pipeline must be associated with each instruction instead. This is reflected in the ISW field shown in FIG. 22*a*. The information in this field is composed of control fields like error masks, floating point format descriptors, rounding mode descriptors, etc. Each instruction would have this field attached, but, obviously, may not require all the information. This information is used by the ALU stage 2160 of the processor element.

This information as well as the procedural levels, context identification and process identifier are attached dynamically by the SCSM attacher (1650) as the instruction is issued from the instruction cache.

Although the system of the present invention has been specifically set forth in the above disclosure, it is to be understood that modifications and variations can be made thereto which would still fall within the scope and coverage of the following claims.

We claim:
1. A computer comprising:
   a general purpose register file comprising at least two general purpose registers;
   a condition code register file distinct from said general purpose register file, having a plurality of addressable condition code registers, each condition code register for representing a condition code value as a small number of bits summarizing the execution or result of a previously-executed instruction;
   a processor element configured to execute instructions, including condition-setting instructions that each produce a condition code value for storage in one of said condition code registers;
   a branch execution unit configured to execute conditional branch instructions that each determine a target instruction for execution based on analysis of a condition code value from one of said condition code registers; and
   a condition code access unit configured to act in response to condition-selecting instructions, at least one of said condition-selecting instructions being one of either said condition-setting instructions or said conditional branch instructions, said condition-selecting instructions for selecting from said condition code register file a condition code register for at least one of:
      storing into said selected condition code register a condition code value produced by one of said condition-setting instructions, and
      fetching from said selected condition code register a condition code value for analysis by one of said conditional branch instructions;
   said selecting being by direct addressing on a condition code address field of the condition-selecting instruction.

2. The computer of claim 1 further comprising:
   at least one additional processor element configured to execute instructions including condition-setting instructions that each produce a condition code value for storage in one of said condition code registers;
   each said processor element being enabled to deliver the condition code values produced by said condition-setting instructions to condition code registers of said condition code register file, said condition code register file being shared by said processor elements, a condition code value produced by any of said processor elements being readable by said branch execution unit.

3. The computer of claim 2 further comprising:
   at least one additional branch execution unit configured to execute conditional branch instructions that each determine a target instruction for execution based on analysis of a condition code value fetched from one of said condition code registers;
   said condition code register file being shared by said branch execution units, so that each said branch execution unit is enabled to analyze a condition code value produced by any of two or more of said processor elements.

4. The computer of claim 3 wherein:

said processor elements and branch execution units are configured to concurrently execute at least two independent programs of different users.

5. The computer of claim 2 further comprising:

a context selector coupling said processor elements to said condition code register file, said condition code register file being partitioned into multiple register sets, one of said processor elements at any one time having addressability to at least one but fewer than all of said register sets, said addressability determined by said context selector.

6. The computer of claim 1 further comprising:

a context selector coupling said processor element to said condition code register file, said condition code register file being partitioned into multiple register sets, said processor element at any one time having addressability to a register context comprising at least one but fewer than all of said register sets, said register context determined by said context selector.

7. The computer of claim 6 wherein:

said context selector comprises means for determining said register context by a subroutine nesting level of instructions executed by said processor element.

8. The computer of claim 6 wherein:

said condition-setting and conditional branch instructions each comprise a condition code address field, and said context selector uses a context value to determine said register context, thereby associating values of said condition code address field to condition code registers of said register context.

9. The computer of claim 1 wherein:

said condition-setting instructions include compare instructions that produce a condition code value for storage in said condition code register file but no arithmetic result for storage in said general purpose registers.

10. The computer of claim 9 wherein:

each said compare instruction includes a field directly addressing one of said condition code registers into which said produced condition code value is to be stored.

11. The computer of claim 1 wherein:

said conditional branch instructions select a condition code value for fetching and analysis by a condition code address field of each said conditional branch instruction which directly addresses a condition code register.

12. The computer of claim 1 wherein:

at least some of said executed instructions are both condition-setting instructions and arithmetic or logical instructions producing both an arithmetic or logical result for storage in said general purpose register file and a condition code value summarizing said arithmetic or logical result for storage in said condition code register file.

13. The computer of claim 1, wherein:

said condition-selecting instructions comprise both condition-setting instructions and conditional branch instructions, and said condition code access unit selects from said condition code register file a condition code register for both:

storing into said selected condition code register a condition code value produced by one of said condition-setting instructions, and fetching from said selected condition code register a condition code value for analysis by one of said conditional branch instructions.

14. The computer of claim 1 further comprising:

delay means to delay the effect of a conditional branch instruction until completion of a designated number of instructions following said conditional branch instruction.

15. The computer of claim 1 wherein:

said branch unit has means for executing said conditional branch instructions concurrently with execution of arithmetic instructions by said processor element.

16. A computer comprising:

a general purpose register file;

a condition code register file distinct from said general purpose register file, and having a plurality of addressable condition code registers, each condition code register for representing a condition code value as a small number of bits summarizing the execution or result of a previously-executed instruction; and a processor configured to execute instructions, the instructions including:

arithmetic or logical instructions that each produce an arithmetic or logical result for storage in one of said general purpose registers, condition-setting instructions that each produce a condition code value for storage in one of said condition code registers, at least some of said condition-setting instructions each including a field directly addressing one of said condition code registers into which said produced condition code value is to be stored, and conditional branch instructions that each determine a target instruction for execution based on analysis of a condition code value retrieved from one of said condition code registers, at least some of said conditional branch instructions including a condition code address field for directly addressing one of said condition code registers for said analysis.

17. The computer of claim 16 wherein:

at least some of said executed instructions are both condition-setting instructions and arithmetic or logical instructions, producing both an arithmetic or logical result for storage in said general purpose register file and a condition code value of said arithmetic or logical result for storage in said condition code register file.

18. A computer comprising:

at least two processors, each relying on a common shared register file of at least two registers for storage of intermediate results of instructions executed by said processors, registers of said shared register file being directly address by register selection fields of said instructions;

an interconnect between said processors and said register file configured to:

store into a register of said shared register file a summary of a condition of the result of a condition-setting one of said instructions executed by a first of said processors, and deliver said condition summary from said register to a second of said processors for analysis in determining the branch target of a conditional branch instruction of said instructions executed on said second processor;

said register selected from within said register file by a condition code address field of said condition-setting instruction, and said register selected from within said register file by a condition code address field of said conditional branch instruction.

19. The computer of claim 18 wherein:

at least some of said conditional branch instructions select a condition code register for delivery and analysis by a condition code address field that directly addresses said selected condition code register.

20. The computer of claim 19 wherein:

at least some of said condition-setting instructions include a condition code address field directly addressing one of said condition code registers into which said condition code value is to be stored.

21. The computer of claim 18 wherein registers of said register file are configured to store arithmetic or logical results of said instructions are distinct from registers configured to store said condition code value.

22. The computer of claim 18 wherein said processors are configured to concurrently and cooperatively execute instructions of different basic blocks of programs.

23. The computer of claim 18 wherein:

at least some of said condition-setting instructions include a condition code address field directly addressing one of said condition code registers into which said condition code value is to be stored.

24. The computer of claim 18 further comprising:

a context selector coupling said processors to said register file, said register file being partitioned into multiple register sets, one of said processors at any one time having addressability to at least one but fewer than all of said register sets, said addressability determined by said context selector.

25. A method for executing instructions of a single program in a single computer, said computer having a register file of at least two condition code registers, the method comprising the steps of:

executing a first condition-setting instruction of said program on said computer, and storing a condition of the result of said first condition-setting instruction as a first condition code value in a condition code register of said register file;

no earlier than execution of said first condition-setting instruction, executing a second condition-setting instruction on said computer, and storing a condition of the result of said second condition-setting instruction as a second condition code value in a condition code register of said register file; and no earlier than execution of said second condition-setting instruction, executing a first conditional branch instruction, having a condition code address field, on said computer, said branch executing step comprising the step of determining the effect of said first conditional branch instruction by analysis of said first condition code value, said first condition code value selected from within said register file by said condition code address field of said first conditional branch instruction.

26. The method of claim 25 wherein:

execution of said first condition-setting instruction selects a condition code register of said register file into which to store said first condition code value based on a condition code address field of said first condition-setting instruction, and execution of said second condition-setting instruction selects a condition code register of said register file into which to store said second condition code value based on a condition code address field of said second condition-setting instruction.

27. The method of claim 25 wherein:

the steps of executing said first condition-setting instruction and said first conditional branch instruction are performed by a first processor element; and the step of executing said second condition-setting instruction is performed on a second processor element distinct from said first processor element; and at least two condition code registers of said condition code address file are each addressable by condition code address fields of instructions executed by each of said first and second processor elements.

28. The method of claim 25 wherein:

said computer further comprises a single general purpose register file; and said first and second condition-setting instructions also compute arithmetic or logical results, stored in first and second of said general purpose registers, respectively.

29. A method for executing instructions of a single program in a single computer, said computer having a plurality of registers including at least two condition code registers, the method comprising the steps of:

executing a first condition-setting arithmetic or logical instruction of said program on said computer, an arithmetic or logical result of said first condition-setting instruction being stored in a general purpose register of said registers, and a condition of the execution or result of said first condition-setting instruction being represented as a first condition code value stored as a small number of bits in a first of said condition code registers;

no earlier than execution of said first condition-setting instruction, executing a second condition-setting arithmetic instruction on said computer, a result of said second condition-setting instruction being represented as a second condition code value stored in a second one of said condition code registers selected by a condition code address field of said second condition-setting instruction; and no earlier than execution of said second condition-setting instruction, executing a first conditional branch instruction on said computer, the effect of said first conditional branch instruction being determined by analysis of said first condition code value, said first condition code value having remained within said condition code registers since said first condition-setting instruction without having been recomputed, and being selected from within said condition code register file by a direct-addressing condition code address field of said first conditional branch instruction.

30. The method of claim 29 further comprising the step of:

after execution of said first conditional branch instruction, executing a second conditional branch instruction on said computer, the branch target of said second conditional branch instruction being determined by analysis of said second condition code value, said second condition code value selected from within said condition code registers by a condition code address field of said second conditional branch instruction.

* * * * *

UNITED STATES PATENT AND TRADEMARK OFFICE
CERTIFICATE OF CORRECTION

PATENT NO.     : 5,517,628
DATED          : May 14, 1996
INVENTOR(S)    : Morrison et al.

It is certified that error appears in the above-identified patent and that said Letters Patent is hereby corrected as shown below:

The title page, showing an illustrative figure should be deleted and substituted therefore with the attached title page.

The specification should be replaced with columns 1 thru 50 attached.

Signed and Sealed this

Ninth Day of December, 2003

JAMES E. ROGAN
*Director of the United States Patent and Trademark Office*

United States Patent [19]
Morrison et al.

[11] Patent Number: 5,517,628
[45] Date of Patent: May 14, 1996

[54] COMPUTER WITH INSTRUCTIONS THAT USE AN ADDRESS FIELD TO SELECT AMONG MULTIPLE CONDITION CODE REGISTERS

[75] Inventors: Gordon Edward Morrison, Denver; Christopher Bancroft Brooks; Frederick George Gluck, both of Boulder, all of Colo.

[73] Assignee: Biax Corporation, Palm Beach Gardens, Fla.

[21] Appl. No.: 08/254,687

[22] Filed: Jun. 6, 1994

Related U.S. Application Data

[62] Division of application No. 08/093,794, filed on Jul. 19, 1993, now abandoned, which is a continuation of application No. 07/913,736, filed on Jul. 14, 1992, now abandoned, which is a continuation of application No. 07/560,093, filed on Jul. 30, 1990, now abandoned, which is a division of application No. 07/372,247, filed on Jun. 26, 1989, now Pat. No. 5,021,945, which is a division of application No. 06/794,221, filed on Oct. 31, 1985, now Pat. No. 4,847,755.

[51] Int. Cl.⁶ .................................................. H03D 3/24
[52] U.S. Cl. ....................................................... 395/375
[58] Field of Search .......................................... 395/375

[56] References Cited

U.S. PATENT DOCUMENTS

| | | |
|---|---|---|
| 3,611,306 | 10/1971 | Reigel . |
| 3,771,141 | 11/1973 | Culler . |
| 4,104,720 | 8/1978 | Gruner . |
| 4,109,311 | 8/1978 | Blum et al. . |
| 4,153,932 | 5/1979 | Dennis et al. . |
| 4,181,936 | 1/1980 | Kober . |
| 4,200,912 | 4/1980 | Harrington et al. ............. 364/200 |
| 4,228,495 | 10/1980 | Bernhard et al. . |
| 4,229,790 | 10/1980 | Gilliland et al. ............ 364/DIG. 1 |
| 4,241,398 | 12/1980 | Caril . |

(List continued on next page.)

OTHER PUBLICATIONS

Bernhard, "Computing at the Speed Limit", IEEE Spectrum, Jul., 1982, pp. 26–31.

Davis, "Computing Architecture", IEEE Spectrum, Nov. 1983, pp. 94–99.

Dennis, "Data Flow Supercomputers", Computer, Nov. 1980, pp. 48–56.

Fisher et al., "Measuring the Parallelism Available for Very Long Instruction, Word Architectures", IEEE Transactions on Computers, vol. C–33, No. 11, Nov. 1984, pp. 968–978.

Fisher et al., "Microcode Compaction: Looking Backward and Looking Forward", National Computer Conference, 1981, pp. 95–102.

(List continued on next page.)

*Primary Examiner*—Thomas M. Heckler
*Attorney, Agent, or Firm*—Fish & Richardson P.C.

[57] ABSTRACT

The invention features a computer with a condition code register file (the condition code register file is distinct from the computer's general purpose register file). The condition code register file has a plurality of addressable condition code registers. The computer executes condition-setting instructions that each produce a condition code value for storage in one of the condition code registers, and conditional branch instructions that branch to a target based on analysis of a condition code value from one of the condition code registers. The condition code registers are directly addressable by condition code address fields of the instructions. The invention finds primary expression in one of two embodiments (or in both simultaneously): either (a) at least some of the condition-setting instructions contain a direct address field that selects one, from among the plurality of the condition code registers into which the condition code value is to be stored, or (b) at least some of the conditional branch instructions contain a direct address field that selects one, from among the plurality of the condition code registers from which a condition code value is to be selected for analysis.

30 Claims, 17 Drawing Sheets

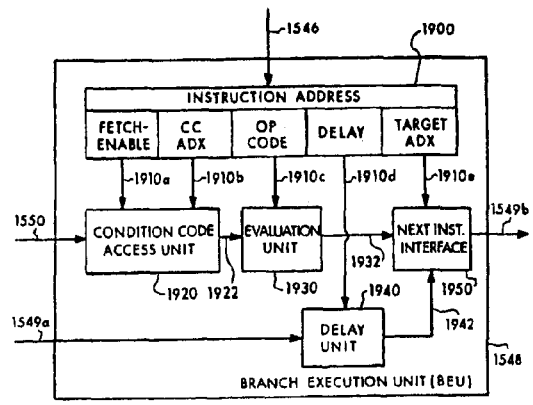

U.S. PATENT DOCUMENTS

| | | |
|---|---|---|
| 4,247,894 | 1/1981 | Beismann et al. ............... 364/200 |
| 4,250,546 | 2/1981 | Boney et al. ............... 364/DIG. 1 |
| 4,270,167 | 5/1981 | Koehler et al. . |
| 4,334,268 | 6/1982 | Boney et al. ............... 364/DIG. 1 |
| 4,338,661 | 7/1982 | Tredennick et al. ........... 364/DIG. 1 |
| 4,342,078 | 7/1982 | Tredennick et al. ............... 364/200 |
| 4,430,707 | 2/1984 | Kim . |
| 4,435,758 | 3/1984 | Lorie et al. . |
| 4,466,061 | 8/1984 | DeSantis . |
| 4,468,736 | 8/1984 | DeSantis . |
| 4,514,807 | 4/1985 | Nogi . |
| 4,532,589 | 7/1985 | Shintani et al. ............... 364/200 |
| 4,574,348 | 3/1986 | Scallon . |
| 4,598,400 | 7/1986 | Hillis ............................... 370/60 |
| 4,833,599 | 5/1989 | Colwell et al. ............... 364/200 |

OTHER PUBLICATIONS

Fisher, A.T., "The VLIW Machine: A Multiprocessor for Compiling Scientific Code", Computer, 1984, pp. 45–52.

Fisher et al., "Using an Oracle to Measure Potential Parallelism in Single Instruction Stream Programs", IEEE No. 0194–1895/81/0000/0171, 14th Annual Microprogramming Workshop, Sigmicro, Oct., 1981, pp. 171–182.

Requa et al.; "The Piecewise Data Flow Architecture: Architectural Concepts"; IEEE Transactions on Computers; vol. C–32 No. 5, May 1983, pp. 425–438.

J.R. Vanaken et al., "The Expression Processor," IEEE Transactions on Computers, C–30, No. 8, Aug., 1981, pp. 525–536.

Chang et al.; "801 Storage Architecture and Programming"; ACM Transactions on Computer Systems; 6:28–50; 1988.

Colwell et al.; "A VLIW Architecture for a Trace Scheduling Compiler"; ACM; 1987.

Ellis, John R.; "Bulldog: A Compiler for VLIW Architectures"; MIT Press; 1986; Originally Published as a Yale University Doctoral Dissertation; 1985.

Gross et al.; "Optimizing Delayed Branches"; IEEE; 114–120; 1982.

Hagiwara, et al.; "A Dynamically Microprogrammable Computer With Low–Level Parallelism"; IEEE Transactions on Computers; c–29:577–594; 1980.

Heinrich et al.; "Including the R4400 MIPS R4000 Miroprocessor R4000 User's Manual"; MIPS Technologies Inc,; 1993.

Hennessy et al., "The MIPS Machine"; Proceedings of IEEE Compcon; 2–7; 1982.

Hennessy et al.; "Postpass Code Optimization of Pipeline Constraints"; ACM Transactions on Programming Languages and Systems; 5:422–448; 1983.

Hennessy; "VLSI Processor Architecture"; IEEE; c–33:1221–1246; 1984.

Hennessy; "VLSI RISC Processors"; VLSI Systems Design; 22–32; 1985.

IBM; "PowerPC™ 601, RISC Microprocessor User's Manual"; IBM and Motorola; 1991 and 1993.

Intel Corporation; "MCS–80 User's Manual (With Introduction to MCS–85™)"; Oct. 1977.

McDowell Charles E.; "A Simple Architecture for Low–Level Parallelism"; Proceedings of 1983 International Conference on Parallel Processing; 472–477; 1983.

McDowell Charles E.; "SIMAC:A Multiple ALU Computer"; Dissertation Thesis; Univ. of California; San Diego; (111 pages); 1983.

McDowell et al.; "Processor Scheduling for Linearly Connected Parallel Processors"; IEEE Transactions on Computers; c–35:632–639; Jul. 1986.

Motorola; "MC68030 Enhanced 32–Bit Microprocessor User's Manual Second Edition"; 1989.

Patterson et al.; "The Case for the Reduced Instruction Set Computer"; Computer Architecture News; 8:132–191; 1980.

Patterson David A.; "Microprogramming"; Scientific American; 248:244; 1983.

Patterson David A.; "Reduced Instruction Set Computers"; Communications of the ACM; 28:8–21; 1985.

Radin George; "The 801 Minicomputer"; Proceedings of ACM Symposium on Architectural Support for Programming Languages and Operating Systems; 10:39–47, Mar. 1982.

Sites et al.; "Alpha Architecture Reference Manual"; Digital Press; 1992.

Tomita et al.; "A User–Microprogrammable Local Host Computer With Low–Level Parallelism"; ACM 0149–7111/83/0600/0151; 151–159; 1983.

COMPUTER WITH INSTRUCTIONS THAT USE AN ADDRESS FIELD TO SELECT AMONG MULTIPLE CONDITION CODE REGISTERS

This is a continuation of copending application Ser. No. 08/093,794 filed on Jul. 19, 1993, now abandoned, which is a continuation of prior application Ser. No. 07/913,736 filed on Jul. 14, 1992, now abandoned, which is a continuation of prior application Ser. No. 07/560,093 filed on Jul. 30, 1990, now abandoned, which is a division of application Ser. No. 07/372,247 filed on Jun. 26, 1989, now U.S. Pat. No. 5,021,945, which is a division of application Ser. No. 06/794,221, filed on Oct. 31, 1985, now U.S. Pat. No. 4,847,755, issued Jul. 11, 1989.

BACKGROUND OF THE INVENTION

1. Field of the Invention

This invention generally relates to parallel processor computer systems and, more particularly, to parallel processor computer systems having software for detecting natural concurrencies in instruction streams and having a plurality of processor elements for processing the detected natural concurrencies.

2. Description of the Prior Art

Almost all prior art computer systems are of the "Von Neumann" construction. In fact, the first four generations of computers are Von Neumann machines which use a single large processor to sequentially process data. In recent years, considerable effort has been directed towards the creation of a fifth generation computer which is not of the Von Neumann type. One characteristic of the so-called fifth generation computer relates to its ability to perform parallel computation through use of a number of processor elements. With the advent of very large scale integration (VLSI) technology, the economic cost of using a number of individual processor elements becomes cost effective.

Whether or not an actual fifth generation machine has yet been constructed is subject to debate, but various features have been defined and classified. Fifth-generation machines should be capable of using multiple-instruction, multiple-data (MIMD) streams rather than simply being a single instruction, multiple-data (SIMD) system typical of fourth generation machines. The present invention is of the fifth-generation non-Von Neumann type. It is capable of using MIMD streams in single context (SC-MIMD) or in multiple context (MC-MIMD) as those terms are defined below. The present invention also finds application in the entire computer classification of single and multiple context SIMD (SC-SIMD and MC-SIMD) machines as well as single and multiple context, single-instruction, single data (SC-SISD and MC-SISD) machines.

While the design of fifth-generation computer systems is fully in a state of flux, certain categories of systems have been defined. Some workers in the field base the type of computer upon the manner in which "control" or "synchronization" of the system is performed. The control classification includes control-driven, data-driven, and reduction (or demand) driven. The control-driven system utilizes a centralized control such as a program counter or a master processor to control processing by the slave processors. An example of a control-driven machine is the Non-Von-1 machine at Columbia University. In data-driven systems, control of the system results from the actual arrival of data required for processing. An example of a data-driven machine is the University of Manchester dataflow machine developed in England by Ian Watson. Reduction driven systems control processing when the processed activity demands results to occur. An example of a reduction processor is the MAGO reduction machine being developed at the University of North Carolina, Chapel Hill. The characteristics of the non-Von-1 machine, the Manchester machine, and the MAGO reduction machine are carefully discussed in Davis, "Computer Architecture," IEEE Spectrum, November, 1983. In comparison, data-driven and demand-driven systems are decentralized approaches whereas control-driven systems represent a centralized approach. The present invention is more properly categorized in a fourth classification which could be termed "time-driven." Like data-driven and demand-driven systems, the control system of the present invention is decentralized. However, like the control-driven system, the present invention conducts processing when an activity is ready for execution.

Most computer systems involving parallel processing concepts have proliferated from a large number of different types of computer architectures. In such cases, the unique nature of the computer architecture mandates or requires either its own processing language or substantial modification of an existing language to be adapted for use. To take advantage of the highly parallel structure of such computer architectures, the programmer is required to have an intimate knowledge of the computer architecture in order to write the necessary software. As a result, preparing programs for these machines requires substantial amounts of the users effort, money and time.

Concurrent to this activity, work has also been progressing on the creation of new software and languages, independent of a specific computer architecture, that will expose (in a more direct manner), the inherent parallelism of the computation process. However, most effort in designing supercomputers has been concentrated in developing new hardware with much less effort directed to developing new software.

Davis has speculated that the best approach to the design of a fifth-generation machine is to concentrate efforts on the mapping of the concurrent program tasks in the software onto the physical hardware resources of the computer architecture. Davis terms this approach one of "task-allocation" and touts it as being the ultimate key to successful fifth-generation architectures. He categorizes the allocation strategies into two generic types. "Static allocations" are performed once, prior to execution, whereas "dynamic allocations" are performed by the hardware whenever the program is executed or run. The present invention utilizes a static allocation strategy and provides task allocations for a given program after compilation and prior to execution. The recognition of the "task allocation" approach in the design of fifth generation machines was used by Davis in the design of his "Data-driven Machine-II" constructed at the University of Utah. In the Data-driven Machine-II, the program was compiled into a program graph that resembles the actual machine graph or architecture.

Task allocation is also referred to as "scheduling" in Gajski et al, "Essential Issues in Multi-processor Systems," *Computer*, June, 1985. Gajski et al set forth levels of scheduling to include high level, intermediate level, and low level scheduling. The present invention is one of low-level scheduling, but it does not use conventional scheduling policies of "first-in-first-out", "round-robin", "shortest type in job-first", or "shortest-remaining-time," Gajski et al also recognize the advantage of static scheduling in that overhead costs are paid at compile time. However, Gajski et al's recognized disadvantage, with respect to static scheduling, of possible inefficiencies in guessing the run time profile of each task is not found in the present invention. Therefore, the conventional approaches to low-level static scheduling found in the Occam language and the Bulldog compiler are not found in the software portion of the present invention. Indeed, the low-level static scheduling of the present invention provides the same type, if not better, utilization of the processors commonly seen in dynamic scheduling by the machine at run time. Furthermore, the low-level static scheduling of the present invention is performed automatically without intervention of programmers as required (for example) in the Occam language.

Davis further recognizes that communication is a critical feature in concurrent processing in that the actual physical topology of the system significantly influences the overall performance of the system.

For example, the fundamental problem found in most data-flow machines is the large amount of communication overhead in moving data between the processors. When data is moved over a bus, significant overhead, and possible degradation of the system, can result if data must contend for access to the bus. For example, the Arvind data-flow machine, referenced in Davis, utilizes an I-structure stream in order to allow the data to remain in one place which then becomes accessible by all processors. The present invention, in one aspect, teaches a method of hardware and software based upon totally coupling the hardware resources thereby significantly simplifying the communication problems inherent in systems that perform multiprocessing.

Another feature of non-Von Neumann type multiprocessor systems is the level of granularity of the parallelism being processed. Gajski et al term this "partitioning." The goal in designing a system, according to Gajski et al, is to obtain as much parallelism as possible with the lowest amount of overhead. The present invention performs concurrent processing at the lowest level available, the "per instruction" level. The present invention., in another aspect, teaches a method whereby this level of parallelism is obtainable without execution time overhead.

Despite all of the work that has been done with multiprocessor parallel machines, Davis (Id. at 99) recognizes that such software and/or hardware approaches are primarily designed for individual tasks and are not universally suitable for all types of tasks or programs as has been the hallmark with Von Neumann architectures. The present invention sets forth a computer system and method that is generally suitable for many different types of tasks since it operates on the natural concurrencies existent in the instruction stream at a very fine level of granularity.

All general purpose computer systems and many special purpose computer systems have operating systems or monitor/control programs which support the processing of multiple activities or programs. In some cases this processing occurs simultaneously; in other cases the processing alternates among the activities such that only one activity controls the processing resources at any one time. This latter case is often referred to as time sharing, time slicing, or concurrent (versus simultaneous) execution, depending on the particular computer system. Also depending on the specific system, these individual activities or programs are usually referred to as tasks, processes, or contexts. In all cases, there is a method to support the switching of control among these various programs and between the programs and the operating system, which is usually referred to as task switching, process switching, or context switching. Throughout this document, these terms are considered synonymous, and the terms context and context switching are generally used.

The present invention, therefore, pertains to a non-Von Neumann MIMD computer system capable of simultaneously operating upon many different and conventional programs by one or more different users. The natural concurrencies in each program are statically allocated, at a very fine level of granularity, and intelligence is added to the instruction stream at essentially the object code level. The added intelligence can include, for example, a logical processor number and an instruction firing time in order to provide the time-driven decentralized control for the present invention. The detection and low level scheduling of the natural concurrencies and the adding of the intelligence occurs only once for a given program, after conventional compiling of the program, without user intervention and prior to execution. The results of this static allocation are executed on a system containing a plurality of processor elements. In one embodiment of the invention, the processors are identical. The processor elements, in this illustrated embodiment, contain no execution state information from the execution of previous instructions, that is, they are context free. In addition, a plurality of context files, one for each user, are provided wherein the plurality of processor elements can access any storage resource contained in any context file through total coupling of the processor element to the shared resource during the processing of an instruction. In a preferred aspect of the present invention, no condition code or results registers are found on the individual processor elements.

SUMMARY OF INVENTION

The present invention provides a method and a system that is non-Von Neumann and one which is adaptable for use in single or multiple context SISD, SIMD, and MIMD configurations. The method and system is further operative upon a myriad of conventional programs without user intervention.

In one aspect, the present invention statically determines at a very fine level of granularity, the natural concurrencies in the basic blocks (BBs) of programs at essentially the object code level and adds intelligence to the instruction stream in each basic block to provide a time driven decentralized control. The detection and low level scheduling of the natural concurrencies and the addition of the intelligence occurs only once for a given program after conventional compiling and prior to execution. At this time, prior to program execution, the use during later execution of all instruction resources is assigned.

In another aspect, the present invention further executes the basic blocks containing the added intelligence on a system containing a plurality of processor elements each of which, in this particular embodiment., does not retain execution state information from prior operations. Hence, all processor elements in accordance with this embodiment of the invention are context free. Instructions are selected for execution based on the instruction firing time. Each processor element in this embodiment is capable of executing instructions on a per-instruction basis such that dependent instructions can execute on the same or different processor elements. A given processor element in the present invention is capable of executing an instruction from one context followed by an instruction from another context. All operating and context information necessary for processing a given instruction is then contained elsewhere in the system.

It should be noted that many alternative implementations of context free processor elements are possible. In a non-pipelined implementation each processor element is monolithic and executes a single instruction to its completion prior to accepting another instruction.

In another aspect of the invention, the context free processor is a pipelined processor element, in which each instruction requires several machine instruction clock cycles to complete. In general, during each clock cycle, a new instruction enters the pipeline and a completed instruction exists the pipeline, giving an effective instruction execution time of a single instruction clock cycle. However, it is also possible to microcode some instructions to perform complicated functions requiring many machine instruction cycles. In such cases the entry of new instructions is suspended until the complex instruction completes, after which the normal instruction entry and exit sequence in each clock cycle continues. Pipelining is a standard processor implementation technique and is discussed in more detail later.

The system and method of the present invention are described in the following drawing and specification.

DESCRIPTION OF THE DRAWING

Other objects, features, and advantages of the invention will appear from the following description taken together with the drawings in which:

FIG. 1 is the generalized flow representation of the TOLL software of the present invention;

FIG. 2 is a graphic representation of a sequential series of basic blocks found within the conventional compiler output;

FIG. 3 is a graphical presentation of the extended intelligence added to each basic block according to one embodiment of the present invention;

FIG. 4 is a graphical representation showing the details of the extended intelligence added to each instruction within a given basic block according to one embodiment of the present invention;

FIG. 5 is the breakdown of the basic blocks into discrete execution sets;

FIG. 6 is a block diagram presentation of the architectural structure of apparatus according to a preferred embodiment of the present invention;

FIGS. 7a–7c represent an illustration of the network interconnections during three successive instruction firing times;

FIGS. 8–11 are the flow diagrams setting forth features of the software according to one embodiment of the present invention;

FIG. 12 is a diagram describing one preferred form of the execution sets in the TOLL software;

FIG. 13 sets forth the register file organization according to a preferred embodiment of the present invention;

FIG. 14 illustrates a transfer between registers in different levels during a subroutine call;

FIG. 15 sets forth the structure of a logical resource driver (LRD) according to a preferred embodiment of the present invention;

FIG. 16 sets forth the structure of an instruction cache control and of the caches according to a preferred embodiment of the present invention;

FIG. 17 sets forth the structure of a PIQ buffer unit and a PIQ bus interface unit according to a preferred embodiment of the present invention;

FIG. 18 sets forth interconnection of processor elements through the PE-LRD network to a PIQ processor alignment circuit according to a preferred embodiment of the present invention;

FIG. 19 sets forth the structure of a branch execution unit according to a preferred embodiment of the present invention;

FIG. 20 illustrates the organization of the condition code storage of a context file according to a preferred embodiment of the present invention;

FIG. 21 sets forth the structure of one embodiment of a pipelined processor element according to the present invention; and FIGS. 22(a) through 22(d) set forth the data structures used in connection with the processor element of FIG. 21.

GENERAL DESCRIPTION

1. Introduction

In the following two sections, a general description of the software and hardware of the present invention takes place. The system of the present invention is designed based upon a unique relationship between the hardware and software components. While many prior art approaches have primarily provided for multiprocessor parallel processing based upon a new architecture design or upon unique software algorithms, the present invention is based upon a unique hardware/software relationship. The software of the present invention provides the intelligent information for the routing and synchronization of the instruction streams through the hardware. In the performance of these tasks, the software spatially and temporally manages all user accessible resources, for example, general registers, condition code storage registers, memory and stack pointers. The routing and synchronization are performed without user intervention, and do not require changes to the original source code. Additionally, the analysis of an instruction stream to provide the additional intelligent information for controlling the routing and synchronization of the instruction stream is performed only once during the program preparation process (often called "static allocation") of a given piece of software, and is not performed during execution (often called "dynamic allocation") as is found in some conventional prior art approaches. The analysis effected according to the invention is hardware dependent, is performed on the object code output from conventional compilers, and advantageously, is therefore programming language independent.

In other words, the software, according to the invention, maps the object code program onto the hardware of the system so that it executes more efficiently than is typical of prior art systems. Thus the software must handle all hardware idiosyncrasies and their effects on execution of the program instructions stream. For example, the software must accommodate, when necessary, processor elements which are either monolithic single cycle or pipelined.

2. General Software Description

Referring to FIG. 1, the software of the-present invention, generally termed "TOLL," is located in a computer processing system 160. Processing system 160 operates on a standard compiler output 100 which is typically object code or an intermediate object code such as "p-code." The output of a conventional compiler is a sequential stream of object code instructions hereinafter referred to as the instruction stream. Conventional language processors typically perform the following functions in generating the sequential instruction stream:

1. lexical scan of the input text,
2. syntactical scan of the condensed input text including symbol table construction, 3. performance of machine independent optimization including parallelism detection and vectorization, and
4. an intermediate (PSEUDO) code generation taking into account instruction functionality, resources required, and hardware structural properties.

In the creation of the sequential instruction stream, the conventional compiler creates a series of basic blocks (BBs) which are single entry single exit (SESE) groups of contiguous instructions. See, for example, Alfred v. Aho and Jeffery D. Ullman, *Principles of Compiler Design*, Addison Wesley, 1979, pg. 6, 409, 412–413 and David Gries, *Compiler Construction for Digital Computers*, Wiley, 1971. The conventional compiler, although it utilizes basic block information in the performance of its tasks, provides an output stream of sequential instructions without any basic block designations. The TOLL software, in this illustrated embodiment of the present invention, is designed to operate on the formed basic blocks (BBs) which are created within a conventional compiler. In each of the conventional SESE basic blocks there is exactly one branch (at the end of the block) and there are no control dependencies. The only relevant dependencies within the block are those between the resources required by the instructions.

The output of the-compiler 100 in the basic block format is illustrated in FIG. 2. Referring to FIG. 1, the TOLL software 110 of the present invention being processed in the computer 160 performs three basic determining functions on the compiler output 100. These functions are to analyze the resource usage of the instructions 120, extend intelligence for each instruction in each basic block 130, and to build execution sets composed of one or more basic blocks 140. The resulting output of these three basic functions 120, 130, and 140 from processor 160 is the TOLL software output 150 of the present invention.

As noted above, the TOLL software of the present invention operates on a compiler output 100 only once and without user intervention. Therefore, for any given program, the TOLL software need operate on the compiler output 100 only once.

The functions 120, 130, 140 of the TOLL software 110 are, for example, to analyze the instruction stream in each basic block for natural concurrencies, to perform a translation of the instruction stream onto the actual hardware system of the present invention, to alleviate any hardware induced idiosyncrasies that may result from the translation process, and to encode the resulting instruction stream into an actual machine language to be used with the hardware of the present invention. The TOLL software 110 performs these functions by analyzing the instruction stream and then assigning processor elements and resources as a result thereof. In one particular embodiment, the processors are context free. The TOLL software 110 provides the "synchronization" of the overall system by, for example, assigning appropriate firing times to each instruction in the output instruction stream.

Instructions can be dependent on one another in a variety of ways although there are only three basic types of dependencies. First, there are procedural dependencies due to the actual structure of the instruction stream; that is, instructions may follow one another in other than a sequential order due to branches, jumps, etc. Second, operational dependencies are due to the finite number of hardware elements present in the system. These hardware elements include the general registers, condition code storage, stack pointers, processor elements, and memory. Thus if two instructions are to execute in parallel, they must not require the same hardware element unless they are both reading that element (provided of course, that the element is capable of being read simultaneously). Finally, there are data dependencies between instructions in the instruction stream. This form of dependency will be discussed at length later and is particularly important if the processor elements include pipelined processors. Within a basic block, however, only data and operational dependencies are present.

The TOLL software 110 must maintain the proper execution of a program. Thus, the TOLL software must assure that the code output 150, which represents instructions which will execute in parallel, generates the same results as those of the original serial code. To do this, the code 150 must access the resources in the same relative sequence as the serial code for instructions that are dependent on one another; that is, the relative ordering must be satisfied. However, independent sets of instructions may be effectively executed out of sequence.

In Table 1 is set forth an example of a SESE basic block representing the inner loop of a matrix multiply routine. While, this example will-be used throughout this specification, the teachings of the present invention are applicable to any instruction stream. Referring to Table 1, the instruction designation is set forth in the right hand column and a conventional object code functional representation, for this basic block, is represented in the left hand column.

TABLE 1

| OBJECT CODE | INSTRUCTION |
| --- | --- |
| LD R0, (R10) + | I0 |
| LD R1, (R11) + | I1 |
| MM R0, R1, R2 | I2 |
| ADD R2, R3, R3 | I3 |
| DEC R4 | I4 |
| BRNZR LOOP | I5 |

The instruction stream contained within the SESE basic block set forth in Table 1 performs the following functions. In instruction I0, register R0 is loaded with the contents of memory whose address is contained in R10. The instruction shown above increments the contents of R10 after the address has been fetched from R10. The same statement can be made for instruction I1, with the exception that register R1 is loaded and register R11 is incremented. Instruction I2 causes the contents of registers R0 and R1 to be multiplied and the result is stored in register R2. In instruction I3, the contents of register R2 and register R3 are added and the result is stored in register R3. In instruction I4, register R4 is decremented. Instructions I2, I3 and I4 also generate a set of condition codes that reflect the status of their respective execution. In instruction I5, the contents of register R4 are indirectly tested for zero (via the condition codes generated by instruction I4). A branch occurs if the decrement operation produced a non-zero value; otherwise execution proceeds with the first instruction of the next basic block.

Referring to FIG. 1, the first function performed by the TOLL software 110 is to analyze the resource usage of the instructions. In the illustrated example, these are instructions I0 through I5 of Table I. The TOLL software 110 thus analyzes each instruction to ascertain the resource requirements of the instruction.

This analysis is important in determining whether or not any resources are shared by any instructions and, therefore, whether or not the instructions are independent of one another. Clearly, mutually independent instructions can be executed in parallel and are termed "naturally concurrent." Instructions that are independent can be executed in parallel and do not rely on one another for any information nor do they share any hardware resources in other than a read only manner.

On the other hand, instructions that are dependent on one another can be formed into a set wherein each instruction in the set is dependent on every other instruction in that set. The dependency may not be direct. The set can be described by the instructions within the set, or conversely, by the resources used by the instructions in the set. Instructions within different sets are completely independent of one another, that is, there are no resources shared by the sets. Hence, the sets are independent of one another.

In the example of Table 1, the TOLL software will determine that there are two independent sets of dependent instructions:

| Set 1: | CC1: | I0, I1, I2, I3 |
| Set 2: | CC2: | I4, I5 |

As can be seen, instructions I4 and I5 are independent of instructions I0–I3. In set 2, I5 is directly dependent on I4. In set 1, I2 is directly dependent on I0 and I1. Instruction I3 is directly dependent on I2 and indirectly dependent on I0 and I1.

The TOLL software of the present invention detects these independent sets of dependent instructions and assigns a condition code group of designation(s), such as CC1 and CC2, to each set. This avoids the operational dependency that would occur if only one group or set of condition codes were available to the instruction stream.

In other words, the results of the execution of instructions I0 and I1 are needed for the execution of instruction I2. Similarly, the results of the execution of instruction I2 are needed for the execution of instruction I3. In performing this analyses, the TOLL software 110 determines if an instruction will perform a read and/or a write to a resource. This functionality is termed the resource requirement analysis of the instruction stream.

It should be noted that, unlike the teachings of the prior art, the present invention teaches that it is not necessary for dependent instructions to execute on the same processor element. The determination of dependencies is needed only to determine condition code sets and to determine instruction firing times, as will be described later. The present invention can execute dependent instructions on different processor elements, in one illustrated embodiment, because of the context free nature of the processor elements and the total coupling of the processor elements to the shared resources, such as the register files, as will also be described below.

The results of the analysis stage 120, for the example set forth in Table 1, are set forth in Table 2.

TABLE 2

| INSTRUCTION | FUNCTION |
|---|---|
| I0 | Memory Read, Reg. Write, Reg. Read & Write |
| I1 | Memory Read, Reg. Write, Reg. Read & write |
| I2 | Two Reg. Reads, Reg. Write, Set Cond. Code (Set #1) |
| I3 | Two Reg. Reads, Reg. Write, Set Cond. Code (Set #1) |
| I4 | Read Reg., Reg. Write, Set Cond. Code (Set #2) |
| I5 | Read Cond. Code (Set #2) |

In Table 2, for instructions I0 and I1, a register is read and written followed by a memory read (at a distinct address), followed by a register write. Likewise, condition code writes and register reads and writes occur for instructions I2 through I4. Finally, instruction I5 is a simple read of a condition code storage register and a resulting branch or loop.

The second step or pass 130 through the SESE basic block 100 is to add or extend intelligence to each instruction within the basic block. In the preferred embodiment of the invention, this is the assignment of an instruction's execution time relative to the execution times of the other instructions in the stream, the assignment of a processor number on which the instruction is to execute and the assignment of any so-called static shared context storage mapping information that may be needed by the instruction.

In order to assign the firing time to an instruction, the temporal usage of each resource required by the instruction must be considered. In the illustrated embodiment, the temporal usage of each resource is characterized by a "free time" and a "load time." The free time is the last time the resource was read or written by an instruction. The load time is the last time the resource was modified by an instruction. If an instruction is going to modify a resource, it must execute the modification after the last time the resource was used, in other words, after the free time. If an instruction is going to read the resource, it must perform the read after the last time the resource has been loaded, in other words, after the load time.

The relationship between the temporal usage of each resource and the actual usage of the resource is as follows. If an instruction is going to write/modify the resource, the last time the resource is read or written by other instructions (i.e., the "free time" for the resource) plus one time interval will be the earliest firing time for this instruction. The "plus one time interval" comes from the fact that an instruction is still using the resource during the free time. On the other hand, if the instruction reads a resource, the last time the resource is modified by other instructions (i.e., the load time for the resource) plus one time interval will be the earliest instruction firing time. The "plus one time interval" comes from the time required for the instruction that is performing the load to execute.

The discussion above assumes that the exact location of the resource that is accessed is known. This is always true of resources that are directly named such as general registers and condition code storage. However, memory operations may, in general, be to locations unknown at compile time. In particular, addresses that are generated by effective addressing constructs fall in this class. In the previous example, it has been assumed (for the purposes of communicating the basic concepts of TOLL) that the addresses used by instructions I0 and I1 are distinct. If this were not the case, the TOLL software would assure that only those instructions that did not use memory would be allowed to execute in parallel with an instruction that was accessing an unknown location in memory.

The instruction firing time is evaluated by the TOLL software 110 for each resource that the instruction uses. These "candidate" firing times are then compared to determine which is the largest or latest time. The latest time determines the actual firing time assigned to the instruction. At this point, the TOLL software 110 updates all of the resources' free and load times, to reflect the firing time assigned to the instruction. The TOLL software 110 then proceeds to analyze the next instruction.

There are many methods available for determining inter-instruction dependencies within a basic block. The previous discussion is just one possible implementation assuming a specific compiler-TOLL partitioning. Many other compiler- TOLL partitionings and methods for determining inter-instruction dependencies may be possible and realizable to one skilled in the art. Thus, the illustrated TOLL software uses a linked list analysis to represent the data dependencies within a basic block. Other possible data structures that could be used are trees, stacks, etc.

Assume a linked list representation is used for the analysis and representation of the inter-instruction dependencies. Each register is associated with a set of pointers to the instructions that use the value contained in that register. For the matrix multiply example in Table 1, the resource usage is set forth in Table 3:

TABLE 3

| Resource | Loaded By | Read By |
|---|---|---|
| R0 | I0 | I2 |
| R1 | I1 | I2 |
| R2 | I2 | I3 |
| R3 | I3 | I3, I2 |
| R4 | I4 | I5 |
| R10 | I0 | I0 |
| R11 | I1 | I1 |

Thus, by following the "Read by" links and knowing the resource utilization for each instruction, the independencies of Sets 1 and 2, above, are constructed in the analyze instruction stage 120 (FIG. 1) by TOLL 110.

For purposes of analyzing further the example of Table 1, it is assumed that the basic block commences with an arbitrary time interval in an instruction stream, such as, for example, time interval T16. In other words, this particular basic block in time sequence is assumed to start with time interval T16. The results of the analysis in stage 120 are set forth in Table 4.

TABLE 4

| REG | I0 | I1 | I2 | I3 | I4 | I5 |
|---|---|---|---|---|---|---|
| R0 | T16 | | T17 | | | |
| R1 | | T16 | T17 | | | |
| R2 | | | <u>T17</u> | T18 | | |
| R3 | | | | <u>T18</u> | | |
| R4 | | | | | T16 | |
| CC1 | | | T17 | T18 | | |
| CC2 | | | | | | <u>T17</u> |
| R10 | T16 | | | | | |
| R11 | | T16 | | | | |

The vertical direction in Table 4 represents the general registers and condition code storage registers. The horizontal direction in the table represents the instructions in the basic block example of Table 1. The entries in the table represent usage of a register by an instruction. Thus, instruction I0 requires that register R10 be read and written and register R0 written at time T16, the start of execution of the basic block.

Under the teachings of the present invention, there is no reason that registers R1, R11, and R4 cannot also have operations performed on them during time T16. The three instructions, I0, I1, and I4, are data independent of each other and can be executed concurrently during time T16. Instruction I2, however, requires first that registers R0 and R1 be loaded so that the results of the load operation can be multiplied. The results of the multiplication are stored in register R2. Although, register R2 could in theory be operated on in time T16, instruction I2 is data dependent upon the results of loading registers R0 and R1, which occurs during time T16. Therefore, the completion of instruction I2 must occur during or after time frame T17. Hence, in Table 4 above, the entry T17 for the intersection of instruction I2 and register R2 is underlined because it is data dependent. Likewise, instruction I3 requires data in register R2 which first occurs during time T17. Hence, instruction I3 can operate on register R2 only during or after time T18. Instruction I5 depends upon the reading of the condition code storage CC2 which is updated by instruction I4. The reading of the condition code storage CC2 is data dependent upon the results stored in time T16 and, therefore, must occur during or after the next time, T17.

Hence, in stage 130, the object code instructions are assigned "instruction firing times" (IFTS) as set forth in Table 5 based upon the above analysis.

TABLE 5

| OBJECT CODE INSTRUCTION | INSTRUCTION FIRING TIME (IFT) |
|---|---|
| I0 | T16 |
| I1 | T16 |
| I2 | T17 |
| I3 | T18 |
| I4 | T16 |
| I5 | T17 |

Each of the instructions in the sequential instruction stream in a basic block can be performed in the assigned time intervals. As is clear in Table 5, the same six instructions of Table 1, normally processed sequentially in six cycles, can be processed, under the teachings of the present invention, in only three firing times: T16, T17, and T18. The instruction firing time (IFT) provides the "time-driven" feature of the present invention.

The next function performed by stage 130, in the illustrated embodiment, is to reorder the natural concurrencies in the instruction stream according to instruction firing times (IFTs) and then to assign the instructions to the individual logical parallel processors. It should be noted that the reordering is only required due to limitations in currently available technology. If true fully associative memories were available, the reordering of the stream would not be required and the processor numbers could be assigned in a first come, first served manner. The hardware of the instruction selection mechanism could be appropriately modified by one skilled in the art to address this mode of operation.

For example, assuming currently available technology, and a system with four parallel processor elements (PEs) and a branch execution unit (BEU) within each LRD, the processor elements and the branch execution unit can be assigned, under the teachings of the present invention, as set forth in Table 6 below. It should be noted that the processor elements execute all non-branch instructions, while the branch execution unit (BEU) of the present invention executes all branch instructions. These hardware circuitries will be described in greater detail subsequently.

TABLE 6

| Logical Processor Number | T16 | T17 | T18 |
|---|---|---|---|
| 0 | I0 | I2 | I3 |
| 1 | I1 | — | — |
| 2 | I4 | — | — |
| 3 | — | — | — |
| BEU | — | I5(delay) | — |

Hence, under the teachings of the present invention, during time interval T16, parallel processor elements 0, 1, and 2 concurrently process instructions I0, I1, and I4 respectively. Likewise, during the next time interval T17, parallel processor element 0 and the BEU concurrently process instructions I2 and I5 respectively. And finally, during time interval T18, processor element 0 processes instruction I3. During instruction firing times T16, T17, and T18, parallel processor element 3 is not utilized in the example of Table 1. In actuality, since the last instruction is a branch instruction, the branch cannot occur until the last processing is finished in time T18 for instruction I3. A delay field is built into the processing of instruction I5 so that even though it is processed in time interval T17 (the earliest possible time), its execution is delayed so that looping or branching out occurs after instruction I3 has executed.

In summary, the TOLL software 110 of the present illustrated embodiment, in stage 130, examines each individual instruction and its resource usage both as to type and as to location (if known) (e.g., Table 3). It then assigns instruction firing times (IFTs) on the basis of this resource usage (e.g., Table 4), reorders the instruction stream based upon these firing times (e.g., Table 5) and assigns logical processor numbers (LPNs) (e.g., Table 6) as a result thereof.

The extended intelligence information involving the logical processor number (LPN) and the instruction firing time (IFT) is, in the illustrated embodiment, added to each instruction of the basic block as shown in FIGS. 3 and 4. As will also be pointed out subsequently, the extended intelligence (EXT) for each instruction in a basic block (BB) will be correlated with the actual physical processor architecture of the present invention. The correlation is performed by the system hardware. It is important to note that the actual hardware may contain less, the same as, or more physical processor elements than the number of logical processor elements.

The Shared Context Storage Mapping (SCSM) information in FIG. 4 and attached to each instruction in this illustrated and preferred embodiment of the invention, has a static and a dynamic component. The static component of the SCSM information is attached by the TOLL software or compiler and is a result of the static analysis of the instruction stream. Dynamic Information is attached at execution time by a logical resource drive (LRD) as will be discussed later.

At this stage 130, the illustrated TOLL software 110 has analyzed the instruction stream as a set of single entry single exit (SESE) basic blocks (BBs) for natural concurrencies that can be processed individually by separate processor elements (PEs) and has assigned to each instruction an instruction firing time (IFT) and a logical processor number (LPN). Under the teachings of the present invention, the instruction stream is thus pre-processed by the TOLL software to statically allocate all processing resources in advance of execution. This is done once for any given program and is applicable to any one of a number of different program languages such as FORTRAN, COBOL, PASCAL, BASIC, etc.

Referring to FIG. 5, a series of basic blocks (BBs) can form a single execution set (ES) and in stage 140, the TOLL software 110 builds such execution sets (ESs). Once the TOLL software identifies an execution set 500, header 510 and/or trailer 520 information is added at the beginning and/or end of the set. In the preferred embodiment, only header information 510 is attached at the beginning of the set, although the invention is not so limited.

Under the teachings of the present invention, basic blocks generally follow one another in the instruction stream. There may be no need for reordering of the basic blocks even though individual instructions within a basic block, as discussed above, are reordered and assigned extended intelligence information. However, the invention is not so limited. Each basic block is single entry and single exit (SESE) with the exit through a branch instruction. Typically, the branch to another instruction is within a localized neighborhood such as within 400 instructions of the branch. The purpose of forming the execution sets (stage 140) is to determine the minimum number of basic blocks that can exist within an execution set such that the number of "instruction cache faults" is minimized. In other words, in a given execution set, branches or transfers out of an execution set are statistically minimized. The TOLL software in stage 140, can use a number of conventional techniques for solving this linear programming-like problem, a problem which is based upon branch distances and the like. The purpose is to define an execution set as set forth in FIG. 5 so that the execution set can be placed in a hardware cache, as will be discussed subsequently, to minimize instruction cache faults (i.e., transfers out of the execution set).

What has been set forth above is an example, illustrated using Tables 1 through 6, of the TOLL software 110 in a single context application. In essence, the TOLL software determines the natural concurrencies within the instruction streams for each basic block within a given program. The TOLL software adds, in the illustrated embodiment, an instruction firing time (IFT) and a logical processor number (LPN) to each instruction in accordance with the determined natural concurrencies. All processing resources are statically allocated in advance of processing. The TOLL software of the present invention can be used in connection with a number of simultaneously executing different programs, each program being used by the same or different users on a processing system of the present invention as will be described and explained below.

3. General Hardware Description

Referring to FIG. 6, the block diagram format of the system architecture of the present invention, termed the TDA system architecture 600, includes a memory subsystem 610 interconnected to a plurality of logical resource drivers (LRDs) 620 over a network 630. The logical resource drivers 620 are further interconnected to a plurality of processor elements 640 over a network. 650. Finally, the plurality of processor elements 640 are interconnected over a network 670 to the shared resources containing a pool of register set and condition code set files 660. The LRD-memory network 630, the PE-LRD network 650, and the PE-context file network 670 are full access networks that could be composed of conventional crossbar networks, omega networks, banyan networks, or the like. The networks are full access (non-blocking in space) so that, for example, any processor element 640 can access any register file or condition code storage in any context (as defined hereinbelow) file 660. Likewise, any processor element 640 can access any logical resource driver 620 and any logical resource driver 620 can access any portion of the memory subsystem 610. In addition, the PE-LRD and PE-context file networks are non-blocking in time. In other words, these two networks guarantee access to any resource from any resource regardless of load conditions on the network. The architecture of the switching elements of the PE-LRD network 650 and the PE-context file network 670 are considerably simplified since the TOLL software guarantees that collisions in the network will never occur. The diagram of FIG. 6 represents an MIMD system wherein each context file 660 corresponds to at least one user program.

The memory subsystem 610 can be constructed using a conventional memory architecture and conventional memory elements. There are many such architectures and elements that could be employed by a person skilled in the art and which would satisfy the requirements of this system. For example, a banked memory architecture could be used. (*High Speed Memory Systems*, A. V. Pohm and O. P. Agrawal, Reston Publishing Co., 1983.)

The logical resource drivers 620 are unique to the system architecture 600 of the present invention. Each illustrated LRD provides the data cache and instruction selection support for a single user (who is assigned a context file) on a timeshared basis. The LRDs receive execution sets from the various users wherein one or more execution sets for a context are stored on an LRD. The instructions within the basic blocks of the stored execution sets are stored in queues based on the previously assigned logical processor number. For example, if the system has 64 users and 8 LRDs, 8 users would share an individual LRD on a timeshared basis. The operating system determines which user is assigned to which LRD and for how long. The LRD is detailed at length subsequently.

The processor elements 640 are also unique to the TDA system architecture and will be discussed later. These processor elements in one particular aspect of the invention display a context free stochastic property in which the future state of the system depends only on the present state of the system and not on the path by which the present state was achieved. As such, architecturally, the context free processor elements are uniquely different from conventional processor elements in two ways. First, the elements have no internal permanent storage or remnants of past events such as general purpose registers or program status words. Second, the elements do not perform any routing or synchronization functions. These tasks are performed by the TOLL software and are implemented in the LRDs. The significance of the architecture is that the context free processor elements of the present invention are a true shared resource to the LRDs. In another preferred particular embodiment of the invention wherein pipelined processor elements are employed, the processors are not strictly context free as was described previously.

Finally, the register set and condition code set files 660 can also be constructed of commonly available components such as AMD 29300 series register files, available from Advanced Micro Devices, 901 Thompson Place, P.O. Box 3453, Sunnyvale, Calif. 94088. However, the particular configuration of the files 660 illustrated in FIG. 6 is unique under the teachings of the present invention and will be discussed later.

The general operation of the present invention, based upon the example set forth in Table 1, is illustrated with respect to the processor-context register file communication in FIGS. 7a, 7b, and 7c. As mentioned, the time-driven control of the present illustrated embodiment of the invention is found in the addition of the extended intelligence relating to the logical processor number (LPN) and the instruction firing time (IFT) as specifically set forth in FIG. 4. FIG. 7 generally represents the configuration of the processor elements PE0 through PE3 with registers R0 through R5, . . . , R10 and R11 of the register set and condition code set file 660.

In explaining the operation of the TDA system architecture 600 for the single user example in Table 1, reference is made to Tables 3 through 5. In the example, for instruction firing time T16, the context file-PE network 670 interconnects processor element PE0 with registers R0 and R10, processor element PE1 with registers R1 and R11, and processor element PE2 with register R4. Hence, during time T16, the three processor elements PE0, PE1, and PE2 process instructions I0, I1, and I4 concurrently and store the results in registers R0, R10, R1, R11, and R4. During time T16, the LRD 620 selects and delivers the instructions that can fire (execute) during time T17 to the appropriate processor elements. Referring to FIG. 7b, during instruction firing time T17, only processor element PE0, which is now assigned to process instruction I2 interconnects with registers R0, R1, and R2. The BEU (not shown in FIGS. 7a, 7b, and 7c) is also connected to the condition code storage. Finally, referring to FIG. 7c, during instruction firing time T18, processor element PE0 is connected to registers R2 and R3.

Several important observations need to be made. First, when a particular processor element (PE) places results of its operation in a register, any processor element, during a subsequent instruction firing time (IFT), can be interconnected to that register as it executes its operation. For example, processor element PE1 for instruction I1 loads register R1 with the contents of a memory location during IFT T16 as shown in FIG. 7a. During instruction firing time T17, processor element PE0 is interconnected with register R1 to perform an additional operation on the results stored therein. Under the teachings of the present invention, each processor element (PE) is "totally coupled" to the necessary registers in the register file 660 during any particular instruction firing time (IFT) and, therefore, there is no need to move the data out of the register file for delivery to another resource; e.g. in another processor's register as in some conventional approaches.

In other words, under the teachings of the present invention, each processor element can be totally coupled, during any individual instruction firing time, to any shared register in files 660. In addition, under the teachings of the present invention, none of the processor elements has to contend (or wait) for the availability of a particular register or for results to be placed in a particular register as is found in some prior art systems. Also, during any individual firing time, any processor element has full access to any configuration of registers in the register set file 660 as if such registers were its own internal registers.

Hence, under the teachings of the present invention, the intelligence added to the instruction stream is based upon detected natural concurrencies within the object code. The detected concurrencies are analyzed by the TOLL software, which in one illustrated embodiment logically assigns individual logical processor elements (LPNs) to process the instructions in parallel, and unique firing times (IFTs) so that each processor element (PE), for its given instruction, will have all necessary resources available for processing according to its instruction requirements. In the above example, the logical processor numbers correspond to the actual processor assignment, that is, LPN0 corresponds to PE0, LPN1 to PE1, LPN2 to PE2, and LPN3 to PE3. The invention is not so limited since any order such as LPN0 to PE1, LPN1 to PE2, etc. could be used. Or, if the TDA system had more or less than four processors, a different assignment could be used as will be discussed.

The timing control for the TDA system is provided by the instruction firing times, that is, the system is time-driven. As can be observed in FIGS. 7a through 7c, during each individual instruction firing time, the TDA system architecture composed of the processor elements 640 and the PE-register set file network 670, takes on a new and unique particular configuration fully adapted to enable the individual processor elements to concurrently process instructions while making full use of all the available resources. The processor elements can be context free and thereby data, condition, or information relating to past processing is not required, nor does it exist, internally to the processor element. The context free processor elements react only to the requirements of each individual instruction and are interconnected by the hardware to the necessary shared registers.

4. Summary

In summary, the TOLL software 110 for each different program or compiler output 100 analyzes the natural concurrencies existing in each single entry, single exit (SESE) basic block (BB) and adds intelligence, including in one illustrated embodiment, a logical processor number (LPN) and an instruction firing time (IFT), to each instruction. In an MIMD system of the present invention as shown in FIG. 6, each context file would contain data from a different user executing a program. Each user is assigned a different context file and, as shown in FIG. 7, the processor elements (PEs) are capable of individually accessing the necessary resources such as registers and condition codes storage required by the instruction. The instruction itself carries the shared resource information (that is, the registers and condition code storage). Hence, the TOLL software statically allocates only once for each program the necessary information for controlling the processing of the instruction in the TDA system architecture illustrated in FIG. 6 to insure a time-driven decentralized control wherein the memory, the logical resource drivers, the processor elements, and the context shared resources are totally coupled through their respective networks in a pure, non-blocking fashion.

The logical resource drivers (LRDs) 620 receive the basic blocks formed in an execution set and are responsible for delivering each instruction to the selected processor element 640 at the instruction firing time (IFT). While the example shown in FIG. 7 is a simplistic representation for a single user, it is to be expressly understood that the delivery by the logical resource driver 620 of the instructions to the processor elements 640, in a multi-user system, makes full use of the processor elements as will be fully discussed subsequently. Because the timing and the identity of the shared resources and the processor elements are all contained within the extended intelligence added to the instructions by the TOLL software, each processor element 640 can be completely (or in some instances substantially) context free and, in fact, from instruction firing time to instruction firing time can process individual instructions of different users as delivered by the various logical resource drivers. As will be explained, in order to do this, the logical resource drivers 620, in a predetermined order, deliver the instructions to the processor elements 640 through the PE-LRD network 650.

It is the context free nature of the processor elements which allows the independent access by any processor element of the results of data generation/manipulation from any other processor element following the completion of each instruction execution. In the case of processors which are not context free, in order for one processor to access data created by another, specific actions (usually instructions which move data from general purpose registers to memory) are required in order to extract the data from one processor and make it available to another.

It is also the context free nature of the processor elements that permits the true sharing of the processor elements by multiple LRDs. This sharing can be as fine-grained as a single instruction cycle. No programming or special processor operations are needed to save the state of one context (assigned to one LRD), which has control of one or more processor elements, in order to permit control by another context (assigned to a second LRD). In processors which are not context free, which is the case for the prior art, specific programming and special machine operations are required in such state-saving as part of the process of context switching.

There is one additional alternative in implementing the processor elements of the present invention, which is a modification to the context free concept: an implementation which provides the physically total interconnection discussed above, but which permits, under program control, a restriction upon the transmission of generated data to the register file following completion of certain instructions.

In a fully context free implementation, at the completion of each instruction which enters the processor element, the state of the context is entirely captured in the context storage file. In the alternative case, transmission to the register file is precluded and the data is retained within the processor and made available (for example, through data chaining) to succeeding instructions which further manipulate the data. Ultimately, data is transmitted to the register file after some finite sequence of instructions completes; however, it is only the final data that is transmitted.

This can be viewed as a generalization of the case of a microcoded complex instruction as described above, and can be considered a substantially context free processor element implementation. In such an implementation, the TOLL software would be required to ensure that dependent instructions execute on the same processor element until such time as data is ultimately transmitted to the context register file. As with pipelined processor elements, this does not change the overall functionality and architecture of the TOLL software, but mainly affects the efficient scheduling of instructions among processor elements to make optimal use of each instruction cycle on all processor elements.

DETAILED DESCRIPTION

1. Detailed Description of Software

In FIGS. 8 through 11, the details of the TOLL software 110 of the present invention are set forth. Referring to FIG. 8, the conventional output from a compiler is delivered to the TOLL software at the start stage 800. The following information is contained within the conventional compiler output 800: (a) instruction functionality, (b) resources required by the instruction, (c) locations of the resources (if possible), and (d) basic block boundaries. The TOLL software then starts with the first instruction at stage 810 and proceeds to determine "which" resources are used in stage 820 and "how" the resources are used in stage 830. This process continues for each instruction within the instruction stream through stages 840 and 850 as was discussed in the previous section.

After the last instruction is processed, as tested in stage 840, a table is constructed and initialized with the "free time" and "load time" for each resource. Such a =table is set forth in Table 7 for the inner loop matrix multiply example and at initialization, the table contains all zeros. The initialization occurs in stage 860 and once constructed the TOLL software proceeds to start with the first basic block in stage 870.

TABLE 7

| Resource | Load Time | Free Time |
|---|---|---|
| R0 | T0 | T0 |
| R1 | T0 | T0 |
| R2 | T0 | T0 |
| R3 | T0 | T0 |
| R4 | T0 | T0 |
| R10 | T0 | T0 |
| R11 | T0 | T0 |

Referring to FIG. 9, the TOLL software continues the analysis of the instruction stream with the first instruction of the next basic block in stage 900. As stated previously, TOLL performs a static analysis of the instruction stream. Static analysis assumes (in effect) straight line code, that is, each instruction is analyzed as it is seen in a sequential manner. In other words, static analysis assumes that a branch is never taken. For non-pipelined instruction execution, this is not a problem, as there will never be any dependencies that arise as a result of a branch. Pipelined execution is discussed subsequently (although, it can be stated that the use of pipelining will only affect the delay value of the branch instruction).

Clearly, the assumption that a branch is never taken is incorrect. However, the impact of encountering a branch in the instruction stream is straightforward. As stated previously, each instruction is characterized by the resources (or physical hardware elements) it uses. The assignment of the firing time (and in the illustrated embodiment, the logical processor number) is dependent on how the instruction stream accesses these resources. Within this particular embodiment of the TOLL software, the usage of each resource is represented, as noted above, by data structures termed the free and load times for that resource. As each instruction is analyzed in sequence, the analysis of a branch impacts these data structures in the following manner.

When all of the instructions of a basic block have been assigned firing times, the maximum firing time of the current basic block (the one the branch is a member of) is used to update all resources load and free times (to this value). When the next basic block analysis begins, the proposed firing time is then given as the last maximum value plus one. Hence, the load and free times for each of the register resources R0 through R4, R10 and R11 are set forth below in Table 8, for the example, assuming the basic block commences with a time of T16.

TABLE 8

| Resource | Load Time | Free Time |
|---|---|---|
| R0 | T15 | T15 |
| R1 | T15 | T15 |
| R2 | T15 | T15 |
| R3 | T15 | T15 |
| R4 | T15 | T15 |
| R10 | T15 | T15 |
| R11 | T15 | T15 |

Hence, the TOLL software sets a proposed firing time (PFT) in stage 910 to the maximum firing time plus one of the previous basic blocks firing times. In the context of the above example, the previous basic block's last firing time is T15, and the proposed firing time for the instructions in this basic block commence with T16.

In stage 920, the first resource used by the first instruction, which in this case is register R0 of instruction I0, is analyzed. In stage 930, a determination is made as to whether or not the resource is read. In the above example, for instruction I0, register R0 is not read but is written and, therefore, stage 940 is next entered to make the determination of whether or not the resource is written. In this case, instruction I0 writes into register R0 and stage 942 is entered. Stage 942 makes a determination as to whether the proposed firing time (PFT) for instruction I0 is less than or equal to the free time for the resource. In this case, referring to Table 8, the resource free time for register R0 is T15 and, therefore, the instruction proposed firing time of T16 is greater than the resource free time of T15 and the determination is "no" and stage 950 is accessed.

The analysis by the TOLL software proceeds to the next resource which in the case, for instruction I0, is register R10. This resource is both read and written by the instruction. Stage 930 is entered and a determination is made as to whether or not the instruction reads the resource. It does, so stage 932 is entered where a determination is made as to whether the current proposed firing time for the instruction (T16) is less than the resource load time (T15). It is not, so stage 940 is entered. Here a determination is made as to whether the instruction writes the resource. It does; so stage 942 is entered. In this stage a determination is made as to whether the proposed firing time for the instruction (T16) is less than the free time for the resource (T15). It is not, and stage 950 is accessed. The analysis by the TOLL software proceeds either to the next resource (there is none for instruction I0) or to "B" (FIG. 10) if the last resource for the instruction has been processed.

Hence, the answer to the determination at stage 950 is affirmative and the analysis then proceeds to FIG. 10. In FIG. 10, the resource free and load times will be set. At stage 1000, the first resource for instruction I0 is register R0. The first determination in stage 1010 is whether or not the instruction reads the resource. As before, register R0 in instruction I0 is not read but written and the answer to this determination is "no" in which case the analysis then proceeds to stage 1020. In stage 1020, the answer to the determination as to whether or not the resource is written is "yes" and the analysis proceeds to stage 1022. Stage 1022 makes the determination as to whether or not the proposed firing time for the instruction is greater than the resource load time. In the example, the proposed firing time is T16 and, with reference back to Table 8, the firing time T16 is greater than the load time T15 for register R0. Hence, the response to this determination is "yes" and stage 1024 is entered. In stage 1024, the resource load time is set equal to the instruction's proposed firing time and the table of resources (Table 8) is updated to reflect that change. Likewise, stage 1026 is entered and the resource free-time is updated and set equal to the instruction's proposed firing time plus one or T17 (T16 plus one).

Stage 1030 is then entered and a determination made as to whether there are any further resources used by this instruction. There is one, register R10, and the analysis processes this resource. The next resource is acquired at stage 1070. Stage 1010 is then entered where a determination is made as to whether or not the resource is read by the instruction. It is and so stage 1012 is entered where a determination is made as to whether the current proposed firing time (T16) is greater than the resource's free-time (T15). It is, and therefore stage 1014 is entered where the resource's free-time is updated to reflect the use of this resource by this instruction. The method next checks at stage 1020 whether the resource is written by the instruction. It is, and so stage 1022 is entered where a determination is made as to whether or not the current proposed firing time (T16) is greater than the load time of the resource (T15). It is, so stage 1024 is entered. In this stage, the resource's load-time is updated to reflect the firing time of the instruction, that is, the load-time is set to T16. Stage 1026 is then entered where the resource's free-time is updated to reflect the execution of the instruction, that is, the free-time is set to T17. Stage 1030 is then entered where a determination is made as to whether or not this is the last resource used by the instruction. It is, and therefore, stage 1040 is entered. The instruction firing time (IFT) is now set to equal the proposed firing time (PFT) of T16. Stage 1050 is then accessed which makes a determination as to whether or not this is the last instruction in the basic block, which in this case is "no"; and stage 1060 is entered to proceed to the next instruction, I1, which enters the analysis stage at "A1" of FIG. 9.

The next instruction in the example is I1 and the identical analysis is had for instruction I1 for registers R1 and R11 as presented for instruction I0 with registers R0 and R10. In Table 9 below, a portion of the resource Table 8 is modified to reflect these changes. (Instructions I0 and I1 have been fully processed by the TOLL software.)

TABLE 9

| Resource | Load Time | Free Time |
|---|---|---|
| R0 | T16 | T17 |
| R1 | T16 | T17 |
| R10 | T16 | T17 |
| R11 | T16 | T17 |

The next instruction in the basic block example is instruction I2 which involves a read of registers R0 and R1 and a write into register R2. Hence, in stage 910 of FIG. 9, the proposed firing time for the instruction is set to T16 (T15 plus 1). Stage 920 is then entered and the first resource in instruction I2 is register R0. The first determination made in stage 930 is "yes" and stage 932 is entered. At stage 932, a determination is made whether the instruction's proposed firing time of T16 is less than or equal to the resource register R0 load time of T16. It is important to note that the resource load time for register R0 was updated during the analysis of register R0 for instruction I0 from time T15 to time T16. The answer to this determination in stage 932 is that the proposed firing time equals the resource load time (T16 equals T16) and stage 934 is entered. In stage 934, the instruction proposed firing time is updated to equal the resource load time plus one or, in this case, T17 (T16 plus one). The instruction I2 proposed firing time is now updated to T17. Now stage 940 is entered and since instruction I2 does not write resource R0, the answer to the determination is "no" and stage 950 and then stage 960 are entered to process the next resource which in this case is register R1.

Stage 960 initiates the analysis to take place for register R1 and a determination is made in stage 930 whether or not the resource is read. The answer, of course, is "yes" and stage 932 is entered. This time the instruction proposed firing time is T17 and a determination is made whether or not the instruction proposed firing time of T17 is less than or equal to the resource load time for register R1 which is T16. Since the instruction proposed firing time is greater than the register load time (T17 is greater than T16), the answer to this determination is "no" and stage 940. The register is not written by this instruction and, therefore, the analysis proceeds to stage 950. The next resource to be processed for instruction I2, in stage 960, is resource register R2.

The first determination of stage 930 is whether or not this resource R2 is read. It is not and hence the analysis moves to stage 940 and then to stage 942. At this point in time the instruction I2 proposed firing time is T17 and in stage 942 a determination is made whether or not the instruction's proposed firing time of T17 is less than or equal to resources, R2 free time which in Table 8 above is T15. The answer to this determination is "no" and therefore stage 950 is entered. This is the last resource processed for this instruction and the analysis continues in FIG. 10.

Referring to FIG. 10, the first resource R0 for instruction I2 is analyzed. In stage 1010, the determination is made whether or not this resource is read and the answer is "yes." Stage 1012 is then entered to make the determination whether the proposed firing time T17 of instruction I2 is greater than the resource free-time for register R0. In Table 9, the free-time for register R0 is T17 and the answer to the determination is "no" since both are equal. Stage 1020 is then entered which also results in a "no" answer transferring the analysis to stage 1030. Since this is not the last resource to be processed for instruction I2, stage 1070 is entered to advance the analysis to the next resource register R1. Precisely the same path through FIG. 10 occurs for register R1 as for register R0. Next, stage 1070 initiates processing of register R2. In this case, the answer to the determination at stage 1010 is "no" and stage 1020 is accessed. Since register R2 for instruction I2 is written, stage 1022 is accessed. In this case, the proposed firing time of instruction I2 is T17 and the resource load-time is T15 from Table 8. Hence, the proposed firing time is greater than the load time and stage 1024 is accessed. Stages 1024 and 1026 cause the load time and the free time for register R2 to be advanced, respectively, to T17 and T18, and the resource table is updated as shown in FIG. 10:

TABLE 10

| Resource | Load-Time | Free-Time |
|---|---|---|
| R0 | T16 | T17 |
| R1 | T16 | T17 |
| R2 | T17 | T18 |

As this is the last resource processed, for instruction I2, the proposed firing time of T17 becomes the actual firing time (stage 1040) and the next instruction is analyzed.

It is in this fashion that each of the instructions in the inner loop matrix multiply example are analyzed so that when fully analyzed the final resource table appears as in Table 11 below:

TABLE 11

| Resource | Load-Time | Free-Time |
|---|---|---|
| R0 | T16 | T17 |
| R1 | T16 | T17 |
| R2 | T17 | T18 |
| R3 | T18 | T19 |
| R4 | T16 | T17 |
| R10 | T16 | T17 |
| R11 | T16 | T17 |

Referring to FIG. 11, the TOLL software, after performing the tasks set forth in FIGS. 9 and 10, enters stage 1100. Stage 1100 sets all resource free and load times to the maximum of those within the given basic block. For example, the maximum time set forth in Table 11 is T19 and, therefore, all free and load times are set to time T19. Stage 1110 is then entered to make the determination whether this is the last basic block to be processed. If not, stage 1120 is entered to proceed with the next basic block. If this is the last basic block, stage 1130 is entered and starts again with the first basic block in the instruction stream. The purpose of this analysis is to logically reorder the instructions within each basic block and to assign logical processor numbers to each instruction. This is summarized in Table 6 for the inner loop matrix multiply example. Stage 1140 performs the function of sorting the instruction in each basic block in ascending order using the instruction firing time (IFT) as the basis. Stage 1150 is then entered wherein the logical processor numbers (LPNs) are assigned. In making the assignment of the processor elements, the instructions of a set, that is those having the same instruction firing time (IFT), are assigned logical processor numbers on a first come, first serve basis. For example, in reference back to Table 6, the first set of instructions for firing time T16 are I0, I1, and I4. These instructions are assigned respectively to processors PE0, PE1, and PE2. Next, during time T17, the second set of instructions I2 and I5 are assigned to processors PE0 and PE1, respectively. Finally, during the final time T18, the final instruction I3 is assigned to processor PE0. It is to be expressly understood that the assignment of the processor elements could be effected using other methods and is based upon the actual architecture of the processor element and the system. As is clear, in the preferred embodiment the set of instructions are assigned to the logical processors on a first in time basis. After making the assignment, stage 1160 is entered to determine whether or not the last basic block has been processed and if not, stage 1170 brings forth the next basic block and the process is repeated until finished.

Hence, the output of the TOLL software, in this illustrated embodiment, results in the assignment of the instruction firing time (IFT) for each of the instructions as shown in FIG. 4. As previously discussed, the instructions are reordered, based upon the natural concurrencies appearing in the instruction stream, according to the instruction firing times; and, then, individual logical processors are assigned as shown in Table 6. While the discussion above has concentrated on the inner loop matrix multiply example, the analysis set forth in FIGS. 9 through 11 can be applied to any SESE basic block (BB) to detect the natural concurrencies contained therein and then to assign the instruction firing times (IFTS) and the logical processor numbers (LPNs) for each user's program. This intelligence can then be added to the reordered instructions within the basic block. This is only done once for a given program and provides the necessary time-driven decentralized control and processor mapping information to run on the TDA system architecture of the present invention.

The purpose of the execution sets, referring to FIG. 12, is to optimize program execution by maximizing instruction cache hits within an execution set or, in other words, to statically minimize transfers by a basic block within an execution set to a basic block in another execution set. Support of execution sets consists of three major components: data structure definitions, pre-execution time software which prepares the execution set data structures, and hardware to support the fetching and manipulation of execution sets in the process of executing the program.

The execution set data structure consists of a set of one or more basic blocks and an attached header. The header contains the following information: the address 1200 of the start of the actual instructions (this is implicit if the header has a fixed length), the length 1210 of the execution set (or the address of the end of the execution set), and zero or more addresses 1220 of potential successor (in terms of program execution) execution sets.

The software required to support execution sets manipulates the output of the post-compile processing. That processing performs dependency analysis, resource analysis, resource assignment, and individual instruction stream reordering. The formation of execution sets uses one or more algorithms for determining the probable order and frequency of execution of the basic blocks. The basic blocks are grouped accordingly. The possible algorithms are similar to the algorithms used in solving linear programming problems for least-cost routing. In the case of execution sets, cost is associated with branching. Branching between basic blocks contained in the same execution set incurs no penalty with respect to cache operations because it is assumed that the instructions for the basic blocks of an execution set are resident in the cache in the steady state. Cost is then associated with branching between basic blocks of different execution sets, because the instructions of the basic blocks of a different execution set are assumed not to be in cache. Cache misses delay program execution while the retrieval and storage of the appropriate block from main memory to cache is made.

There are several possible algorithms which can be used to assess and assign costs under the teaching of the present invention. One algorithm is the static branch cost approach. In accordance with this method, one begins by placing basic blocks into execution sets based on block contiguity and a maximum allowable execution set size (this would be an implementation limit, such as maximum instruction cache size). The information about branching between basic blocks is known and is an output of the compiler. Using this information, the apparatus calculates the "cost" of the resulting grouping of basic blocks into execution sets based on the number of (static) branches between basic blocks in different execution sets. The apparatus can then use standard linear programming techniques to minimize this cost function, thereby obtaining the "optimal" grouping of basic blocks into execution sets. This algorithm has the advantage of ease of implementation; however, it ignores the actual dynamic branching patterns which occur during actual program execution.

Other algorithms could be used in accordance with the teachings of the present invention which provide a better estimation of actual dynamic branch patterns. One example would be the collection of actual branch data from a program execution, and the resultant re-grouping of the basic blocks using a weighted assignment of branch costs based on the actual inter-block branching. Clearly, this approach is data dependent. Another approach would be to allow the programmer to specify branch probabilities, after which the weighted cost assignment would be made. This approach has the disadvantages of programmer intervention and programmer error. Still other approaches would be based using parameters, such as limiting the number of basic blocks per execution set, and applying heuristics to these parameters.

The algorithms described above are not unique to the problem of creating execution sets. However, the use of execution sets as a means of optimizing instruction cache performance is novel. Like the novelty of pre-execution time assignment of processor resources, the pre-execution time grouping of basic blocks for maximizing cache performance is not found in prior art.

The final element required to support the execution sets is the hardware. As will be discussed subsequently, this hardware includes storage to contain the current execution set starting and ending addresses and to contain the other execution set header data. The existence of execution sets and the associated header data structures are, in fact, transparent to the actual instruction fetching from cache to the processor elements. The latter depends strictly upon the individual instruction and branch addresses. The execution set hardware operates independently of instruction fetching to control the movement of instruction words from main memory to the instruction cache. This hardware is responsible for fetching basic blocks of instructions into the cache until either the entire execution set resides in cache or program execution has reached a point that a branch has occurred to a basic block outside the execution set. At this point, since the target execution set is not resident in cache, the execution set hardware begins fetching the basic blocks belonging to the target execution set.

Referring to FIG. 13, the structure of the register set file 660 for context file zero (the structure being the same for each context file) has L+1 levels of register sets with each register set containing n+1 separate registers. For example, n could equal 31 for a total of 32 registers. Likewise, the L could equal 15 for a total of 16 levels. Note that these registers are not shared between levels; that is, each level has a set of registers which is physically distinct from the registers of each other level.

Each level of registers corresponds to that group of registers available to a subroutine executing at a particular depth relative to the main program. For example, the set of registers at level zero can be available to the main program; the set of registers at level one can be available to a first level subroutine that is called directly from the main program; the set of registers at level two can be available to any subroutine (a second level subroutine) called directly by a first level subroutine; the set of registers at level three can be available to any subroutine called directly by a second level subroutine; and so on.

As these sets of registers are independent, the maximum number of levels corresponds to the number of subroutines that can be nested before having to physically share any registers between subroutines, that is, before having to store the contents of any registers in main memory. The register sets, in their different levels, constitute a shared resource of the present invention and significantly saves system overhead during subroutine calls since only rarely do sets of registers need to be stored, for example in a stack, in memory.

Communication between different levels of subroutines takes place, in the preferred illustrated embodiment, by allowing each subroutine up to three possible levels from which to obtain a register: the current level, the previous (calling) level (if any) and the global (main program) level. The designation of which level of registers is to be accessed, that is, the level relative to the presently executing main program or subroutine, uses the static SCSM information attached to the instruction by the TOLL software. This information designates a level relative to the instruction to be processed. This can be illustrated by a subroutine call for a SINE function that takes as its argument a value representing an angular measure and returns the trigonometric SINE of that measure. The main program is set forth in Table 12; and the subroutine is set forth in Table 13.

TABLE 12

| Main Program | Purpose |
|---|---|
| LOAD X, R1 | Load X from memory into Reg R1 for parameter passing |
| CALL SINE | Subroutine Call - Returns result in Reg R2 |

TABLE 12-continued

| Main Program | Purpose |
|---|---|
| LOAD R2, R3 | Temporarily save results in Reg R3 |
| LOAD Y, R1 | Load Y from memory into Reg R1 for parameter passing |
| CALL SINE | Subroutine Call - Returns result in Reg R2 |
| MULT R2, R3, R4 | Multiply Sin (x) with Sin (y) and store result in Reg R4 |
| STORE R4, Z | Store final result in memory at Z | the SINE subroutine is set forth in Table 13:

TABLE 13

| Instruction | Subroutine | Purpose |
|---|---|---|
| I0 | Load R1(L0), R2 | Load Reg R2, level 1 with contents of Reg R1, level 0 |
| Ip-1 | (Perform SINE), R7 | Calculate SINE function and store result in Reg R7, level 1 |
| Ip | Load R7, R2(L0) | Load Reg R2, level 0 with contents of Reg R7, level 1 |

Hence, under the teachings of the present invention and with reference to FIG. 14, instruction I0 of the subroutine loads register R2 of the current level (the subroutine's level or called level) with the contents of register R1 from the previous level (the calling routine or level). Note that the subroutine has a full set of registers with which to perform the processing independent of the register set of the calling routine. Upon completion of the subroutine call, instruction Ip causes register R7 of the current level to be stored in register R2 of the calling routine's level (which returns the results of the SINE routine back to the calling program's register set).

As described in more detail in connection with FIG. 22, the transfer between the levels occurs through the use of the SCSM dynamically generated information which can contain the absolute value of the current procedural level of the instruction (that is, the level of the called routine), the previous procedural level (that is, the level of the calling routine) and the context identifier. The absolute dynamic SCSM level information is generated by the LRD from the relative (static) SCSM information provided by the TOLL software. The context identifier is only used when processing a number of programs in a multi-user system. The relative SCSM information is shown in Table 13 for register R1 (of the calling routine) as R1(L0) and for register R2 as R2(L0). All registers of the current level have appended an implied (00) signifying the current procedural level.

This method and structure described in connection with FIGS. 13 and 14 differ substantially from prior art approaches where physical sharing of the same registers occurs between registers of a subroutine and its calling routine. By thereby limiting the number of registers that are available for use by the subroutine, more system overhead for storing the registers in main memory is required. See, for example, the MIPS approach as set forth in "Reduced Instruction Set Computers" David A. Patterson, Communications of the ACM, January, 1985, Vol. 28, No. 1, Pgs. 8-21. In that reference, the first sixteen registers are local registers to be used solely by the subroutine, the next eight registers, registers 16 through 23, are shared between the calling routine and the subroutine, and final eight registers, registers 24 through 31 are shared between the global (or main) program and the subroutine. Clearly, out of 32 registers that are accessible by the subroutine, only 16 are dedicated solely for use by the subroutine in the processing of its program. In the processing of complex subroutines, the limited number of registers that are dedicated solely to the subroutine may not (in general) be sufficient for the processing of the subroutine. Data shuffling (entailing the storing of intermediate data in memory) must then occur, resulting in significant overhead in the processing of the routine.

Under the teachings of the present invention, the relative transfers between the levels which are known to occur at compile time are specified by adding the requisite information to the register identifiers as shown in FIG. 4 (the SCSM data), to appropriately map the instructions between the various levels. Hence, a completely independent set of registers is available to the calling routine and to each level of subroutine. The calling routine, in addition to accessing its own complete set of registers, can also gain direct access to a higher set of registers using the aforesaid static SCSM mapping code which is added to the instruction, as previously described. There is literally no reduction in the size of the register set available to a subroutine as specifically found in prior art approaches. Furthermore, the mapping code for the SCSM information can be a field of sufficient length to access any number of desired levels. For example, in one illustrated embodiment, a calling routine can access up to seven higher levels in addition to its own registers with a field of three bits. The present invention is not to be limited to any particular number of levels nor to any particular number of registers within a level. Under the teachings of the present invention, the mapping shown in FIG. 14 is a logical mapping and not a conventional physical mapping. For example, three levels, such as the calling routine level, the called level, and the global level require three bit maps. The relative identification of the levels can be specified by a two bit word in the static SCSM, for example, the calling routine by (00), the subordinate level by (01), and the global level by (11). Thus, each user's program is analyzed and the static SCSM relative procedural level information, also designated a window code, is added to the instructions prior to the issuance of the user program to a specific LRD. Once the user is assigned to a specific LRD, the static SCSM level informatin is used to generate the LRD dependent and dynamic SCSM information which is added as it is needed.

2. Detailed Description of the Hardware

As shown in FIG. 6, the TDA system 600 of the present invention is composed of memory 610, logical resource drivers (LRD) 620, processor elements (PEs) 640, and shared context storage Files 660. The following detailed description starts with the logical resource drivers since the TOLL software output is loaded into this hardware.

a. Logical Resource Drivers (LRDs)

The details of a particular logical resource driver (LRD) is set forth in FIG. 15. As shown in FIG. 6, each logical resource driver 620 is interconnected to the LRD-memory network 630 on one side and to the processor elements 640 through the PE-LRD network 650 on the other side. If the present invention were a SIMD machine, then only one LRD is provided and only one context file is provided. For MIMD capabilities, one LRD and one context file is provided for each user so that, in the embodiment illustrated in FIG. 6, up to "n" users can be accommodated.

The logical resource driver 620 is composed of a data cache section 1500 and an instruction selection section 1510. In the instruction selection section, the following components are interconnected. An instruction cache address translation unit (ATU) 1512 is interconnected to the LRD-memory network 630 over a bus 1514. The instruction cache ATU 1512 is further interconnected over a bus 1516 to an instruction cache control circuit 1518. The instruction cache control circuit 1518 is interconnected over lines 1520 to a series of cache partitions 1522a, 1522b, 1522c, and 1522d. Each of the cache partitions is respectively connected over busses 1524a, 1524b, 1524c, and 1524d to the LRD-memory network 630. Each cache partition circuit is further interconnected over lines 1536a, 1536b, 1536c, and 1536d to a processor instruction queue (PIQ) bus interface unit 1544. The PIQ bus interface unit 1544 is connected over lines 1546 to a branch execution unit (BEU) 1548 which in turn is connected over lines 1550 to the PE-context file network 670. The PIQ bus interface unit 1544 is further connected over lines 1552a, 1552b, 1552c, and 1552d to a processor instruction queue (PIQ) buffer unit 1560 which in turn is connected over lines 1562a, 1562b, 1562c, and 1562d to a processor instruction queue (PIQ) processor assignment circuit 1570. The PIQ processor assignment circuit 1570 is in turn connected over lines 1572a, 1572b, 1572c, and 1572d to the PE-LRD network 650 and hence to the processor elements 640.

On the data cache portion 1500, a data cache ATU 1580 is interconnected over bus 1582 to the LRD-memory network 630 and is further interconnected over bus 1584 to a data cache control circuit 1586 and over lines 1588 to a data cache interconnection network 1590. The data cache control 1586 is also interconnected to data cache partition circuits 1592a, 1592b, 1592c and 1592d over lines 1593. The data cache partition circuits, in turn, are interconnected over lines 1594a, 1594b, 1594c, and 1594d to the LRD-memory network 630. Furthermore, the data cache partition circuits 1592 are interconnected over lines 1596a, 1596b, 1596c, and 1596d to the data cache interconnection network 1590. Finally, the data cache interconnection network 1590 is interconnected over lines 1598a, 1598b, 1598c, and 1598d to the PE-LRD network 650 and hence to the processor elements 640.

In operation, each logical resource driver (LRD) 620 has two sections, the data cache portion 1500 and the instruction selection portion 1510. The data cache portion 1500 acts as a high speed data buffer between the processor elements 640 and memory 610. Note that due to the number of memory requests that must be satisfied per unit time, the data cache 1500 is interleaved. All data requests made to memory by a processor element 640 are issued on the data cache interconnection network 1590 and intercepted by the data cache 1592. The requests are routed to the appropriate data cache 1592 by the data cache interconnection network 1590 using the context identifier that is part of the dynamic SCSM information attached by the LRD to each instruction that is executed by the processors. The address of the desired datum determines in which cache partition the datum resides. If the requested datum is present (that is, a data cache hit occurs), the datum is sent back to the requesting processor element 640.

If the requested datum is not present in data cache, the address delivered to the cache 1592 is sent to the data cache ATU 1580 to be translated into a system address. The system address is then issued to memory. In response, a block of data from memory (a cache line or block) is delivered into the cache partition circuits 1592 under control of data cache control 1586. The requested data, that is resident in this cache block, is then sent through the data cache interconnection network 1590 to the requesting processor element 640. It is to be expressly understood that this is only one possible design. The data cache portion is of conventional design and many possible implementations are realizable to one skilled in the art. As the data cache is of standard functionality and design, it will not be discussed further.

The instruction selection portion 1510 of the LRD has three major functions; instruction caching, instruction queueing and branch execution. The system function of the instruction cache portion of selection portion 1510 is typical of any instruction caching mechanism. It acts as a high speed instruction buffer between the processors and memory. However, the current invention presents methods and an apparatus configuration for realizing this function that are unique.

One purpose of the instruction portion 1510 is to receive execution sets from memory, place the sets into the caches 1522 and furnish the instructions within the sets, on an as needed basis, to the processor elements 640. As the system contains multiple, generally independent, processor elements 640, requests to the instruction cache are for a group of concurrently executable instructions. Again, due to the number of requests that must be satisfied per unit time, the instruction cache is interleaved. The group size ranges from none to the number of processors available to the users. The groups are termed packets, although this does not necessarily imply that the instructions are stored in a contiguous manner. Instructions are fetched from the cache on the basis of their instruction firing time (IFT). The next instruction firing time register contains the firing time of the next packet of instructions to be fetched. This register may be loaded by the branch execution unit 1548 of the LRD as well as incremented by the cache control unit 1518 when an instruction fetch has been completed.

The next IFT register (NIFTR) is a storage register that is accessible from the context control unit 1518 and the branch execution unit 1548. Due to its simple functionality, it is not explicitly shown. Technically, it is a part of the instruction cache control unit 1518, and is further buried in the control unit 1660 (FIG. 16). The key point here is that the NIFTR is merely a storage register which can be incremented or loaded.

The instruction cache selection portion 1510 receives the instructions of an execution set from memory over bus 1524 and, in a round robin manner, places instructions word into each cache partitions, 1522a, 1522b, 1522c and 1522d. In other words, the instructions in the execution set are directed so that the first instruction is delivered to cache partition 1522a, the second instruction to cache partition 1522b, the third instruction to cache partition 1522c, and the fourth instruction to cache partition 1522d. The fifth instruction is then directed to cache partition 1522a, and so on until all of the instructions in the execution set are delivered into the cache partition circuits.

All the data delivered to the cache partitions are not necessarily stored in the cache. As will be discussed, the execution set header and trailer may not be stored. Each cache partition attaches a unique identifier (termed a tag) to all the information that is to be stored in that cache partition. The identifier is used to verify that information obtained from the cache is indeed the information desired.

When a packet of instructions is requested, each cache partition determines if the partition contains an instruction that is a member of the requested packet. If none of the partitions contain an instruction that is a member of the requested packet (that is, a miss occurs), the execution set that contains the requested packet is requested from memory in a manner analogous to a data cache miss.

If a hit occurs (that is, at least one of the partitions 1522 contains an instruction from the requested packet), the partition(s) attach any appropriate dynamic SCSM information to the instruction(s). The dynamic SCSM information, which can be attached to each instruction, is important for multi-user applications. The dynamically attached SCSM information identifies the context file (see FIG. 6) assigned to a given user. Hence, under the teachings of the present invention, the system 600 is capable of delay free switching among many user context files without requiring a master processor or access to memory.

The instruction(s) are then delivered to the PIQ bus interface unit 1544 of the LRD 620 where it is routed to the appropriate PIQ buffers 1560 according to the logical processor number (LPN) contained in the extended intelligence that the TOLL software, in the illustrated embodiment, has attached to the instruction. The instructions in the PIQ buffer unit 1560 are buffered for assignment to the actual processor elements 640. The processor assignment is performed by the PIQ processor assignment unit 1570. The assignment of the physical processor elements is performed on the basis of the number of processor elements currently available and the number of instructions that are available to be assigned. These numbers are dynamic. The selection process is set forth below.

The details of the instruction cache control 1518 and of each cache partition 1522 of FIG. 15 are set forth in FIG. 16. In each cache partition circuit 1522, five circuits are utilized. The first circuit is the header route circuit 1600 which routes an individual word in the header of the execution set over a path 1520b to the instruction cache context control unit 1660. The control of the header route circuit 1600 is effected over path 1520a by the header path select circuit 1602. The header path select circuit 1602 based upon the address received over lines 1520b from the control unit 1660 selectively activates the required number of header routers 1600 in the cache partitions. For example, if the execution set has two header words, only the first two header route circuits 1600 are activated by the header path select circuit 1602 and therefore two words of header information are delivered over bus 1520b to the control unit 1660 from the two activated header route circuits 1600 of cache partition circuits 1522a and 1522b (not shown). As mentioned, successive words in the execution set are delivered to successive cache partition circuits 1522.

For example, assume that the data of Table 1 represents an entire execution set and that appropriate header words appear at the beginning of the execution set. The instructions with the earliest instruction firing times (IFTs) are listed first and for a given IFT, those instructions with the lowest logical processor number are listed first. The table reads:

TABLE 14

| |
| --- |
| Header Word 1 |
| Header Word 2 |
| I0 (T16) (PE0) |
| I1 (T16) (PE1) |
| I4 (T16) (PE2) |
| I2 (T17) (PE0) |

TABLE 14-continued

I5 (T17) (PE1)
I3 (T18) (PE0)

Hence, the example of Table 1 (that is, the matrix multiply inner loop), now has associated with it two header words and the extended information defining the firing time (IFT) and the logical processor number (LPN). As shown in Table 14, the instructions were reordered by the TOLL software according to the firing times. Hence, as the execution set shown in Table 14 is delivered through the LRD-memory network 630 from memory, the first word (Header Word 1) is routed by partition CACHE0 to the control unit 1660. The second word (Header Word 2) is routed by partition CACHE1 (FIG. 15) to the control unit 1660. Instruction I0 is delivered to partition CACHE2, instruction I1 to partition CACHE3, instruction I2 to partition CACHE0, and so forth. As a result, the cache partitions 1522 now contain the instructions as shown in Table 15:

TABLE 15

| Cache0 | Cache1 | Cache2 | Cache3 |
|--------|--------|--------|--------|
|        |        | I0     | I1     |
| I4     | I2     | I5     | I3     |

It is important to clarify that the above example has only one basic block in the execution set (that is, it is a simplistic example). In actuality, an execution set would have a number of basic blocks.

The instructions are then delivered for storage into a cache random access memory (RAM) 1610 resident in each cache partition. Each instruction is delivered from the header router 1600 over a bus 1602 to the tag attacher circuit 1604 and then over a line 1606 into the RAM 1610. The tag attacher circuit 1604 is under control of a tag generation circuit 1612 and is interconnected therewith over a line 1520c. Cache RAM 1610 could be a conventional cache high speed RAM as found in conventional superminicomputers.

The tag generation circuit 1612 provides a unique identification code (ID) for attachment to each instruction before storage of that instruction in the designated RAM 1610. The assigning of process identification-tags to instructions stored in cache circuits is conventional and is done to prevent aliasing of the instructions. "Cache Memories" by Alan J. Smith, ACM Computing Surveys, Vol. 14, September, 1982. The tag comprises a sufficient amount of information to uniquely identify it from each other instruction and user. The illustrated instructions already include the IFT and LPN, so that subsequently, when instructions are retrieved for execution, they can be fetched based on their firing times. As shown in Table 16, below, each instruction containing the extended information and the hardware tag is stored, as shown, for the above example:

TABLE 16

| CACHE0: | I4(T16)(PE2)(ID2) |
| CACHE1: | I2(T17)(PE0)(ID3) |
| CACHE2: | I0(T16)(PE0)(ID0) |
|         | I5(T17)(PE1)(ID4) |
| CACHE3: | I1(T16)(PE1)(ID1) |
|         | I3(T18)(PE0)(ID5) |

As stated previously, the purpose of the cache partition circuits 1522 is to provide a high speed buffer between the slow main memory 610 and the fast processor elements 640. Typically, the cache RAM 1610 is a high speed memory capable of being quickly accessed. If the RAM 1610 were a true associative memory, as can be witnessed in Table 16, each RAM 1610 could be addressed based upon instruction firing times (IFTs). At the present time, such associative memories are not economically justifiable and an IFT to cache address translation circuit 1620 must be utilized. Such a circuit is conventional in design and controls the addressing of each RAM 1610 over a bus 1520d. The purpose of circuit 1620 is to generate the RAM address of the desired instructions given the instruction firing time. Hence, for instruction firing time T16, CACHE0, CACHE2, and CACHE3, as seen in Table 16, would produce instructions I4, I0, and I1 respectively.

When the cache RAMs 1610 are addressed, those instructions associated with a specific firing time are delivered over lines 1624 into a tag compare and privilege check circuit 1630. The purpose of the tag compare and privilege check circuit 1630 is to compare the hardware tags (ID) to generated tags to verify that the proper instruction has been delivered. The reference tag is generated through a second tag generation circuit 1632 which is interconnected to the tag compare and privilege check circuit 1630 over a line 1520e. A privilege check is also performed on the delivered instruction to verify that the operation requested by the instruction is permitted given the privilege status of the process (e.g., system program, application program, etc.). This is a conventional check performed by computer processors which support multiple levels of processing states. A hit/miss circuit 1640 determines which RAMs 1610 have delivered the proper instructions to the PIQ bus interface unit 1544 in response to a specific instruction fetch request.

For example, and with reference back to Table 16, if the RAMs 1610 are addressed by circuit 1620 for instruction firing time T16, CACHE0, CACHE2, and CACHE3 would respond with instructions thereby comprising a hit indication on those cache partitions. Cache 1 would not respond and that would constitute a miss indication and this would be determined by circuit 1640 over line 1520g. Thus, each instruction, for instruction firing time T16, is delivered over bus 1632 into the SCSM attacher 1650 wherein dynamic SCSM information, if any, is added to the instruction by an SCSM attacher hardware 1650. For example, hardware 1650 can replace the static SCSM procedural level information (which is a relative value) with the actual procedural level values. The actual values are generataed from a procedural level counter data and the static SCSM information.

When all of the instructions associated with an individual firing time have been read from the RAM 1610, the hit and miss circuit 1640 over lines 1646 informs the instruction cache control unit 1660 of this information. The instruction cache context control unit 1660 contains the next instruction firing time register, a part of the instruction cache control 1518 which increments the instruction firing time to the next value. Hence, in the example, upon the completion of reading all instructions associated with instruction firing time T16, the instruction cache context control unit 1660 increments to the next firing time, T17, and delivers this information over lines 1664 to an access resolution circuit 1670, and over lines 1520f to the tag compare and privilege check circuit 1630. Also note that there may be firing times which have no valid instructions, possibly due to operational dependencies detected by the TOLL software. In this case, no instructions would be fetched from the cache and transmitted to the PIQ interface.

The access resolution circuit 1670 coordinates which circuitry has access to the instruction cache RAMs 1610.

Typically, these RAMs can satisfy only a single request at each clock cycle. Since there could be two requests to the RAMs at one time, an arbitration method must be implemented to determine which circuitry obtains access. This is a conventional issue in the design of cache memory, and the access resolution circuit resolves the priority question as is well known in the field.

The present invention can and preferably does support several users simultaneously in both time and space. In previous prior art approaches (CDC, IBM, etc.), multi-user support was accomplished solely by timesharing the processors). In other words, the processors were shared in time. In this system, multi-user support is accomplished (in space) by assigning an LRD to each user that is given time on the processor elements. Thus, there is a spatial aspect to the sharing of the processor elements. The operating system of the machine deals with those users assigned to the same LRD in a timeshared manner, thereby adding the temporal dimension to the sharing of the processors.

Multi-user support is accomplished by the multiple LRDS, the use of plural processor elements, and the multiple context files 660 supporting the register files and condition code storage. As several users may be executing in the processor elements at the same time, additional pieces of information must be attached to each instruction prior to its execution to uniquely identify the instruction source and any resources that it may use. For example, a register identifier must contain the absolute value of the subroutine procedural level and the context identifier as well as the actual register number. Memory addresses must also contain the LRD identifier from which the instruction was issued to be properly routed through the LRD-Memory interconnection network to the appropriate data cache.

The additional and required information comprises two components, a static and a dynamic component; and the information is termed "shared context storage mapping" (SCSM). The static information results from the compiler output and the TOLL software gleans the information from the compiler generated instruction stream and attaches the register information to the instruction prior to its being received by an LRD.

The dynamic information is hardware attached to the instruction by the LRD prior to its issuance to the processors. This information is composed of the context/LRD identifier corresponding to the LRD issuing the instruction, the absolute value of the current procedural level of the instruction, the process identifier of the current instruction stream, and preferably the instruction status information that would normally be contained in the processors of a system having processors that are not context free. This later information would be composed of error masks, floating point format modes, rounding modes, and so on.

In the operation of the circuitry in FIG. 16, one or more execution sets are delivered into the instruction cache circuitry. The header information for each set is delivered to one or more successive cache partitions and is routed to the context control unit 1660. The instructions in the execution set are then individually, on a round robin basis, routed to each successive cache partition unit 1522. A hardware identification tag is attached to each instruction and the instruction is then stored in RAM 1610. As previously discussed, each execution set is of sufficient length to minimize instruction cache defaults and the RAM 1610 is of sufficient size to store the execution sets. When the processor elements require the instructions, the number and cache locations of the valid instructions matching the appropriate IFTs are determined. The instructions stored in the RAM's 1610 are read out; the identification tags are verified; and the privilege status checked. The instructions are then delivered to the PIQ bus interface unit 1544. Each instruction that is delivered to the PIQ bus interface unit 1544, as is set forth in Table 17, includes the identification tag (ID) and the hardware added SCSM information.

TABLE 17

| CACHE0: | I4(T16)(PE2)(ID2)(SCSM0) |
|---|---|
| CACHE1: | I2(T17)(PE0)(ID3)(SCSM1) |
| CACHE2: | I0(T16)(PE0)(ID0)(SCSM2) |
|  | I5(T17)(PE1)(ID4)(SCSM3) |
| CACHE3: | I1(T16)(PE1)(ID1)(SCSM4) |
|  | I3(T18)(PE0)(ID5)(SCSM5) |

If an instruction is not stored in RAM 1610, a cache miss occurs and a new execution set containing the instruction is read from main memory over lines 1523.

In FIG. 17, the details of the PIQ bus interface unit 1544 and the PIQ buffer unit 1560 are set forth. Referring to FIG. 17, the PIQ bus interface unit 1544 receives instructions as set forth in Table 17, above, over lines 1536. A search tag hardware 1702 has access to the value of the present instruction firing time over lines 1549 and searches the cache memories 1522 to determine the address(es) of those registers containing instructions having the correct firing times. The search tag hardware 1702 then makes available to the instruction cache control circuitry 1518 the addresses of those memory locations for determination by the instruction cache control of which instructions to next select for delivery to the PIQ bus interface 1544.

These instructions access, in parallel, a two-dimensional array of bus interface units (BIU's) 1700. The bus interface units 1700 are interconnected in a full access non-blocking network by means of connections 1710 and 1720, and connect over lines 1552 to the PIQ buffer unit 1560. Each bus interface unit (BIU) 1700 is a conventional address comparison circuit composed of: TI 74L85 4 bit magnitude comparators, Texas Instruments Company, P.O. Box 225012, Dallas, Tex. 75265. In the matrix multiply example, for instruction firing time T16, CACHE0 contains instruction I4 and CACHE3 (corresponding to CACHE n in FIG. 17) contains instruction I1. The logical processor number assigned to instruction I4 is PE2. The logical processor number PE2 activates a select (SEL) signal of the bus interface unit 1700 for processor instruction queue 2 (this is the BIU3 corresponding to the CACHE0 unit containing the instruction). In this example, only that BIU3 is activated and the remaining bus interface units 1700 for that BIU3 row and column are not activated. Likewise, for CACHE3 (CACHE n in FIG. 17), the corresponding BIU2 is activated for processor instruction QUEUE 1.

The PIQ buffer unit 1560 is comprised of a number of processor instruction queues 1730 which store the instructions received from the PIQ bus interface unit 1544 in a first in-first out (FIFO) fashion as shown in Table 18:

TABLE 18

| PIQ0 | PIQ1 | PIQ2 | PIQ3 |
|---|---|---|---|
| I0 | I1 | I4 | — |
| I2 | — | — | — |
| I3 | — | — | — |

In addition to performing instruction queueing functions, the PIQ's 1730 also keep track of the execution status of each instruction that is issued to the processor elements 640.

In an ideal system, instructions could be issued to the processor elements every clock cycle without worrying about whether or not the instructions have finished execution. However, the processor elements 640 in the system may not be able to complete an instruction every clock cycle due to the occurrence of exceptional conditions, such as a data cache miss and so on. As a result, each PIQ 1730 tracks all instructions that it has issued to the processor elements 640 that are still in execution. The primary result of this tracking is that the PIQ's 1730 perform the instruction clocking function for the LRD 620. In other words, the PIQ's 1730 determine when the next firing time register can be updated when executing straightline code. This in turn begins a new instruction fetch cycle.

Instruction clocking is accomplished by having each PIQ 1730 form an instruction done signal that specifies that the instruction(s) issued by a given PIQ either have executed or, in the case of pipelined PE's, have proceeded to the next stage. This is then combined with all other PIQ instruction done signals from this LRD and is used to gate the increment signal that increments the next firing time register. The "done" signals are delivered over lines 1564 to the instruction cache control 1518.

Referring to FIG. 18, the PIQ processor assignment circuit 1570 contains a two dimensional array of network interface units (NIU's) 1800 interconnected as a full access switch to the PE-LRD network 650 and then to the various processor elements 640. Each network interface unit (NIU) 1800 is comprised of the same circuitry as the bus interface units (BIU) 1700 of FIG. 17. In normal operation, the processor instruction queue #0 (PIQ0) can directly access processor element 0 by activating the NIU0 associated with the column corresponding to queue #0, the remaining network interface units NIU0, NIU1, NIU2, NIU3 of the PIQ processor alignment circuit for that column and row being deactivated. Likewise, processor instruction queue #3 (PIQ3) normally accesses processor element 3 by activating the NIU3 of the column associated with queue #3, the remaining NIU0, NIU1, NIU2, and NIU3 of that column and row being deactivated. The activation of the network interface units 1800 is under the control of an instruction select and assignment unit 1810.

Unit 1810 receives signals from the PIQ's 1730 within the LRD that the unit 1810 is a member of over lines 1811, from all other units 1810 (of other LRD's) over lines 1813, and from the processor elements 640 through the network 650. Each PIQ 1730 furnishes the unit 1810 with a signal that corresponds to "I have an instruction that is ready to be assigned to a processor." The other PIQ buffer units furnish this unit 1810 and every other unit 1810 with a signal that corresponds to "My PIQ 1730 (#x) has an instruction ready to be assigned to a processor." Finally, the processor elements furnish each unit 1810 in the system with a signal that corresponds to "I can accept a new instruction."

The unit 1810 on an LRD transmits signals to the PIQs 1730 of its LRD over lines 1811, to the network interface units 1800 of its LRD over lines 1860 and to the other units 1810 of the other LRDs in the system over lines 1813. The unit 1810 transmits a signal to each PIQ 1730 that corresponds to "Gate your instruction onto the PE-LRD interface bus (650)." The unit transmits a select signal to the network interface units 1800. Finally, the unit 1810 transmits a signal that corresponds to "I have used processor element #x" to each other unit 1810 in the system for each processor which it is using.

In addition, each unit 1810 in each LRD has associated with it a priority that corresponds to the priority of the LRD. This is used to order the LRDs into an ascending order from zero to the number of LRDs in the system. The method used for assigning the processor elements is as follows. Given that the LRDs are ordered, many allocation schemes are possible (e.g., round robin, first come first served, time slice, etc.). However, these are implementation details and do not impact the functionality of this unit under the teachings of the present invention.

Consider the LRD with the current highest priority. This LRD gets all the processor elements that it requires and assigns the instructions that are ready to be executed to the available processor elements. If the processor elements are context free, the processor elements can be assigned in any manner whatsoever. Typically, however, assuming that all processors are functioning correctly, instructions from PIQ #0 are routed to processor element #0, provided of course, processor element #0 is available.

The unit 1810 in the highest priority LRD then transmits this information to all other units 1810 in the system. Any processors left open are then utilized by the next highest priority LRD with instructions that can be executed. This allocation continues until all processors have been assigned. Hence, processors may be assigned on a priority basis in a daisy chained manner.

If a particular processor element, for example, element 1 has failed, the instruction selective assignment unit 1810 can deactivate that processor element by deactivating all network instruction units NIU1. It can then, through hardware, reorder the processor elements so that, for example, processor element 2 receives all instructions logically assigned to processor element 1, processor element 3 is now assigned to receive all instructions logically assigned to processor 2, etc. Indeed, redundant processor elements and network interface units can be provided to the system to provide for a high degree of fault tolerance.

Clearly, this is but one possible implementation. Other methods are also realizable.

b. Branch Execution Unit (BEU)

Referring to FIG. 19, the Branch Execution Unit (BEU) 1548 is the unit in the present invention responsible for the execution of all branch instructions which occur at the end of each basic block. There is, in the illustrated embodiment, one BEU 1548 for each supported context and so, with reference to FIG. 6, "n" supported contexts require "In" BEU's. The illustrated embodiment uses one BEU for each supported context because each BEU 1548 is of simple design and, therefore, the cost of sharing a BEU between plural contexts would be more expensive than allowing each context to have its own BEU.

The BEU 1548 executes branches in a conventional manner with the exception that the branch instructions are executed outside the PE's 640. The BEU 1548 evaluates the branch condition and, when the target address is selected, generates and places this address directly into the next instruction fetch register. The target address generation is conventional for unconditional and conditional branches that are not procedure calls or returns. The target address can be (a) taken directly from the instruction, (b) an offset from the current contents of the next instruction fetch register, or (c) an offset of a general purpose register of the context register file.

A return branch from a subroutine is handled in a slightly different fashion. To understand the subroutine return branch, discussion of the subroutine call branch is required. When the branch is executed, a return address is created and stored. The return address is normally the address of the instruction following the subroutine call. The return address can be stored in a stack in memory or in other storage local to the branch execution unit. In addition, the execution of the subroutine call increments the procedural level counter.

The return from a subroutine branch is also an unconditional branch. However, rather than containing the target address within the instruction, this type of branch reads the previously stored return address from storage, decrements the procedural level counter, and loads the next instruction fetch register with the return address. The remainder of the disclosure discusses the evaluation and execution of conditional branches. It should be noted the that techniques described also apply to unconditional branches, since these are, in effect, conditional branches in which the condition is always satisfied. Further, these same techniques also apply to the subroutine call and return branches, which perform the additional functions described above.

To speed up conditional branches, the determination of whether a conditional branch is taken or not, depends solely on the analysis of the appropriate set of condition codes. Under the teachings of the present invention, no evaluation of data is performed other than to manipulate the condition codes appropriately. In addition, an instruction, which generates a condition code that a branch will use, can transmit the code to BEU 1548 as well as to the condition code storage. This eliminates the conventional extra waiting time required for the code to become valid in the condition code storage prior to a BEU being able to fetch it.

The present invention also makes extensive use of delayed branching to guarantee program correctness. When a branch has executed and its effects are being propagated in the system, all instructions that are within the procedural domain of the branch must either have been executed or be in the process of being executed, as discussed in connection with the example of Table 6. In other words, changing the next-instruction pointer (in response to the branch) takes place after the current firing time has been updated to point to the firing time that follows the last (temporally executed) instruction of the branch. Hence, in the example of Table 6, instruction I5 at firing time T17 is delayed until the completion of T18 which is the last firing time for this basic block. The instruction time for the next basic block is then T19.

The functionality of the BEU 1548 can be described as a four-state state machine:

| Stage 1: | Instruction decode |
|---|---|
| | Operation decode |
| | Delay field decode |
| | Condition code access decode |
| Stage 2: | Condition code fetch/receive |
| Stage 3: | Branch operation evaluation |
| Stage 4: | Next instruction fetch |
| | location and firing time update |

Along with determining the operation to be performed, the first stage also determines how long fetching can continue to take place after receipt of the branch by the BEU, and how the BEU is to access the condition codes for a conditional branch, that is, are they received or fetched.

Referring to FIG. 19, the branch instruction is delivered over bus 1546 from the PIQ bus interface unit 1544 into the instruction register 1900 of the BEU 1548. The fields of the instruction register 1900 are designated as: FETCH/ENABLE, CONDITION CODE ADDRESS, OP CODE, DELAY FIELD, and TARGET ADDRESS. The instruction register 1900 is connected over lines 1910a and 1910b to a condition code access unit 1920, over lines 1910c to an evaluation unit 1930, over lines 1910d to a delay unit 1940, and over lines 1910e to a next instruction interface 1950.

Once an instruction has been issued to BEU 1548 from the PIQ bus interface 1544, instruction fetching must be held up until the value in the delay field has been determined. This value is measured relative to the receipt of the branch by the BEU, that is stage 1. If there are no instructions that may be overlapped with this branch, this field value is zero. In this case, instruction fetching is held up until the outcome of the branch has been determined. If this field is non-zero, instruction fetching may continue for a number of firing times given by the value in this field.

The condition code access unit 1920 is connected to the register file—PE network 670 over lines 1550 and to the evaluation unit 1930 over lines 1922. During stage 2 operation, the condition code access decode unit 1920 determines whether or not the condition codes must be fetched by the instruction, or whether the instruction that determines the branch condition delivers them. As there is only one instruction per basic block that will determine the conditional branch, there will never be more than one condition code received by the BEU for a basic block. As a result, the actual timing of when the condition code is received is not important. If it comes earlier than the branch, no other codes will be received prior to the execution of the branch. If it comes later, the branch will be waiting and the codes received will always be the right ones. Note that the condition code for the basic block can include plural codes received at the same or different times by the BEU.

The evaluation unit 1930 is connected to the next instruction interface 1950 over lines 1932. The next instruction interface 1950 is connected to the instruction cache control circuit 1518 over lines 1549 and to the delay unit 1940 over lines 1942; and the delay unit 1940 is also connected to the instruction cache control unit 1518 over lines 1549.

During the evaluation stage of operation, the condition codes are combined according to a Boolean function that represents the condition being tested. In the final stage of operation, either fetching of the sequential instruction stream continues, if a conditional branch is not taken, or the next instruction pointer is loaded, if the branch is taken.

The impact of a branch in the instruction stream can be described as follows. Instructions, as discussed, are sent to their respective PIQ's 1730 by analysis of the resident logical processor number (LPN). Instruction fetching can be continued until a branch is encountered, that is, until an instruction is delivered to the instruction register 1900 of the BEU 1548. At this point, in a conventional system without delayed branching, fetching would be stopped until the resolution of the branch instruction is complete. See, for example, "Branch Prediction Strategies and Branch Target Buffer Design", J. F. K. Lee & A. J. Smith, IEEE Computer Magazine, January, 1984.

In the present system, which includes delayed branching, instructions must continue to be fetched until the next instruction fetched is the last instruction of the basic block to be executed. The time that the branch is executed is then the last time that fetching of an instruction can take place without a possibility of modifying the next instruction address. Thus, the difference between when the branch is fetched and when the effects of the branch are actually felt corresponds to the number of additional firing time cycles during which fetching can be continued.

The impact of this delay is that the BEU 1548 must have access to the next instruction firing time register of the cache controller 1518. Further, the BEU 1548 can control the initiation or disabling of the instruction fetch process performed by the instruction cache control unit 1518. These tasks are accomplished by signals over bus 1549.

In operation the branch execution unit (BEU) 1548 functions as follows. The branch instruction, such as instruction I5 in the example above, is loaded into the instruction register 1900 from the PIQ bus interface unit 1544. The contents of the instruction register then control the further operation of BEU 1548. The FETCH-ENABLE field indicates whether or not the condition code access unit 1920 should retrieve the condition code. located at the address stored in the CC-ADX field (called FETCH) or whether the condition code will be delivered by the generating instruction.

If a FETCH is requested, the unit 1920 accesses the register file-PE network 670 (see FIG. 6) to access the condition code storage 2000 which is shown in FIG. 20. Referring to FIG. 20, the condition code storage 2000, for each context file, is shown in the generalized case. A set of registers $CC_{xy}$ are provided for storing condition codes for procedural level y. Hence, the condition code storage 2000 is accessed and addressed by the unit 1920 to retrieve, pursuant to a FETCH request, the necessary condition code. The actual condition code and an indication that the condition code is received by the unit 1920 is delivered over lines 1922 to the evaluation unit 1930. The OPCODE field, delivered to the evaluation unit 1930, in conjunction with the received condition code, functions to deliver a branch taken signal over line 1932 to the next instruction interface 1950. The evaluation unit 1930 is comprised of standard gate arrays such as those from LSI Logic Corporation, 1551 McCarthy Blvd., Milpitas, Calif. 95035.

The evaluation unit 1930 accepts the condition code set that determines whether or not the conditional branch is taken, and under control of the OPCODE field, combines the set in a Boolean function to generate the conditional branch taken signal.

The next instruction interface 1950 receives the branch target address from the TARGET-ADX field of the instruction register 1900 and the branch taken signal over line 1932. However, the interface 1950 cannot operate until an enable signal is received from the delay unit 1940 over lines 1942.

The delay unit 1940 determines the amount of time that instruction fetching can be continued after the receipt of a branch instruction by the BEU. Previously, it has been described that when a branch instruction is received by the BEU, instruction fetching continues for one more cycle and then stops. The instruction fetched during this cycle is held up from passing through PIQ bus interface unit 1544 until the length of the delay field has been determined. For example, if the delay field is zero (implying that the branch is to be executed immediately), these instructions must still be withheld from the PIQ bus buffer unit until it is determined whether or not these are the right instructions to be fetched. If the delay field is non-zero, the instructions would be gated into the PIQ buffer unit as soon as the delay value was determined to be non-zero. The length of the delay is obtained from DELAY field of the instruction register 1900. The delay unit receives the delay length from register 1900 and clock impulses from the context control 1518 over lines 1549. The delay unit 1940 decrements the value of the delay at each clock pulse; and when fully decremented, the interface unit 1950 becomes enabled.

Hence, in the discussion of Table 6, instruction I5 is assigned a firing time T17 but is delayed until firing time T18. During the delay time, the interface 1950 signals the instruction cache control 1518 over line 1549 to continue to fetch instructions to finish the current basic block. When enabled, the interface unit 1950 delivers the next address (that is, the branch execution address) for the next basic block into the instruction cache-control 1518 over lines 1549.

In summary and for the example on Table 6, the branch instruction I5 is loaded into the instruction register 1900 during time T17. However, a delay of one firing time (DELAY) is also loaded into the instruction register 1900 as the branch instruction cannot be executed until the last instruction I3 is processed during time T18. Hence, even though the instruction I5 is loaded in register 1900, the branch address for the next basic block, which is contained in the TARGET ADDRESS, does not become effective until the completion of time T18. In the meantime, the next instruction interface 1950 issues instructions to the cache control 1518 to continue processing the stream of instructions in the basic block. Upon the expiration of the delay, the interface 1950 is enabled, and the branch is executed by delivering the address of the next basic block to the instruction cache control 1518.

Note that the delay field is used to guarantee the execution of all instructions in the basic block governed by this branch in single cycle context free PE's. A small complexity is encountered when the PE's are pipelined. In this case, there exist data dependencies between the instructions from the basic block just executed, and the instructions from the basic block to be executed. The TOLL software can analyze these dependencies when the next basic block is only targeted by the branch from this basic block. If the next basic block is targeted by more than one branch, the TOLL software cannot resolve the various branch possibilities and lets the pipelines drain, so that no data dependencies are violated. One mechanism for allowing the pipelines to drain is to insert NO-OP (no operation) instructions into the instruction stream. An alternate method provides an extra field in the branch instruction which inhibits the delivery of new instructions to the processor elements for a time determined by the data in the extra field.

c. Processor Elements (PE)

So far in the discussions pertaining to the matrix multiply example, a single cycle processor element has been assumed. In other words, an instruction is issued to the processor element and the processor element completely executes the instruction before proceeding to the next instruction. However, greater performance can be obtained by employing pipelined processor elements. Accordingly, the tasks performed by the TOLL software change slightly. In particular, the assignment of the processor elements is more complex than is shown in the previous example; and the hazards that characterize a pipeline processor must be handled by the TOLL software. The hazards that are present in any pipelined processor manifest themselves as a more sophisticated set of data dependencies. This can be encoded into the TOLL software by one practiced in the art. See for example, T. K. R. Gross, Stanford University, 1983, "Code Optimization of Pipeline Constraints", Doctorate Dissertation Thesis.

The assignment of the processors is dependent on the implementation of the pipelines and again, can be performed by one practiced in the art. A key parameter is determining how data is exchanged between the pipelines. For example, assume that each pipeline contains feedback paths between its stages. In addition, assume that the pipelines can exchange results only through the register sets 660. Instructions would be assigned to the pipelines by determining sets of dependent instructions that are contained in the instruction stream and then assigning each specific set to a specific pipeline. This minimizes the amount of communication that must take place between the pipelines (via the register set), and hence speeds up the execution time of the program. The use of the logical processor number guarantees that the instructions will execute on the same pipeline.

Alternatively, if there are paths available to exchange data between the pipelines, dependent instructions may be distributed across several pipeline processors instead of being assigned to a single pipeline. Again, the use of multiple pipelines and the interconnection network between them that allows the sharing of intermediate results manifests itself as a more sophisticated set of data dependencies imposed on the instruction stream. Clearly, the extension of the teachings of this invention to a pipelined system is within the skill of one practiced in the art.

Importantly, the additional data (chaining) paths do not change the fundamental context free nature of the processor elements of the present invention. That is, at any given time (for example, the completion of any given instruction cycle), the entire process state associated with a given program (that is, context) is captured completely external to the processor elements. Data chaining results merely in a transitory replication of some of the data generated within the processor elements during a specific instruction clock cycle.

Referring to FIG. 21, a particular processor element 640 has a four stage pipeline processor element. All processor elements 640 according to the illustrated embodiment are identical. It is to be expressly understood, that any prior art type of processor element such as a micro-processor or other pipeline architecture could not be used under the teachings of the present invention, because such processors retain substantial state information of the program they are processing. However, such a processor could be programmed with software to emulate or simulate the type of processor necessary for the present invention.

The design of the processor element is determined by the instruction set architecture generated by the TOLL software and, therefore, from a conceptual viewpoint, is the most implementation dependent portion of this invention. In the illustrated embodiment shown in FIG. 21, each processor element pipeline operates autonomously of the other processor elements in the system. Each processor element is homogeneous and is capable, by itself, of executing all computational and data memory accessing instructions. In making computational executions, transfers are from register to register and for memory interface instructions, the transfers are from memory to registers or from registers to memory.

Referring to FIG. 21, the four-stage pipeline for the processor element 640 of the illustrated embodiment includes four discrete instruction registers 2100, 2110, 2120, and 2130. Each processor element also includes four stages: stage 1, 2140; stage 2, 2150; stage 3, 2160, and stage 4, 2170. The first instruction register 2100 is connected through the network 650 to the PIQ processor assignment circuit 1570 and receives that information over bus 2102. The instruction register 2100 then controls the operation of stage 1 which includes the hardware functions of instruction decode and register 0 fetch and register 1 fetch. The first stage 2140 is interconnected to the instruction register over lines 2104 and to the second instruction register 2110 over lines 2142. The first stage 2140 is also connected over a bus 2144 to the second stage 2150. Register 0 fetch and register 1 fetch of stage 1 are connected over lines 2146 and 2148, respectively, to network 670 for access to the register file 660.

The second instruction register 2110 is further interconnected to the third instruction register 2120 over lines 2112 and to the second stage 2150 over lines 2114. The second stage 2150 is also connected over a bus 2152 to the third stage 2160 and further has the memory write (MEM WRITE) register fetch hardware interconnected over lines 2154 to network 670 for access to the register file 660 and its condition code (CC) hardware connected over lines 2156 through network 670 to the condition code storage of context file 660.

The third instruction register 2120 is interconnected over lines 2122 to the fourth instruction register 2130 and is also connected over lines 2124 to the third stage 2160. The third stage 2160 is connected over a bus 2162 to the fourth stage 2170 and is further interconnected over lines 2164 through network 650 to the data cache interconnection network 1590.

Finally, the fourth instruction register 2130 is interconnected over lines 2132 to the fourth stage, and the fourth stage has its store hardware (STORE) output connected over lines 2172 and its effective address update (EFF. ADD.) hardware circuit connected over lines 2174 to network 670 for access to the register file 660. In addition, the fourth stage has its condition code store (CC STORE) hardware connected over lines 2176 through network 670 to the condition code storage of context file 660.

The operation of the four-stage pipeline shown in FIG. 21 will now be discussed with respect to the example of Table 1 and the information contained in Table 19 which describes the operation of the processor element for each instruction.

TABLE 19

| Instruction I0, (I1): | |
| --- | --- |
| Stage 1 | Fetch Reg to form Mem-adx |
| Stage 2 | Form Mem-adx |
| Stage 3 | Perform Memory Read |
| Stage 4 | Store R0, (R1) |
| Instruction I2: | |
| Stage 1 | Fetch Reg R0 and R1 |
| Stage 2 | No-Op |
| Stage 3 | Perform multiply |
| Stage 4 | Store R2 and CC |
| Instruction I3: | |
| Stage 1 | Fetch Reg R2 and R3 |
| Stage 2 | No-Op |
| Stage 3 | Perform addition |
| Stage 4 | Store R3 and CC |
| Instruction I4: | |
| Stage 1 | Fetch Reg R4 |
| Stage 2 | No-Op |
| Stage 3 | Perform decrement |
| Stage 4 | Store R4 and CC |

For instructions I0 and I1, the performance by the processor element 640 in FIG. 21 is the same except in stage 4. The first stage is to fetch the memory address from the register which contains the address in the register file. Hence, stage 1 interconnects circuitry 2140 over lines 2146 through network 670 to that register and downloads it into register 0 from the interface of stage 1. Next, the address is delivered over bus 2144 to stage 2, and the memory write hardware forms the memory address. The memory address is then delivered over bus 2152 to the third stage which reads memory over 2164 through network 650 to the data cache interconnection network 1590. The results of the read operation are then stored and delivered to stage 4 for storage in register R0. Stage 4 delivers the data over lines 2172 through network 670 to register R0 in the register file. The same operation takes place for instruction I1 except that the results are stored in register 1. Hence, the four stages of the pipeline (Fetch, Form Memory Address, Perform Memory Read, and Store The Results) flow data through the pipe in the manner discussed, and when instruction I0 has passed through stage 1, the first stage of instruction I1 commences. This overlapping or pipelining is conventional in the art.

Instruction I2 fetches the information stored in registers R0 and R1 in the register file 660 and delivers them into registers REG0 and REG1 of stage 1. The contents are delivered over bus 2144 through stage 2 as a no operation and then over bus 2152 into stage 3. A multiply occurs with the contents of the two registers, the results are delivered over bus 2162 into stage 4 which then stores the results over lines 2172 through network 670 into register R2 of the register file 660. In addition, the condition code data is stored over lines 2176 in the condition code storage of context files 660.

Instruction I3 performs the addition of the data in registers R2 and R3 in the same fashion, to store the results, at stage 4, in register R3 and to update the condition code data for that instruction. Finally, instruction I4 operates in the same fashion except that stage 3 performs a decrement of the contents of register R4.

Hence, according to the example of Table 1, the instructions for PE0, would be delivered from the PIQO in the following order: I0, I2, and I3. These instructions would be sent through the PE0 pipeline stages (S1, S2, S3, and S4), based the upon the instruction firing times (T16, T17, and T18), as follows:

TABLE 20

| PE | Inst | T16 | T17 | T18 | T19 | T20 | T21 |
|---|---|---|---|---|---|---|---|
| PE0: | I0 | S1 | S2 | S3 | S4 | | |
| | I2 | | S1 | S2 | S3 | S4 | |
| | I3 | | | S1 | S2 | S3 | S4 |
| PE1: | I1 | S1 | S2 | S3 | S4 | | |
| PE2: | I4 | S1 | S2 | S3 | S4 | | |

The schedule illustrated in Table 20 is not however possible unless data chaining is introduced within the pipeline processor (intraprocessor data chaining) as well as between pipeline processors (interprocessor data chaining). The requirement for data chaining occurs because an instruction no longer completely executes within a single time cycle illustrated by, for example, instruction firing time T16. Thus, for a pipeline processor, the TOLL software must recognize that the results of the store which occurs at stage 4 (T19) of instructions I0 and I1 are needed to perform the multiply at stage 3 (T19) of instruction I2, and that fetching of those operands normally takes place at stage 1 (T17) of instruction I2. Accordingly, in the normal operation of the pipeline, for processors PE0 and PE1, the operand data from registers R0 and R1 is not available until the end of firing time T18 while it is needed by stage 1 of instruction I2 at time T17.

To operate according to the schedule illustrated in Table 20, additional data (chaining) paths must be made available to the processors, paths which exist both internal to the processors and between processors. These paths, well known to those practiced in the art, are the data chaining paths. They are represented, in FIG. 21, as dashed lines 2180 and 2182. Accordingly, therefore, the resolution of data dependencies between instructions and all scheduling of processor resources which are performed by the TOLL software prior to program execution, take into account the availability of data chaining when needed to make available data directly from the output, for example, of one stage of the same processor or a stage of a different processor. This data chaining capability is well known to those practiced in the art and can be implemented easily in the TOLL software analysis by recognizing each stage of the pipeline processor as being, in effect, a separate processor having resource requirements and certain dependencies, that is, that an instruction when started through a pipeline will preferably continue in that same pipeline through all of its processing stages. With this in mind, the speed up in processing can be observed in Table 20 where the three machine cycle times for the basic block are completed in a time of only six pipeline cycles. It should be borne in mind that the cycle time for a pipeline is approximately one-fourth the cycle time for the non-pipeline processor in the illustrated embodiment of the invention.

The pipeline of FIG. 21 is composed of four equal (temporal) length stages. The first stage 2140 performs the instruction decode, determines what registers to fetch and store, and performs up to two source register fetches which can be required for the execution of the instruction.

The second stage 2150 is used by the computational instructions for the condition code fetch if required. It is also the effective address generation stage for the memory interface instructions.

The effective address operations that are supported in the preferred embodiment of the invention are:
1. Absolute address
   The full memory address is contained in the instruction.
2. Register indirect
   The full memory address is contained in a register.
3. Register indexed/based
   The full memory address is formed by combining the designated registers and immediate data.
   a. Rn op K
   b. Rn op Rm
   c. Rn op K op Rm
   d. Rn op Rm op K where "op" can be addition (+), subtraction (−), or multiplication (*) and "K" is a constant.

As an example, the addressing constructs presented in the matrix multiply inner loop example are formed from case 3-a where the constant "K" is the length of a data element within the array and the operation is addition (+).

At a conceptual level, the effective addressing portion of a memory access instruction is composed of three basic functions; the designation and procurement of the registers and immediate data needed for the calculation, the combination of these operands in order to form the desired address, and if necessary, updating of any one of the registers involved. This functionality is common in the prior art and is illustrated by the autoincrement and autodecrement modes of addressing available in the DEC processor architecture. See, for example, DEC VAX Architecture Handbook.

Aside from the obvious hardware support required, the effective addressing is supported by the TOLL software, and impacts the TOLL software by adding functionality to the memory accessing instructions. In other words, an effective address memory access can be interpreted as a concatenation of two operations, the first being the effective address calculation and the second being the actual memory access. This functionality can be easily encoded into the TOLL software by one skilled in the art in much the same manner as an add, subtract or multiply instruction would be.

The described effective addressing constructs are to be interpreted as but one possible embodiment of a memory accessing system. There are a plethora of other methods and modes for generating a memory address that are known to those skilled in the art. In other words, the effective addressing constructs described above are for design completeness only, and are not to be construed as a key element in the design of the system.

Referring to FIG. 22, various structures of data or data fields within the pipeline processor element of FIG. 21 are illustrated for a system which is a multi-user system in both time and space. As a result, across the multiple pipelines, instructions from different users may be executing, each with its own processor state. As the processor state is not typically associated with the processor element, the instruction must carry along the identifiers that specify this state. This processor state is supported by the LRD, register file and condition code file assigned to the user.

A sufficient amount of information must be associated with each instruction so that each memory access, condition code access or register access can uniquely identify the target of the access. In the case of the registers and condition codes, this additional information constitutes the absolute value of the procedural level (PL) and context identifiers (CI) and is attached to the instruction by the SCSM attachment unit 1650. This is illustrated in FIGS. 22a, 22b and 22c respectively. The context identifier portion is used to determine which register or condition code plane (FIG. 6) is being accessed. The procedural level is used to determine which procedural level of registers (FIG. 13) is to be accessed.

Memory accesses also require that the LRD that supports the current user be identified so that the appropriate data cache can be accessed. This is accomplished through the context identifier. The data cache access further requires that a process identifier (PID) for the current user be available to verify that the data present in the cache is indeed the data desired. Thus, an address issued to the data cache takes the form of FIG. 22d. The miscellaneous field is composed of additional information describing the access, for example, read or write, user or system, etc.

Finally, due to the fact that there can be several users executing across the pipelines during a single time interval, information that controls the execution of the instructions, and which would normally be stored within the pipeline, must be associated with each instruction instead. This information is reflected in the ISW field of an instruction word as illustrated in FIG. 22a. The information in this field is composed of control fields like error masks, floating point format descriptors, rounding mode descriptors, etc. Each instruction would have this field attached, but, obviously, may not require all the information. This information is used by the ALU stage 2160 of the processor element.

This instruction information relating to the ISW field, as well as the procedural level, context identification and process identifier, are attached dynamically by the SCSM attacher (1650) as the instruction is issued from the instruction cache.

Although the system of the present invention has been specifically set forth in the above disclosure, it is to be understood that modifications and variations can be made thereto which would skill fall within the scope and coverage of the following claims.

What is claimed is:

1. A computer comprising:
a general purpose register file comprising at least two general purpose registers;
a condition code register file distinct from said general purpose register file, having a plurality of addressable condition code registers, each condition code register for representing a condition code value as a small number of bits summarizing the execution or result of a previously-executed instruction;
a processor element configured to execute instructions, including condition-setting instructions that each produce a condition code value for storage in one of said condition code registers;
a branch execution unit configured to execute conditional branch instructions that each determine a target instruction for execution based on analysis of a condition code value from one of said condition code registers; and
a condition code access unit configured to act in response to condition-selecting instructions, at least one of said condition-selecting instructions being one of either said condition-setting instructions or said conditional branch instructions, said condition-selecting instructions for selecting from said condition code register file a condition code register for at least one of:
storing into said selected condition code register a condition code value produced by one of said condition-setting instructions, and
fetching from said selected condition code register a condition code value for analysis by one of said conditional branch instructions;
said selecting being by direct addressing on a condition code address field of the condition-selecting instruction.

2. The computer of claim 1 further comprising:
at least one additional processor element configured to execute instructions including condition-setting instructions that each produce a condition code value for storage in one of said condition code registers;
each said processor element being enabled to deliver the condition code values produced by said condition-setting instructions to condition code registers of said condition code register file, said condition code register file being shared by said processor elements, a condition code value produced by any of said processor elements being readable by said branch execution unit.

3. The computer of claim 2 further comprising:
at least one additional branch execution unit configured to execute conditional branch instructions that each determine a target instruction for execution based on analysis of a condition code value fetched from one of said condition code registers;
said condition code register file being shared by said branch execution units, so that each said branch execution unit is enabled to analyze a condition code value produced by any of two or more of said processor elements.

4. The computer of claim 3 wherein:
said processor elements and branch execution units are configured to concurrently execute at least two independent programs of different users.

5. The computer of claim 2 further comprising:
a context selector coupling said processor elements to said condition code register file, said condition code register file being partitioned into multiple register sets, one of said processor elements at any one time having addressability to at least one but fewer than all of said register sets, said addressability determined by said context selector.

6. The computer of claim 1 further comprising:
a context selector coupling said processor element to said condition code register file, said condition code register file being partitioned into multiple register sets, said processor element at any one time having addressability to a register context comprising at least one but fewer than all of said register sets, said register context determined by said context selector.

7. The computer of claim 6 wherein:
said context selector comprises means for determining said register context by a subroutine nesting level of instructions executed by said processor element.

8. The computer of claim 6 wherein:
said condition-setting and conditional branch instructions each comprise a condition code address field, and
said context selector uses a context value to determine said register context, thereby associating values of said condition code address field to condition code registers of said register context.

9. The computer of claim 1 wherein:
said condition-setting instructions include compare instructions that produce a condition code value for storage in said condition code register file but no arithmetic result for storage in said general purpose registers.

10. The computer of claim 9 wherein:
each said compare instruction includes a field directly addressing one of said condition code registers into which said produced condition code value is to be stored.

11. The computer of claim 1 wherein:
said conditional branch instructions select a condition code value for fetching and analysis by a condition code address field of each said conditional branch instruction which directly addresses a condition code register.

12. The computer of claim 1 wherein:
at least some of said executed instructions are both condition-setting instructions and arithmetic or logical instructions producing both an arithmetic or logical result for storage in said general purpose register file and a condition code value summarizing said arithmetic or logical result for storage in said condition code register file.

13. The computer of claim 1, wherein:
said condition-selecting instructions comprise both condition-setting instructions and conditional branch instructions, and
said condition code access unit selects from said condition code register file a condition code register for both:
  storing into said selected condition code register a condition code value produced by one of said condition-setting instructions, and
  fetching from said selected condition code register a condition code value for analysis by one of said conditional branch instructions.

14. The computer of claim 1, further comprising:
delay means to delay the effect of a conditional branch instruction until completion of a designated number of instructions following said conditional branch instruction.

15. The computer of claim 1 wherein:
said branch unit has means for executing said conditional branch instructions concurrently with execution of arithmetic instructions by said processor element.

16. A computer comprising:
a general purpose register file;
a condition code register file distinct from said general purpose register file, and having a plurality of addressable condition code registers, each condition code register for representing a condition code value as a small number of bits summarizing the execution or result of a previously-executed instruction; and
a processor configured to execute instructions, the instructions including:
  arithmetic or logical instructions that each produce an arithmetic or logical result for storage in one of said general purpose registers,
  condition-setting instructions that each produce a condition code value for storage in one of said condition code registers, at least some of said condition-setting instructions each including a field directly addressing one of said condition code registers into which said produced condition code value is to be stored, and
  conditional branch instructions that each determine a target instruction for execution based on analysis of a condition code value retrieved from one of said condition code registers, at least some of said conditional branch instructions including a condition code address field for directly addressing one of said condition code registers for said analysis.

17. The computer of claim 16 wherein:
at least some of said executed instructions are both condition-setting instructions and arithmetic or logical instructions, producing both an arithmetic or logical result for storage in said general purpose register file and a condition code value of said arithmetic or logical result for storage in said condition code register file.

18. A computer comprising:
at least two processors, each relying on a common shared register file of at least two registers for storage of intermediate results of instructions executed by said processors, registers of said shared register file being directly address by register selection fields of said instructions;
an interconnect between said processors and said register file configured to:
  store into a register of said shared register file a summary of a condition of the result of a condition-setting one of said instructions executed by a first of said processors, and
  deliver said condition summary from said register to a second of said processors for analysis in determining the branch target of a conditional branch instruction of said instructions executed on said second processor;
said register selected from within said register file by a condition code address field of said condition-setting instruction, and said register selected from within said register file by a condition code address field of said conditional branch instruction.

19. The computer of claim 18 wherein:
at least some of said conditional branch instructions select a condition code register for delivery and analysis by a condition code address field that directly addresses said selected condition code register.

20. The computer of claim 19 wherein:
at least some of said condition-setting instructions include a condition code address field directly addressing one of said condition code registers into which said condition code value is to be stored.

21. The computer of claim 18 wherein registers of said register file are configured to store arithmetic or logical results of said instructions are distinct from registers configured to store said condition code value.

22. The computer of claim 18 wherein said processors are configured to concurrently and cooperatively execute instructions of different basic blocks of programs.

23. The computer of claim 18 wherein:
at least some of said condition-setting instructions include a condition code address field directly addressing one of said condition code registers into which said condition code value is to be stored.

24. The computer of claim 18 further comprising:
a context selector coupling said processors to said register file, said register file being partitioned into multiple register sets, one of said processors at any one time having addressability to at least one but fewer than all of said register sets, said addressability determined by said context selector.

25. A method for executing instructions of a single program in a single computer, said computer having a register file of at least two condition code registers, the method comprising the steps of:
executing a first condition-setting instruction of said program on said computer, and storing a condition of the result of said first condition-setting instruction as a first condition code value in a condition code register of said register file;
no earlier than execution of said first condition-setting instruction, executing a second condition-setting instruction on said computer, and storing a condition of the result of said-second condition-setting instruction as a second condition code value in a condition code register of said register file; and
no earlier than execution of said second condition-setting instruction, executing a first conditional branch instruction, having a condition code address field, on said computer, said branch executing step comprising the step of determining the effect of said first conditional branch instruction by analysis of said first condition code value, said first condition code value selected from within said register file by said condition code address field of said first conditional branch instruction.

26. The method of claim 25 wherein:
execution of said first condition-setting instruction selects a condition code register of said register file into which to store said first condition code value based on a condition code address field of said first condition-setting instruction, and
execution of said second condition-setting instruction selects a condition code register of said register file into which to store said second condition code value based on a condition code address field of said second condition-setting instruction.

27. The method of claim 25 wherein:
the steps of executing said first condition-setting instruction and said first conditional branch instruction are performed by a first processor element; and
the step of executing said second condition-setting instruction is performed on a second processor element distinct from said first processor element; and
at least two condition code registers of said condition code address file are each addressable by condition code address fields of instructions executed by each of said first and second processor elements.

28. The method of claim 25 wherein:
said computer further comprises a single general purpose register file; and
said first and second condition-setting instructions also compute arithmetic or logical results, stored in first and second of said general purpose registers, respectively.

29. A method for executing instructions of a single program in a single computer, said computer having a plurality of registers including at least two condition code registers, the method comprising the steps of:
executing a first condition-setting arithmetic or logical instruction of said program on said computer, an arithmetic or logical result of said first condition-setting instruction being stored in a general purpose register of said registers, and a condition of the execution or result of said first condition-setting instruction being represented as a first condition code value stored as a small number of bits in a first of said condition code registers;
no earlier than execution of said first condition-setting instruction, executing a second condition-setting arithmetic instruction on said computer, a result of said second condition-setting instruction being represented as a second condition code value stored in a second one of said condition code registers selected by a condition code address field of said second condition-setting instruction; and
no earlier than execution of said second condition-setting instruction, executing a first conditional branch instruction on said computer, the effect of said first conditional branch instruction being determined by analysis of said first condition code value, said first condition code value having remained within said condition code registers since said first condition-setting instruction without having been recomputed, and being selected from within said condition code register file by a direct-addressing condition code address field of said first conditional branch instruction.

30. The method of claim 29 further comprising the step of:
after execution of said first conditional branch instruction, executing a second conditional branch instruction on said computer, the branch target of said second conditional branch instruction being determined by analysis of said second condition code value, said second condition code value selected from within said condition code registers by a condition code address field of said second conditional branch instruction.

* * * * *

UNITED STATES PATENT AND TRADEMARK OFFICE
CERTIFICATE OF CORRECTION

PATENT NO.    : 5,517,628
DATED         : May 14, 1996
INVENTOR(S)   : Morrison et al.

It is certified that error appears in the above-identified patent and that said Letters Patent is hereby corrected as shown below:

<u>Column 13,</u>
Lines 5, 10 and 14, after "instruction," delete "13" and insert -- I3 --

<u>Column 16,</u>
Line 5, after "and," delete "14" and insert -- I4 --

<u>Column 18,</u>
Line 62, after "Such a," delete "=" in front of the word "table"

Signed and Sealed this

Eighth Day of June, 2004

JON W. DUDAS
*Acting Director of the United States Patent and Trademark Office*

(12) EX PARTE REEXAMINATION CERTIFICATE (6574th)
United States Patent
Morrison et al.

(10) Number: US 5,517,628 C1
(45) Certificate Issued: Dec. 23, 2008

(54) COMPUTER WITH INSTRUCTIONS THAT USE AN ADDRESS FIELD TO SELECT AMONG MULTIPLE CONDITION CODE REGISTERS

(75) Inventors: Gordon E. Morrison, Denver, CO (US); Christopher B. Brooks, Boulder, CO (US); Frederick G. Gluck, Boulder, CO (US)

(73) Assignee: Equipment Investment & Management Co., Palm Beach Gardens, FL (US)

Reexamination Request:
No. 90/008,101, Jun. 20, 2006

Reexamination Certificate for:
Patent No.: 5,517,628
Issued: May 14, 1996
Appl. No.: 08/254,687
Filed: Jun. 6, 1994

Certificate of Correction issued Dec. 9, 2003.

Certificate of Correction issued Jun. 8, 2004.

Related U.S. Application Data

(62) Division of application No. 08/093,794, filed on Jul. 19, 1993, now abandoned, which is a continuation of application No. 07/913,736, filed on Jul. 14, 1992, now abandoned, which is a continuation of application No. 07/560,093, filed on Jul. 30, 1990, now abandoned, which is a division of application No. 07/372,247, filed on Jun. 26, 1989, now Pat. No. 5,021,945, which is a division of application No. 06/794,221, filed on Oct. 31, 1985, now Pat. No. 4,847,755.

(51) Int. Cl.
*G06F 9/38* (2006.01)
*G06F 9/45* (2006.01)
*G06F 9/44* (2006.01)
*G06F 9/40* (2006.01)
*G06F 9/42* (2006.01)

(52) U.S. Cl. ............. 712/234; 712/E9.056; 712/E9.062; 712/E9.082; 712/E9.083

(58) Field of Classification Search .................. 712/234, 712/E9.056, E9.062, E9.082
See application file for complete search history.

(56) References Cited

U.S. PATENT DOCUMENTS

RE26,171 E   3/1967   Fallkoff (Continued)

FOREIGN PATENT DOCUMENTS

| JP | 60-110043 | 6/1985 |
|---|---|---|
| JP | 60-144830 | 7/1985 |

OTHER PUBLICATIONS

U.S. Appl. No. 08/914,077.
Aeberhard, John, *'Soft' Computer Speeds New System Development*, Nanodata Computer Corporation.

(Continued)

*Primary Examiner*—Fred Ferris

(57) ABSTRACT

The invention features a computer with a condition code register file (the condition code register file is distinct from the computer's general purpose register file). The condition code register file has a plurality of addressable condition code registers. The computer executes condition-setting instructions that each produce a condition code value for storage in one of the condition code registers, and conditional branch instructions that branch to a target based on analysis of a condition code value from one of the condition code registers. The condition code registers are directly addressable by condition code address fields of the instructions. The invention finds primary expression in one of two embodiments (or in both simultaneously): either (a) at least some of the condition-setting instructions contain a direct address field that selects one, from among the plurality of the condition code registers into which the condition code value is to be stored, or (b) at least some of the conditional branch instructions contain a direct address field that selects one, from among the plurality of the condition code registers from which a condition code value is to be selected for analysis.

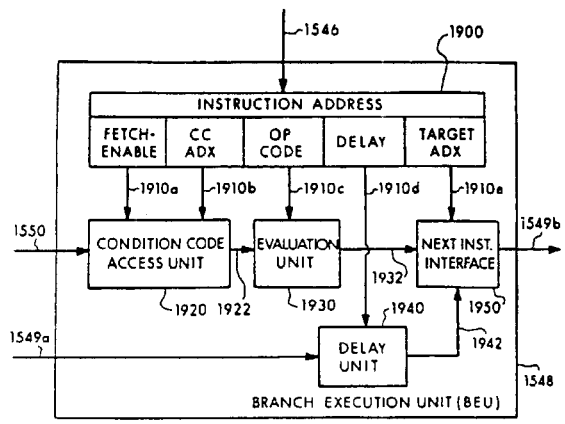

U.S. PATENT DOCUMENTS

| | | | |
|---|---|---|---|
| 3,577,189 | A | 5/1971 | Cocke et al. |
| 3,577,190 | A | 5/1971 | Cocke et al. |
| 3,771,141 | A | 11/1973 | Culler |
| 3,833,889 | A | 9/1974 | Cray |
| 4,295,193 | A | 10/1981 | Pomerene |
| 4,351,024 | A * | 9/1982 | Bradley et al. ............... 719/310 |
| 4,374,409 | A * | 2/1983 | Bienvenu et al. ............. 718/106 |
| 4,438,488 | A * | 3/1984 | Shibayama et al. .......... 709/212 |
| 4,589,087 | A | 5/1986 | Auslander |
| 4,742,453 | A | 5/1988 | Shibuya |
| 4,847,755 | A | 7/1989 | Morrison |
| 5,021,945 | A | 6/1991 | Morrison |
| 5,517,628 | A | 5/1996 | Morrison |
| 6,253,313 | B1 | 6/2001 | Morrison |
| 6,704,859 | B1 | 3/2004 | Jacobs |

OTHER PUBLICATIONS

Agrawala, Ashok K. and Tomlinson G. Rauscher, *The Application of Programming Language Techniques to the Design and Development of Microprogramming Languages*, University of Maryland.

CDC, Control Data 7600 Computer System Preliminary Reference Manual, Publications No. 60258200, 1969.

Cray Computer Systems, Cray–2 Computer System Functional Description, HR–2000, 1985.

Dasgupta, Subrata, *The Organization of Microprogram Stores*, Simon Fraser University, Burnaby, Canada.

Dasgupta, Subrata, *Some Aspect of High Level Microprogramming*, University of Alberta.

Davidson, Scott, *A Network of Dynamically Microprogrammable Machines*, University of Illinois at Urbana–Champaign.

Digital Equipment Corp., *Programmed Data Processor–6 Handbook (PDP–6)*, 1964.

Digital Equipment Corp., DECsystem–10/DECSYSTEM–20 Processor Reference manual AD–H391A–T1.

Ellis, John R., *Bulldog: A Compiler for VLIW Architectures*, Yale University, 1985.

Fisher, Joseph A. and John R. Ellis, *Parallel Processing: A Smart Compiler and a Dumb Machine*, Yale University 1984.

Fisher, Joseph A. *Very Long Instruction Word Architectures and the ELI–512*, Hewlett–Packard Laboratories.

Flink II, Charles W., *Easy—An Operating Systems for the QM–1*, Naval Surface Weapons Center.

Fisher, Joseph A. Second—Way Microinstruction Hardware and an Effective Instruction Binding Method, Yale University.

Frieder, Gideon and Jill Miller, *An Analysis of Code Density for the Two Level Programmable Control of the Nanodata QM–1*, State University of New York at Buffalo.

Gross, Thomas Karl Richard, *Code Optimization of Pipeline Constraints*, Stanford Univeristy, 1983.

Hannessy, John, *VLSI Processor Architecture*, IEEE Transactions on Computers, Dec. 1984.

Hennessy, John, Norman Jouppi, Forest Baskett and John Grill, *MIPS: A VLSI Processor Architecture*, Stanford University.

Heterogeneous Element Processor Principles of Operation, Apr. 1981.

Higbie, *Overlapped Operation with Microprogramming*, IEEE Transactions on Computers, Mar. 1978.

Honeywell, Inc. *Honeywell 800 Programmers' Reference Manual*, 1960.

Hoogerbrugge, Jan, *Internals of tmsched v2.0*, Philips Electronics N.V. 1997.

Hoogerbrugge, Jan and Lex Augusteijn, *Instruction Scheduling for TriMedia*, Al Access Foundation, 1999.

Klassen, Alynn and Subtrata Dasgupta, *S (QM–1): An Instruction of the High Level Microprogramming Language Scheme S for the Nanodata QM–1*, University of Alberta.

Kowalik, *Parallel MIMD Computations HEP Supercomputer and Its Applications*, MIT Press, 1985.

Kraley, Michael, Randall Rettberg, Philip Herman, Robert Bressler and Anthony Lake, *Design of a User–Microprogrammable Building Block*, Computer Systems Division.

Landskov, David, Scott Davidson, and Bruce Shriver, *Local Microcode Compaction Techniques*, Computing Surveys, Sep. 1980.

Mahike, Scott, Richard E. Hank, James E. McCormick, David I. August and Wen–mei Hwu, *A comparison of Full and Partial Predicated Execution Support for ILP Processors*, Center for Reliable and High–Performance Computing, University of Illinois, Jun. 1995.

Marti, Jed B. and Robert R. Kessler, *A Medium Level Compiler Generating Microcode*, University of Utah.

McDowell, Charles. "*A simple architechture for low level parallelism*" Proceedings of the 1983 International Conference on Parallel Processing. Aug. 23–26, 1983.

McDowell, Charles, *SIMAC: A Simple Multiple ALU Computer*, University of California San Diego, 1983.

Nicolau, Alexandru, *Parallelism, Memory Anti–Aliasing and Correctness for Trace Scheduling Compliers*, Yale University, 1984.

Pol, E.J.D., P. Struik, F.W. Sijstermans, M.J.A. Tromp, J.W. van de Waerdt and P. van der Wolf, *TriMedia CPU64 Application Development Enviornment*, Philips Research Laboratories.

Rau, B. Ramakrishna, *Levels of Representation of Programs and the Architecture of Universal Host Machines*, University of Illinois, Irbana, II. 1978.

Radin, George, *The 801 Minicomputer*, 1982.

Rideout, Douglas J., *Considerations for Local Compaction of Nanocode for the Nanodata QM–1*, University of Alberta.

Rosin, Roberta F., Gideon Frieder and Richard H. Eckhouse Jr., *An Environment for Research in Microprogramming and Emulation*, State University of New York at Buffalo, 1972.

Rosocha, Walter G., *Adaptive Microprogramming and Processor Modeling*, Techinical Report CSRG–96, Aug. 1978.

Rosocha, Water, *Performance Enhancement of SISD Processors*, Computer Systems Research Group, 1979.

Schorr, H., *Design Principles for a High–Performance System*, Polytechnic Institute of Brooklyn, 1971.

Stone, Harold S. *Introduction to Computer Organization and Data Structures*, Stanford University, 1972.

Thornton, James E., Design of a Computer the Control Data 6600, Scott, Foresman and Company, 1970.

Tomita, Shinji, Kiyoshi Shibayana, Toshiaki and Hiroshi Hagirawa, *Performance Evaluation and Improvement of a Dynamically Microprogrammable Computer with Low–Level Parallelism*, Kyoto University.

Joint Claim Construction Chart (Feb. 25, 2003).

Appendix to Joint Claim Construction Chart (Feb. 25, 2003).

Rosocha, Walter G., *Adaptive Microprogramming and Processor Modeling*, Technical Report CSRG–96 ("Rosocha").

T.K.M. Agerwala, *New Condition Code and Branch Architecture for High Performance Processors*, IBM Technical Disclosure Bulletin, vol. 25, No. 1, pp. 135–136, Jun. 1982 ("Agerwala").

*IBM System/370 Model 168 Functional Characteristics*, IBM published manual, Sixth Edition, Jun. 1977, (the "IBM System/370 manual").

*IBM System/370 RPQ High Accuracy Arithmetic*, IBM Publication No. SA22–7093–0, (the "IBM System/370 RPQ").

File Wrapper to the '628 patent, including U.S. Patent No. 4,338,551 (Tradennick) and U.S. Patent No. 4,229,790 (Gilliland) referenced by the Examiner in the Office action mailed Feb. 16, 1995 (Paper #5).

BIAX Corporation's Opening Claim Construction Brief filed Feb. 25, 2003 in the Apple Computer Litigation.

BIAX Corporation's Patent Rule 3–1 Disclosure Of Asserted Claims And Preliminary Infringement Contentions, and accompanying claim charts, filed Jan. 3, 2006 in the Intel Litigation.

Claim Chart for claims 1, 2, 9–12, 15–20, 22–23, and 25–27 of the '628 patent in view of Nishikawa, with additional reference to Rosocha.

Claim Chart for claims 1, 2, 9–12, 15–20, 22–23, and 25–27 of the '628 patent in view of Rosocha.

Claim Chart for claims 1, 2, 9–12, 15–20, 22–23, and 25–27 of the '628 patent in view of Agerwala, with additional reference to the IBM System/370 references.

Claim Chart for claims 1, 2, 9–12, 15–20, 22–23, and 25–27 of the '628 patent in view of Shibuya, with additional reference to Agerwala and Rosocha.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–17 and 25–30 is confirmed.

Claim 18 is determined to be patentable as amended.

Claims 19–24, dependent on an amended claim, are determined to be patentable.

18. A computer comprising:
  at least two processors, each relying on a common shared register file of at least two registers for storage of intermediate results of instructions executed by said processors, registers of said shared register file being directly [address] *addressed* by register selection fields of said instructions;
  an interconnect between said processors and said register file configured to:
    store into a register of said shared register file a summary of a condition of the result of a condition-setting one of said instructions executed by a first of said processors, and
    deliver said condition summary from said register to a second of said processors for analysis in determining the branch target of a conditional branch instruction of said instructions executed on said second processor;
  said register selected from within said register file by a condition code address field of said condition-setting instruction, and said register selected from within said register file by a condition code address field of said conditional branch instruction.

\* \* \* \* \*